(12) United States Patent
Galitsky

(10) Patent No.: US 12,530,531 B2
(45) Date of Patent: *Jan. 20, 2026

(54) MANAGEMENT OF A FOCUSED INFORMATION SHARING DIALOGUE BASED ON DISCOURSE TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 18/478,517

(22) Filed: Sep. 29, 2023

(65) Prior Publication Data

US 2024/0037340 A1 Feb. 1, 2024

Related U.S. Application Data

(60) Continuation of application No. 17/235,329, filed on Apr. 20, 2021, now Pat. No. 11,809,825, which is a
(Continued)

(51) Int. Cl.
*G06F 40/295* (2020.01)
*G06F 16/00* (2019.01)
(Continued)

(52) U.S. Cl.
CPC ........... *G06F 40/295* (2020.01); *G06F 16/00* (2019.01); *G06F 16/9014* (2019.01);
(Continued)

(58) Field of Classification Search
None
See application file for complete search history.

(56) References Cited

U.S. PATENT DOCUMENTS 5,495,605 A 2/1996 Cadot
5,930,392 A 7/1999 Ho
(Continued)

FOREIGN PATENT DOCUMENTS

CN 1647070 A 7/2005
CN 102165518 A 8/2011
(Continued)

OTHER PUBLICATIONS

U.S. Appl. No. 18/151,164, Non-Final Office Action mailed on Oct. 26, 2023, 23 pages.
(Continued)

*Primary Examiner* — Douglas Godbold
(74) *Attorney, Agent, or Firm* — Kilpatrick Townsend & Stockton LLP

(57) ABSTRACT

Disclosed techniques relate to managing a dialogue between a user device and an autonomous agent. For instance, a computing device creates a discourse tree from a body of text that includes fragments. The discourse tree includes a root node, nonterminal nodes, and terminal nodes. Each nonterminal node represents a rhetorical relationship between two of the fragments and each terminal node is associated with one of the fragments. The computing device determines a main topic of the body of text from the discourse tree. The computing device provides the main topic to the user device, and in response, receives a user utterance. The computing device determines an intent from the user utterance and navigates the discourse tree to locate relevant information consistent with the intent.

20 Claims, 32 Drawing Sheets

Related U.S. Application Data continuation of application No. 17/003,593, filed on Aug. 26, 2020, now Pat. No. 11,748,572, and a continuation-in-part of application No. 16/995,302, filed on Aug. 17, 2020, now Pat. No. 11,295,085, said application No. 17/003,593 is a continuation of application No. 16/260,939, filed on Jan. 29, 2019, now Pat. No. 10,817,670, said application No. 16/995,302 is a division of application No. 16/145,644, filed on Sep. 28, 2018, now Pat. No. 10,853,574, said application No. 16/260,939 is a continuation-in-part of application No. 16/010,091, filed on Jun. 15, 2018, now Pat. No. 10,679,011, which is a continuation-in-part of application No. 15/975,683, filed on May 9, 2018, now Pat. No. 10,796,102.

(60) Provisional application No. 63/032,895, filed on Jun. 1, 2020, provisional application No. 62/729,335, filed on Sep. 10, 2018, provisional application No. 62/646,795, filed on Mar. 22, 2018, provisional application No. 62/623,999, filed on Jan. 30, 2018, provisional application No. 62/564,961, filed on Sep. 28, 2017.

(51) Int. Cl.
  *G06F 16/901* (2019.01)
  *G06F 40/211* (2020.01)
  *G06F 40/253* (2020.01)
  *G06F 40/289* (2020.01)
  *G06F 40/35* (2020.01)
  *G06N 20/00* (2019.01)

(52) U.S. Cl.
  CPC .......... *G06F 40/211* (2020.01); *G06F 40/253* (2020.01); *G06F 40/289* (2020.01); *G06F 40/35* (2020.01); *G06N 20/00* (2019.01)

(56) References Cited

U.S. PATENT DOCUMENTS

| | | | |
|---|---|---|---|
| 6,112,168 A | 8/2000 | Corston et al. | |
| 6,181,909 B1 | 1/2001 | Burstein et al. | |
| 6,411,424 B1 | 6/2002 | Raj | |
| 6,675,159 B1 | 1/2004 | Lin et al. | |
| 6,731,307 B1 | 5/2004 | Strubbe et al. | |
| 6,961,692 B1 * | 11/2005 | Polanyi | G06F 40/35 704/8 |
| 7,013,259 B1 * | 3/2006 | Polanyi | G06F 40/30 704/7 |
| 7,152,031 B1 | 12/2006 | Jensen et al. | |
| 7,359,860 B1 | 4/2008 | Miller et al. | |
| 7,519,529 B1 | 4/2009 | Horvitz | |
| 7,551,552 B2 | 6/2009 | Dunagan et al. | |
| 7,840,556 B1 | 11/2010 | Dayal et al. | |
| 8,166,032 B2 | 4/2012 | Sommer et al. | |
| 8,630,972 B2 | 1/2014 | Gamon et al. | |
| 8,694,303 B2 | 4/2014 | Hopkins et al. | |
| 8,756,617 B1 | 6/2014 | Boodman et al. | |
| 9,037,464 B1 | 5/2015 | Mikolov et al. | |
| 9,171,037 B2 | 10/2015 | Galitsky et al. | |
| 9,201,860 B1 | 12/2015 | Zhang et al. | |
| 9,201,868 B1 | 12/2015 | Zhang et al. | |
| 9,292,490 B2 | 3/2016 | Kimelfeld et al. | |
| 9,449,080 B1 | 9/2016 | Zhang | |
| 9,514,098 B1 | 12/2016 | Subramanya et al. | |
| 9,559,993 B2 | 1/2017 | Palakovich et al. | |
| 9,563,693 B2 | 2/2017 | Zhang et al. | |
| 9,582,501 B1 | 2/2017 | Salmon et al. | |
| 9,620,933 B1 | 4/2017 | Huang et al. | |
| 9,646,078 B2 | 5/2017 | Galitsky et al. | |
| 9,817,721 B1 | 11/2017 | Youngworth | |
| 10,019,716 B1 | 7/2018 | Ainslie et al. | |
| 10,175,865 B2 | 1/2019 | Beaver et al. | |
| 10,289,974 B1 | 5/2019 | Ouimette | |
| 10,545,648 B2 | 1/2020 | Beaver et al. | |
| 10,551,626 B2 | 2/2020 | Marciante | |
| 10,585,927 B1 | 3/2020 | Liao et al. | |
| 10,592,606 B2 | 3/2020 | Kuo et al. | |
| 10,594,757 B1 | 3/2020 | Shevchenko et al. | |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,839,154 B2 | 11/2020 | Galitsky | |
| 10,839,161 B2 | 11/2020 | Galitsky | |
| 10,853,574 B2 | 12/2020 | Galitsky | |
| 10,853,581 B2 | 12/2020 | Galitsky | |
| 10,935,802 B2 | 3/2021 | Marciante | |
| 10,949,623 B2 | 3/2021 | Galitsky | |
| 11,023,684 B1 | 6/2021 | Flor et al. | |
| 11,068,479 B2 | 7/2021 | Sidar et al. | |
| 11,100,144 B2 | 8/2021 | Galitsky | |
| 11,182,412 B2 | 11/2021 | Galitsky | |
| 11,295,085 B2 | 4/2022 | Galitsky | |
| 11,328,016 B2 | 5/2022 | Galitsky | |
| 11,347,946 B2 | 5/2022 | Galitsky | |
| 11,373,632 B2 | 6/2022 | Galitsky | |
| 11,386,274 B2 | 7/2022 | Galitsky | |
| 11,410,072 B2 | 8/2022 | Burstein et al. | |
| 11,455,469 B2 | 9/2022 | Alam et al. | |
| 11,455,494 B2 | 9/2022 | Galitsky | |
| 11,556,698 B2 | 1/2023 | Galitsky | |
| 11,580,298 B2 | 2/2023 | Galitsky | |
| 11,586,827 B2 | 2/2023 | Galitsky | |
| 11,694,037 B2 | 7/2023 | Galitsky | |
| 11,741,316 B2 | 8/2023 | Galitsky | |
| 11,748,572 B2 | 9/2023 | Galitsky | |
| 11,782,985 B2 | 10/2023 | Galitsky | |
| 11,797,773 B2 | 10/2023 | Galitsky | |
| 11,809,825 B2 * | 11/2023 | Galitsky | G06N 20/00 |
| 11,880,652 B2 | 1/2024 | Galitsky | |
| 12,141,177 B2 | 11/2024 | Galitsky | |
| 2001/0007987 A1 | 7/2001 | Gata | |
| 2001/0053968 A1 | 12/2001 | Galitsky et al. | |
| 2002/0040292 A1 | 4/2002 | Marcu | |
| 2002/0046018 A1 | 4/2002 | Marcu et al. | |
| 2002/0107851 A1 | 8/2002 | Beauchamp | |
| 2002/0176151 A1 | 11/2002 | Moon et al. | |
| 2003/0138758 A1 * | 7/2003 | Burstein | G09B 11/00 434/167 |
| 2004/0008416 A1 | 1/2004 | Okuno | |
| 2004/0044519 A1 * | 3/2004 | Polanyi | G06F 40/35 707/E17.058 |
| 2004/0133579 A1 | 7/2004 | Campbell | |
| 2004/0148170 A1 | 7/2004 | Acero et al. | |
| 2004/0158452 A1 * | 8/2004 | Polanyi | G06F 40/253 704/4 |
| 2004/0158453 A1 * | 8/2004 | Polanyi | G06F 40/253 704/4 |
| 2004/0267770 A1 | 12/2004 | Lee | |
| 2005/0049867 A1 | 3/2005 | Deane | |
| 2005/0086592 A1 | 4/2005 | Polanyi et al. | |
| 2005/0108001 A1 | 5/2005 | Aarskog | |
| 2005/0267871 A1 | 12/2005 | Marchisio et al. | |
| 2006/0136352 A1 | 6/2006 | Brun et al. | |
| 2007/0073533 A1 | 3/2007 | Thione et al. | |
| 2007/0106499 A1 | 5/2007 | Dahlgren et al. | |
| 2007/0136284 A1 | 6/2007 | Cobb et al. | |
| 2007/0143098 A1 | 6/2007 | Van Den Berg et al. | |
| 2007/0185859 A1 | 8/2007 | Flowers et al. | |
| 2007/0192306 A1 | 8/2007 | Papakonstantinou et al. | |
| 2007/0208732 A1 | 9/2007 | Flowers et al. | |
| 2007/0239423 A1 | 10/2007 | Miller | |
| 2007/0294229 A1 | 12/2007 | Au | |
| 2008/0091408 A1 | 4/2008 | Roulland et al. | |
| 2008/0172409 A1 | 7/2008 | Botros et al. | |
| 2008/0228467 A1 | 9/2008 | Womack et al. | |
| 2009/0089252 A1 | 4/2009 | Galitsky et al. | |
| 2009/0100053 A1 | 4/2009 | Boschee et al. | |

(56) References Cited

U.S. PATENT DOCUMENTS

| | | |
|---|---|---|
| 2009/0248399 A1 | 10/2009 | Au |
| 2009/0282019 A1 | 11/2009 | Galitsky et al. |
| 2010/0169352 A1 | 7/2010 | Flowers et al. |
| 2010/0169359 A1 | 7/2010 | Barrett et al. |
| 2010/0299136 A1 | 11/2010 | Tong et al. |
| 2011/0119049 A1 | 5/2011 | Ylonen |
| 2011/0153673 A1 | 6/2011 | Boschee et al. |
| 2011/0216792 A1 | 9/2011 | Chann et al. |
| 2011/0282856 A1 | 11/2011 | Ganti et al. |
| 2012/0041950 A1 | 2/2012 | Koll et al. |
| 2012/0078902 A1 | 3/2012 | Duboue et al. |
| 2012/0173500 A1 | 7/2012 | Chakrabarti et al. |
| 2012/0179752 A1 | 7/2012 | Mosley et al. |
| 2012/0240185 A1 | 9/2012 | Kapoor et al. |
| 2012/0246578 A1 | 9/2012 | Baldwin et al. |
| 2012/0254333 A1 | 10/2012 | Chandramouli et al. |
| 2013/0046757 A1 | 2/2013 | Salvetti et al. |
| 2013/0103386 A1 | 4/2013 | Zhang et al. |
| 2013/0124529 A1 | 5/2013 | Jacob |
| 2013/0151347 A1 | 6/2013 | Baldwin et al. |
| 2013/0191416 A1 | 7/2013 | Lee et al. |
| 2013/0204611 A1 | 8/2013 | Tsuchida et al. |
| 2013/0268532 A1 | 10/2013 | Doshi |
| 2013/0311485 A1 | 11/2013 | Khan |
| 2014/0040288 A1 | 2/2014 | Galitsky |
| 2014/0090054 A1 | 3/2014 | Bolzoni et al. |
| 2014/0114649 A1 | 4/2014 | Zuev et al. |
| 2014/0122083 A1 | 5/2014 | Xiaojiang |
| 2014/0136188 A1 | 5/2014 | Wroczynski et al. |
| 2014/0229164 A1 | 8/2014 | Martens et al. |
| 2014/0337257 A1 | 11/2014 | Chatterjee et al. |
| 2015/0039294 A1 | 2/2015 | Howald et al. |
| 2015/0039295 A1 | 2/2015 | Soschen |
| 2015/0046492 A1 | 2/2015 | Balachandran |
| 2015/0051900 A1 | 2/2015 | Kimelfeld et al. |
| 2015/0081277 A1* | 3/2015 | Behi .................. G06F 40/205 704/9 |
| 2015/0134325 A1 | 5/2015 | Skiba et al. |
| 2015/0149461 A1 | 5/2015 | Aguilar Lemarroy et al. |
| 2015/0161200 A1 | 6/2015 | Barba et al. |
| 2015/0161512 A1 | 6/2015 | Byron et al. |
| 2015/0262393 A1 | 9/2015 | Bliss et al. |
| 2015/0278198 A1 | 10/2015 | Andreev |
| 2016/0026608 A1 | 1/2016 | Curin et al. |
| 2016/0034457 A1 | 2/2016 | Bradley et al. |
| 2016/0055240 A1 | 2/2016 | Tur et al. |
| 2016/0063993 A1 | 3/2016 | Dolan et al. |
| 2016/0071517 A1 | 3/2016 | Beaver et al. |
| 2016/0085743 A1 | 3/2016 | Haley |
| 2016/0086601 A1 | 3/2016 | Chotimongkol et al. |
| 2016/0098394 A1 | 4/2016 | Bruno et al. |
| 2016/0099892 A1 | 4/2016 | Palakovich et al. |
| 2016/0148227 A1 | 5/2016 | Choe et al. |
| 2016/0180217 A1 | 6/2016 | Boston et al. |
| 2016/0232152 A1 | 8/2016 | Mahamood |
| 2016/0245779 A1 | 8/2016 | Khalaj Amineh et al. |
| 2016/0246779 A1 | 8/2016 | Ho et al. |
| 2016/0247068 A1 | 8/2016 | Lin |
| 2016/0275573 A1 | 9/2016 | L'Huillier et al. |
| 2016/0283491 A1 | 9/2016 | Lu et al. |
| 2016/0292153 A1 | 10/2016 | Agarwalla et al. |
| 2016/0328667 A1 | 11/2016 | Macciola et al. |
| 2016/0371321 A1 | 12/2016 | Myslinski |
| 2017/0011029 A1 | 1/2017 | Chatterjee et al. |
| 2017/0032053 A1 | 2/2017 | Tourneau |
| 2017/0034107 A1 | 2/2017 | Krishnaswamy et al. |
| 2017/0060831 A1 | 3/2017 | Smythe et al. |
| 2017/0082863 A1 | 3/2017 | Marciante |
| 2017/0104829 A1 | 4/2017 | Degroat |
| 2017/0116982 A1 | 4/2017 | Gelfenbeyn et al. |
| 2017/0161372 A1 | 6/2017 | Fernandez et al. |
| 2017/0177675 A1 | 6/2017 | Beller et al. |
| 2017/0192955 A1 | 7/2017 | Zeichner et al. |
| 2017/0193397 A1 | 7/2017 | Kottha et al. |
| 2017/0228368 A1 | 8/2017 | Carter et al. |
| 2017/0235830 A1 | 8/2017 | Smith et al. |
| 2017/0249389 A1 | 8/2017 | Brovinsky et al. |
| 2017/0277993 A1 | 9/2017 | Beaver et al. |
| 2017/0286390 A1 | 10/2017 | Yashpe et al. |
| 2017/0358295 A1* | 12/2017 | Roux .................. G06N 5/04 |
| 2018/0052818 A1 | 2/2018 | Bethard et al. |
| 2018/0107457 A1 | 4/2018 | Barad et al. |
| 2018/0113939 A1 | 4/2018 | Chen et al. |
| 2018/0121062 A1 | 5/2018 | Beaver et al. |
| 2018/0181648 A1 | 6/2018 | Chen |
| 2018/0189385 A1 | 7/2018 | Sun et al. |
| 2018/0232443 A1 | 8/2018 | Delgo et al. |
| 2018/0260472 A1 | 9/2018 | Kelsey et al. |
| 2018/0314689 A1 | 11/2018 | Wang et al. |
| 2018/0329880 A1 | 11/2018 | Galitsky |
| 2018/0336183 A1 | 11/2018 | Lee et al. |
| 2018/0357221 A1 | 12/2018 | Galitsky |
| 2018/0365228 A1* | 12/2018 | Galitsky .................. G06F 40/35 |
| 2018/0365593 A1 | 12/2018 | Galitsky |
| 2018/0373701 A1 | 12/2018 | McAteer et al. |
| 2019/0005027 A1* | 1/2019 | He .................. G06F 40/35 |
| 2019/0033957 A1 | 1/2019 | Shionozaki |
| 2019/0057157 A1 | 2/2019 | Mandal et al. |
| 2019/0095420 A1 | 3/2019 | Galitsky |
| 2019/0095522 A1 | 3/2019 | Galitsky |
| 2019/0103111 A1 | 4/2019 | Tiwari et al. |
| 2019/0124023 A1 | 4/2019 | Conroy et al. |
| 2019/0135304 A1 | 5/2019 | Kim et al. |
| 2019/0138190 A1 | 5/2019 | Beaver et al. |
| 2019/0163756 A1 | 5/2019 | Bull et al. |
| 2019/0182342 A1 | 6/2019 | Goenka et al. |
| 2019/0236134 A1 | 8/2019 | Galitsky |
| 2019/0295537 A1 | 9/2019 | Sapugay et al. |
| 2019/0354544 A1 | 11/2019 | Hertz et al. |
| 2019/0370604 A1 | 12/2019 | Galitsky |
| 2019/0371299 A1 | 12/2019 | Jiang et al. |
| 2019/0377605 A1 | 12/2019 | Joseph |
| 2020/0004816 A1 | 1/2020 | Kieser et al. |
| 2020/0012720 A1 | 1/2020 | Elson et al. |
| 2020/0027446 A1 | 1/2020 | Ture et al. |
| 2020/0065398 A1 | 2/2020 | Shriber et al. |
| 2020/0082415 A1 | 3/2020 | LaTerza |
| 2020/0099790 A1 | 3/2020 | Ma et al. |
| 2020/0117858 A1 | 4/2020 | Freeman et al. |
| 2020/0151777 A1 | 5/2020 | Casalino et al. |
| 2020/0279075 A1 | 9/2020 | Avedissian |
| 2020/0301589 A1 | 9/2020 | Buzzard et al. |
| 2021/0020165 A1 | 1/2021 | Scodary et al. |
| 2021/0027799 A1 | 1/2021 | Scodary et al. |
| 2021/0029248 A1 | 1/2021 | Scodary et al. |
| 2021/0081607 A1 | 3/2021 | Mitsuda et al. |
| 2021/0110895 A1 | 4/2021 | Shriberg et al. |
| 2021/0150152 A1 | 5/2021 | Galitsky |
| 2021/0357585 A1 | 11/2021 | Surdeanu et al. |

FOREIGN PATENT DOCUMENTS

| | | |
|---|---|---|
| CN | 104871150 A | 8/2015 |
| CN | 105765566 A | 7/2016 |
| CN | 105955956 A | 9/2016 |
| CN | 106021224 A | 10/2016 |
| CN | 106354844 A | 1/2017 |
| CN | 106383875 A | 2/2017 |
| CN | 106502981 A | 3/2017 |
| CN | 108268587 A | 7/2018 |
| CN | 110019745 A | 7/2019 |
| JP | 2001523019 A | 11/2001 |
| JP | 2004139446 A | 5/2004 |
| JP | 2004524559 A | 8/2004 |
| JP | 2005122743 A | 5/2005 |
| JP | 2006260597 A | 9/2006 |
| JP | 2006338457 A | 12/2006 |
| JP | 2006344102 A | 12/2006 |
| JP | 2015109068 A | 6/2015 |
| JP | 2015225415 A | 12/2015 |
| JP | 2017182457 A | 10/2017 |
| JP | 2017224155 A | 12/2017 |
| JP | 2018041336 A | 3/2018 |

(56) References Cited

FOREIGN PATENT DOCUMENTS

| WO | 9921104 A1 | 4/1999 |
|---|---|---|
| WO | 2015003143 A2 | 1/2015 |
| WO | 2015089822 A1 | 6/2015 |

OTHER PUBLICATIONS

Data Loss Prevention Products & Services, Symantec, Available Online at: https://www.symantec.com/products/dataloss-prevention, Accessed from Internet on Aug. 30, 2018, 6 pages.

Malaysia Airlines Flight 17, Wikipedia, Available Online at: https://en.wikipedia.org/wiki/Malaysia_Airlines_Flight_17, Accessed from Internet on: May 3, 2018, pp. 1-38.

Shadow Chairman of Investigative Committee, Crime Russia, Available Online at: https://crimerussia.com/corruption/tenevoy-direktor-skr/, Aug. 25, 2016, 5 pages.

Suicide Bomber Trial: Emails in Full, British Broadcasting Corporation News, Available Online at: news.bbc.co.uk/1/hi/uk/3825765.stm, Nov. 28, 2005, pp. 1-4.

Trump Russia Affair: Key Questions Answered, British Broadcasting Corporation News, Available Online at: http://www.bbc.com/news/world-us-canada-42493918, Jul. 13, 2018, pp. 1-21.

U.S. Appl. No. 15/975,683, Non-Final Office Action mailed on Mar. 19, 2020, 16 pages.

U.S. Appl. No. 15/975,683, Non-Final Office Action mailed on Oct. 31, 2019, 27 pages.

U.S. Appl. No. 15/975,683, Notice of Allowance mailed on Jun. 12, 2020, 17 pages.

U.S. Appl. No. 16/010,091, Non-Final Office Action mailed on Nov. 18, 2019, 26 pages.

U.S. Appl. No. 16/010,091, Notice of Allowance mailed on Mar. 19, 2020, 13 pages.

U.S. Appl. No. 16/260,939, Non-Final Office Action mailed on May 1, 2020, 10 pages.

U.S. Appl. No. 16/260,939, Notice of Allowance mailed on Jun. 12, 2020, 14 pages.

U.S. Appl. No. 16/408,224, Supplemental Notice of Allowability mailed on Apr. 7, 2022, 4 pages.

U.S. Appl. No. 17/003,593, Non-Final Office Action mailed on Feb. 2, 2023, 18 pages.

U.S. Appl. No. 17/003,593, Notice of Allowance mailed on Apr. 17, 2023, 12 pages.

U.S. Appl. No. 17/690,897, Supplemental Notice of Allowance mailed on Sep. 8, 2023, 4 pages.

Allen et al., Analyzing Intention in Utterances, Artificial Intelligence, vol. 15, No. 3, Dec. 1980, pp. 143-178.

Appel et al., A Hybrid Approach to the Sentiment Analysis Problem at the Sentence Level, Knowledge-Based Systems, vol. 108, May 20, 2016, 32 pages.

Bengio et al., A Neural Probabilistic Language Model, Journal of Machine Learning Research, vol. 3, Feb. 3, 2003, pp. 1137-1155.

Blaylock, Managing Communicative Intentions in Dialogue Using a Collaborative Problem-Solving Model, The University of Rochester, Computer Science Department, Technical Report 774, Apr. 2002, 56 pages.

Blaylock et al., Managing Communicative Intentions with Collaborative Problem Solving, Current and New Directions in Discourse and Dialogue, Chapter-4, 2003, pp. 63-84.

Carlson et al., Discourse Tagging Reference Manual, Available Online at: https://www.isi.edu/~marcu/discourse/tagging-ref-manual.pdf, Sep. 11, 2001, pp. 1-87.

Chinese Application No. 201880062996.5, Notice of Decision to Grant mailed on Jul. 10, 2023, 5 pages.

Cohen, Enron Email Dataset, Available Online at: https://www.cs.cmu.edu/~enron/, Jul. 10, 2016, 1 page.

Cohen et al., Intention is Choice with Commitment, Artificial Intelligence, vol. 42, Nos. 2-3, Mar. 1990, pp. 213-261.

Cristea et al., Veins Theory: a Model of Global Discourse Cohesion and Coherence, In C. Boitet & P. Whitelock (Eds.), 17th International Conference on Computational Linguistics, Aug. 1998, pp. 281-285.

De Boni, Using Logical Relevance for Question Answering, Journal of Applied Logic, vol. 5, No. 1, Mar. 2007, pp. 92-103.

Dijkstra, Programming Considered as a Human Activity, Proceedings IFIP Congress, 1965, 7 pages.

Endres-Niggemeyer et al., Summarizing Text for Intelligent Communication, Dagstuhl Seminar Report 79, 1995, 36 pages.

Feng et al., Classifying Arguments by Scheme, Proceedings of the 49th Annual Meeting of the Association for Computational Linguistics, vol. 1, Jun. 19-24, 2011, pp. 987-996.

Feng, RST-Style Discourse Parsing and Its Applications in Discourse Analysis, University of Toronto, Jun. 2015, 89 pages.

Galitsky et al., Finding Maximal Common Sub-Parse Thickets for Multi-Sentence Search, Graph Structures for Knowledge Representation and Reasoning, Jan. 2014, 19 pages.

Galitsky et al., Improving Trust in Automation of Social Promotion, Association for the Advancement of Artificial Intelligence, Jan. 2014, pp. 28-35.

Galitsky et al., Style and Genre Classification by Means of Deep Textual Parsing, Computational Linguistics, and Intellectual Technologies: Proceedings of the International Conference Dialogue 2016, Jun. 1-4, 2016, pp. 1-45.

Galitsky et al., Text Classification Based on Deep Textual Parsing, Available Online at: http://ceur-ws.org/Vol-1886/paper_8.pdf, 2011, 9 pages.

Galitsky et al., Text Integrity Assessment: Sentiment Profile vs Rhetoric Structure, CICLing, Springer International Publishing, Apr. 2015, pp. 126-139.

Galitsky, Using Extended Tree Kernels to Recognize Metalanguage in Text, Studies in Computational Intelligence, Feb. 2017, 25 pages.

Galitsky et al., Using Generalization of Syntactic Parse Trees for Taxonomy Capture on the Web, Proceedings of the 19th International Conference on Conceptual Structures, ICCS, Jul. 25, 2011, pp. 104-117.

Grefenstette et al., Multi-Step Regression Learning for Compositional Distributional Semantics, Proceedings of the 10th International Conference on Computational Semantics, Jan. 30, 2013, 11 pages.

Grefenstette, Towards a Formal Distributional Semantics: Simulating Logical Calculi with Tensors, University of Oxford, Apr. 28, 2013, 10 pages.

Grosz et al., Attention, Intentions, and the Structure of Discourse, Computational Linguistics, vol. 12, No. 3, Jul.-Sep. 1986, pp. 175-204.

Grosz et al., Discourse Analysis, in Understanding Spoken Language, Elsevier North-Holland, 1978, 36 pages.

Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.

Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.

Iruskieta et al., A Qualitative Comparison Method for Rhetorical Structures: Identifying Different Discourse Structures in Multilingual Corpora, Lang Resources & Evaluation, vol. 49, No. 2, May 28, 2014, 47 pages.

Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.

Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

(56) References Cited

OTHER PUBLICATIONS

Joty et al., CODRA: a Novel Discriminative Framework for Rhetorical Analysis, Computational Linguistics, vol. 41, No. 3, Sep. 1, 2015, pp. 385-435.
Joty et al., Combining Intra- and Multi-Sentential Rhetorical Parsing for Document-Level Discourse Analysis, 51st Annual Meeting of the Association for Computational Linguistics, vol. 1, Aug. 9, 2013, pp. 486-496.
Japanese Application No. 2020-562734, Notice of Decision to Grant mailed on Mar. 7, 2023, 3 pages.
Japanese Application No. 2022-191911, Office Action mailed on Jan. 30, 2024, 3 pages.
Jurafsky et al., Speech and Language Processing: an Introduction to Natural Language Processing, Computational Linguistics, and Speech Recognition, Pearson, Prentice Hall, Jan. 26, 2000, pp. 719-761.
Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, 7 pages.
Khan et al., SWIMS: Semi-Supervised Subjective Feature Weighting and Intelligent Model Selection for Sentiment Analysis, Knowledge-Based Systems, vol. 100, May 15, 2016, pp. 97-111.
Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kontos et al., Question Answering and Rhetoric Analysis of Biomedical Texts in the Aroma System, National and Kapodistrian University of Athens, Unpublished Manuscript, 2006, 6 pages.
Levinson, Presumptive Meanings: The Theory of Generalized Conversational Implicature, Cambridge, MA: The Massachusetts Institute of Technology Press, Jan. 2000, pp. 1-10.
Li et al., Recursive Deep Models for Discourse Parsing, Conference: Proceedings of the 2014 Conference on Empirical Methods in Natural Language Processing, Jan. 2014, 10 pages.
Lin et al., Recognizing Implicit Discourse Relations in the Penn Discourse Treebank, Conference: Proceedings of the 2009 Conference on Empirical Methods in Natural Language Processing, vol. 1, Aug. 6-7, 2009, pp. 343-351.
Litman et al., A Plan Recognition Model for Subdialogues in Conversations, Cognitive Science, vol. 11, No. 2, Apr. 1987, pp. 163-200.
Mann, Discourse Structures for Text Generation, Proceedings of the 10th International Conference on Computational Linguistics and 22nd Annual Meeting on Association for Computational Linguistics, Jul. 2-6, 1984, pp. 367-375.
Mann et al., Rhetorical Structure Theory and Text Analysis, University of Southern California, Nov. 1989, 66 pages.
Marcu, The Theory and Practice of Discourse Parsing and Summarization, MIT Press, Nov. 2000, 248 pages.
Mikolov et al., Distributed Representations of Words and Phrases and their Compositionality, Advances in Neural Information Processing Systems, vol. 26, Oct. 16, 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Apr. 11, 2011, pp. 1-22.
Moschitti, Efficient Convolution Kernels for Dependency and Constituent Syntactic Trees, European Conference on Machine Learning, Sep. 2006, pp. 318-329.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
Peldszus et al., From Argument Diagrams to Argumentation Mining in Texts: a Survey, International Journal of Cognitive Informatics and Natural Intelligence, vol. 7, No. 1, Jan. 1, 2013, pp. 1-31.
Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions?, ISSCO Working Paper No. 62, University of Geneva, Nov. 2005, pp. 1-46.
Radev et al., Centroid-Based Summarization of Multiple Documents: Sentence Extraction, Utility-Based Evaluation, 60 and User Studies, Proceedings of the 2000 NAACL-ANLP Workshop on Automatic Summarization—vol. 4, Available Online at: https://doi.org/10.3115/1117575.1117578, Dec. 2000, 10 pages.
Reed et al., Language Resources for Studying Argument, in Proceedings of the Sixth International Conference on Language Resources and Evaluation (LREC'08), Marrakech, Morocco. European Language Resources Association, May 2010, pp. 2613-2618.
Reichman, Getting Computers to Talk Like You and Me, Discourse Context, Focus and Semantics (An ATN Model), Massachusetts Institute of Technology Press, Jul. 1985, 17 pages.
Santhosh et al., Discourse Based Advancement on Question Answering System, International Journal on Soft Computing, Artificial Intelligence and Applications, vol. 1, No. 2, Oct. 2012, pp. 1-12.
Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.
Searle, Speech Acts: an Essay in the Philosophy of Language, Cambridge University Press, Jan. 1969, pp. 22-53.
Socher et al., Learning Continuous Phrase Representations and Syntactic Parsing with Recursive Neural Networks, Proceedings of the NIPS Deep Learning and Unsupervised Feature Learning Workshop, Jan. 2010, pp. 1-9.
Sperber et al., Relevance: Communication and Cognition, Blackwell, Oxford and Harvard University Press, 1986, 331 pages.
Traum et al., Conversation Acts in Task-Oriented Spoken Dialogue, University of Rochester Computer Science, Computational Intelligence, vol. 8, No. 3, Jun. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Tsui, English Conversation, Describing English Language, Oxford University Press, 1994, 37 pages.
Uliyar, A Primer: Oracle Intelligent Bots, Powered by Artificial Intelligence, White Paper, Sep. 2017, pp. 1-28.
Walker et al., Quantitative and Qualitative Evaluation of Darpa Communicator Spoken Dialogue Systems, Proceedings of the 39th Annual Meeting of the Association for Computational Linguistics, Jul. 6-11, 2001, 8 pages.
Wang et al., Summarization Based on Task-Oriented Discourse Parsing, IEEE/ACM Transactions on Audio, Speech, and Language Processing, vol. 23, No. 8, May 13, 2015.
Yessenalina et al., Compositional Matrix-Space Models for Sentiment Analysis, Proceedings of the 2011 Conference on Empirical Methods in Natural Language Processing, Jul. 27-31, 2011, pp. 172-182.
Zanzotto et al., Estimating Linear Models for Compositional Distributional Semantics, Proceedings of the 23rd International Conference on Computational Linguistics (COLING 2010), Aug. 23-27, 2010, pp. 1263-1271.

(56) References Cited

OTHER PUBLICATIONS

Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.
U.S. Appl. No. 17/338,295, Non-Final Office Action mailed on Jul. 5, 2024, 9 pages.
Chinese Application No. 201980030899.2, Office Action mailed on Jul. 1, 2024, 5 pages.
Japanese Application No. 2022-191911, Office Action mailed on Jun. 18, 2024, 2 pages.
Japanese Application No. 2023-060794, Notice of Decision to Grant mailed on Jul. 2, 2024, 3 pages.
2009 Annual Study: Global Cost of a Data Breach, Ponemon Institute, LLC, PGP, Apr. 2010, 36 pages.
Data Loss Prevention, Trend Micro, Available Online at: http://www.trendmicro.co.in/cloud-content/us/pdfs/business/datasheets/ds_data-loss-prevention.pdf, Apr. 2010, pp. 1-2.
Exploring Dialog Management for Bots, Chatbots Magazine, Available Online at: https://chatbotsmagazine.com/exploring-dialog-management-for-bots-cbb8665a2fd3, Jul. 11, 2016, 7 pages.
Frase HubSpot Assistant, Available Online at: https://www.frase.io/?hubspot, Accessed from Internet on Feb. 19, 2021, 12 pages.
Global Security Report 2010, Trustwave, Available Online at: https://www.trustwave.com/Resources/Library/Documents/2010-Trustwave-Global-Security-Report/, 2010, 49 pages.
Sense2vec: Semantic Analysis of the Reddit Hivemind, ExplosionAI, Available online at: https://explosion.ai/demos/sense2vec, Nov. 22, 2019, 10 pages.
Start by Selecting a Make, Available Online at: https://web.archive.org/web/20170823095844/https://www.2carpros.com/, Accessed from Internet on Oct. 14, 2019, 6 pages.
Task Oriented Dialogue Dataset Survey, AtmaHou, Available online at https://github.com/AtmaHou/Task-Oriented-Dialogue-Dataset-Survey, Accessed from Internet on Feb. 2, 2021, 18 pages.
The bAbI Project, Facebook Babi, Available Online at: https://research.fb.com/downloads/babi/, 2019, 6 pages.
Turku NLP Group, Available Online at: http://bionlp-www.utu.fi/wv_demo/, Accessed from Internet on Nov. 4, 2021, 2 pages.
Word to Vec JS Demo, Turbomaze, Available Online at: http://turbomaze.github.io/word2vecjson/, Accessed from Internet on Nov. 4, 2021, 1 page.
U.S. Appl. No. 16/010,123, Non-Final Office Action mailed on Feb. 8, 2021, 30 pages.
U.S. Appl. No. 16/010,123, Notice of Allowance mailed on May 19, 2021, 16 pages.
U.S. Appl. No. 16/145,644, Non-Final Office Action mailed on Apr. 7, 2020, 17 pages.
U.S. Appl. No. 16/145,644, Notice of Allowance mailed on Jul. 16, 2020, 10 pages.
U.S. Appl. No. 16/408,224, Notice of Allowance mailed on Jan. 7, 2022, 9 pages.
U.S. Appl. No. 16/408,224, Supplemental Notice of Allowability mailed on Feb. 15, 2022, 4 pages.
U.S. Appl. No. 16/902,015, Final Office Action mailed on Jun. 9, 2022, 9 pages.
U.S. Appl. No. 16/902,015, First Action Interview Office Action Summary mailed on Mar. 11, 2022, 5 pages.
U.S. Appl. No. 16/902,015, First Action Interview Pilot Program Pre-Interview Communication mailed on Jan. 21, 2022, 5 pages.
U.S. Appl. No. 16/902,015, Notice of Allowance mailed on Oct. 4, 2022, 9 pages.
U.S. Appl. No. 16/995,302, Notice of Allowance mailed on Jan. 7, 2022, 11 pages.
U.S. Appl. No. 17/084,116, First Action Interview Pilot Program Pre-Interview Communication mailed on Sep. 28, 2022, 6 pages.
U.S. Appl. No. 17/084,116, Notice of Allowance mailed on Nov. 30, 2022, 17 pages.
U.S. Appl. No. 17/235,329, Non-Final Office Action mailed on Apr. 13, 2023, 26 pages.
U.S. Appl. No. 17/235,329, Notice of Allowance mailed on Aug. 9, 2023, 5 pages.
U.S. Appl. No. 17/235,329, Supplemental Notice of Allowability mailed on Aug. 30, 2023, 2 pages.
U.S. Appl. No. 17/652,366, Non-Final Office Action mailed on Apr. 17, 2023, 13 pages.
U.S. Appl. No. 17/652,366, Notice of Allowance mailed on Aug. 9, 2023, 5 pages.
U.S. Appl. No. 17/690,897, Corrected Notice of Allowability mailed on Aug. 4, 2023, 4 pages.
U.S. Appl. No. 17/690,897, Non-Final Office Action mailed on Mar. 30, 2023, 15 pages.
U.S. Appl. No. 17/690,897, Notice of Allowance mailed on Jun. 12, 2023, 7 pages.
Alicke et al., Hypocrisy: What counts?, Philosophical Psychology, vol. 26, No. 5, Aug. 25, 2013, 30 pages.
Allan, Automatic Hypertext Link Typing, Digital Library, vol. 778, No. 2, Mar. 1996, pp. 42-52.
Anelli et al., Knowledge-Aware and Conversational Recommender Systems, Proceedings of the 12th ACM Conference on Recommender Systems, Sep. 2018, pp. 521-522.
Banarescu et al., Abstract Meaning Representation for Sembanking, Proceedings of the 7th Linguistic Annotation Workshop & Interoperability with Discourse, Aug. 8-9, 2013, pp. 178-186.
Barden et al., Saying One Thing and Doing Another: Examining the Impact of Event Order on Hypocrisy Judgments of Others, Personality and Social Psychology, vol. 31, No. 11, Dec. 1, 2005, pp. 1463-1474.
Bar-Haim et al., Stance Classification of Context-Dependent Claims, Proceedings of the 15th Conference of the European Chapter of the Association for Computational Linguistics: vol. 1, Apr. 3-7, 2017, pp. 251-261.
Barzilay et al., Modeling Local Coherence: an Entity-Based Approach, Computational Linguistics, vol. 34, No. 1, Mar. 2008, pp. 1-34.
Barzilay et al., Using Lexical Chains for Text Summarization, Proceedings of the ACL/EACL '97 Workshop on Intelligent Scalable Text Summarization, 1997, pp. 10-17.
Bazinska, Explore Word Analogies, Available Online at: https://lamyiowce.github.io/word2viz/, Jan. 7, 2017, 2 pages.
Berkovsky et al., Influencing Individually: Fusing Personalization and Persuasion, ACM Transactions on Interactive Intelligent Systems, vol. 2, No. 2, Jun. 2012, 8 pages.
Bernard et al., The Power of Well-Connected Arguments: Early Sensitivity to the Connective Because, Journal of Experimental Child Psychology, vol. 111, No. 1, Jan. 2012, pp. 128-135.
Bird et al., Natural Language Processing with Python, Analyzing Text with the Natural Language Toolkit, Available Online at: http://www.nltk.org/book_1ed, Jun. 2009, 504 pages.
Bolshakov et al., Synonymous Paraphrasing Using WordNet and Internet, Department of Computer Science and Engineering, Jan. 1970, 12 pages.
Bordes et al., Learning End-to-End Goal-Oriented Dialog, Available Online at: https://arxiv.org/abs/1605.07683, Mar. 30, 2017, 15 pages.
Bridge, Towards Conversational Recommender Systems: a Dialogue Grammar Approach, Conference: 6th European Conference ov Case Based Reasoning, Jan. 2002, pp. 9-22.
Budanitsky et al., Evaluating WordNet-Based Measures of Lexical Semantic Relatedness, Computational Linguistics, vol. 32, No. 1, Mar. 2006, pp. 13-47.
Budzianowski et al., MultiWOZ—A Large-Scale Multi-Domain Wizard-of-Oz Dataset for Task-Oriented Dialogue Modelling, Proceedings of the 2018 Conference on Empirical Methods in Natural Language Processing, Oct. 31-Nov. 4, 2018, pp. 5016-5026.
Cabrio et al., A Natural Language Bipolar Argumentation Approach to Support Users in Online Debate Interactions, Argument and Computation, vol. 4, No. 3, Nov. 26, 2013, pp. 209-230.
Campbell, Chatbot Win Prize by Changing the Subject, New Scientist, vol. 208, No. 2785, Nov. 6, 2010, 1 page.
Chali et al., Complex Question Answering: Unsupervised Learning Approaches and Experiments, Journal of Artificial Intelligence Research, vol. 35, May 2009, pp. 1-47.

(56) References Cited

OTHER PUBLICATIONS

Chen et al., Critiquing-Based Recommenders: Survey and Emerging Trends, User Modeling and User-Adapted Interaction, vol. 22, No. 1, Apr. 2012, pp. 125-150.
Cheng et al., Joint Training for Pivot-Based Neural Machine Translation, Proceedings of the Twenty-Sixth International Joint Conference on Artificial Intelligence (IJCAI-17), Feb. 21, 2017, 7 pages.
Chiarcos et al., Rhetorical Distance Revisited: a Parameterized Approach, Pragmatics & Beyond New Series 172, Apr. 10, 2008, pp. 97-115.
Christakopoulou et al., Towards Conversational Recommender Systems, KDD '16: Proceedings of the 22nd ACM SIGKDD International Conference on Knowledge Discovery and Data Mining, Aug. 13-17, 2016, 10 pages.
Chinese Application No. 201880062996.5, Office Action mailed on Mar. 2, 2023, 17 pages (8 pages of Original Document and 9 pages of English Translation).
Coulmance et al., Trans-Gram, Fast Cross-Lingual Word-Embeddings, Available Online at: https://arxiv.org/pdf/1601.02502.pdf, Jan. 11, 2016, 8 pages.
Crutzen et al., An Artificially Intelligent Chat Agent That Answers Adolescents' Questions Related to Sex, Drugs, and Alcohol: an Exploratory Study, Journal of Adolescent Health, vol. 48, No. 5, May 2011, pp. 1-6.
Dagan et al., Recognizing Textual Entailment: Rational, Evaluation and Approaches, Natural Language Engineering, vol. 15, No. 4, Oct. 2009, pp. i-xvii.
Dung, On the Acceptability of Arguments and Its Fundamental Role in Nonmonotonic Reasoning, Logic Programming and N-Person Games, Artificial Intelligence, vol. 77, No. 2, Sep. 1995, pp. 321-357.
Dunne et al., Computational Models of Argument, Proceedings of Computational Models of Argument, IOS Press, 2006, 353 pages.
Ellsworth et al., Mutaphrase: Paraphrasing with FrameNet, Proceedings of the Workshop on Textual Entailment and Paraphrasing, Available Online at: http://www.icsi.berkeley.edu/pubs/speech/acl07.pdf, Jun. 2007, pp. 143-150.
Elsner et al., You Talking to Me? A Corpus and Algorithm for Conversation Disentanglement, Proceedings of ACL-08: HLT, Jun. 2008, pp. 834-842.
European Application No. 18789298.9, Office Action mailed on Jan. 18, 2022, 8 pages.
European Application No. 19727786.6, Office Action mailed on Apr. 21, 2023, 7 pages.
Faruqui et al., Improving Vector Space Word Representations Using Multilingual Correlation, Proceedings of the 14th Conference of the European Chapter of the Association for Computational Linguistics, Apr. 26-30, 2014, pp. 462-471.
Felfernig et al., Developing Constraint-Based Recommenders, Recommender Systems Handbook, Jan. 2010, pp. 187-215.
Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.
Ferraiolo et al., Role-Based Access Controls, Proceedings of the 15th NIST-NSA National Computer Security Conference, Oct. 13-16, 1992, 11 pages.
Galitsky et al., A Chatbot Demo about a Broken Student, Available Online at: https://drive.google.com/open?id=0B-TymkYCBPsfV3JQSGU3TE9mRVk, 2018.
Galitsky et al., A Novel Approach for Classifying Customer Complaints Through Graphs Similarities in Argumentative Dialogues, Decision Support Systems, vol. 46, No. 3, Feb. 2009, pp. 717-729.
Galitsky et al., Building Dialogue Structure from Discourse Tree of a Question, Proceedings of the 2018 EMNLP Workshop SCAI: The 2nd International Workshop on Search-Oriented Conversational AI, Oct. 31, 2018, pp. 17-23.
Galitsky et al., Building Integrated Opinion Delivery Environment, Proceedings of the Twenty-Fourth International Florida Artificial Intelligence Research Society Conference, Jan. 2011, 6 pages.
Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.
Galitsky et al., Detecting Logical Argumentation in Text via Communicative Discourse Tree, Journal of Experimental & Theoretical Artificial Intelligence, vol. 30, No. 5, May 2018, 29 pages.
Galitsky et al., Discourse-Based Approach to Involvement of Background Knowledge for Question Answering, Proceedings of the International Conference on Recent Advances in Natural Language Processing, Sep. 2-4, 2019, pp. 373-381.
Galitsky, Discovering Rhetorical Agreement Between a Request and Response, Dialogue & Discourse, vol. 8, No. 2, Dec. 21, 2017, pp. 167-205.
Galitsky et al., Extending Tree Kernels Towards Paragraphs, International Journal of Computational Linguistics and Applications, vol. 5, No. 1, Jan.-Jun. 2014, pp. 105-116.
Galitsky et al., From Generalization of Syntactic Parse Trees to Conceptual Graphs, Proceedings of the 18th International Conference on Conceptual structures: From Information to Intelligence, Jul. 26, 2010, pp. 185-190.
Galitsky et al., Inferring the Semantic Properties of Sentences by Mining Syntactic Parse Trees, Data & Knowledge Engineering, vol. 81-82, Nov.-Dec. 2012, 44 pages.
Galitsky et al., Interrupt Me Politely: Recommending Products and Services by Joining Human Conversation, Proceedings of the Workshop on Natural Language Processing in E-Commerce, Dec. 12, 2020, pp. 32-42.
Galitsky, Learning Noisy Discourse Trees, Computational Linguistics and Intellectual Technologies, Proceedings of the International Conference "Dialogue 2017". Available Online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 1-25.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Jan. 2017, pp. 24-50.
Galitsky et al., Matching Sets of Parse Trees for Answering Multi-Sentence Questions, Proceedings of Recent Advances in Natural Language Processing, Sep. 7-13, 2013, pp. 285-293.
Galitsky, Natural Language Understanding with the Generality Feedback, Discrete Mathematics and Theoretical Computer Science Technical Report 99-32, Jun. 1999, pp. 1-21.
Galitsky et al., On a Chat Bot Finding Answers with Optimal Rhetoric Representation, Proceedings of Recent Advances in Natural Language Processing, Nov. 10, 2017, pp. 253-259.
Galitsky et al., On a Chatbot Conducting Dialogue-in-Dialogue, Proceedings of the 20th Annual SIGdial Meeting on Discourse and Dialogue, Sep. 11-13, 2019, pp. 118-121.
Galitsky et al., On a Chatbot Conducting Virtual Dialogues, CIKM '19: Proceedings of the 28th ACM International Conference on Information and Knowledge Management, vol. 4, Nov. 3, 2019, 4 pages.
Galitsky et al., Programming Spatial Algorithms in Natural Language, Natural Language Processing, Jan. 2008, pp. 16-23.
Galitsky, Providing Personalized Recommendation for Attending Events Based on Individual Interest Profiles, Artificial Intelligence Research, vol. 5, No. 1, Apr. 2016, 37 pages.
Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.
Galitsky et al., Text Classification into Abstract Classes Based on Discourse Structure, Proceedings of Recent Advances in Natural Language Processing, Sep. 7-9, 2015, pp. 200-207.

(56) References Cited

OTHER PUBLICATIONS

Garcia-Villalba et al., A Framework to Extract Arguments in Opinion Texts, International Journal of Cognitive Informatics and Natural Intelligence, vol. 6, No. 3, Jul.-Sep. 2012, pp. 62-87.

Glickman et al., Web Based Probabilistic Textual Entailment, Computer Science Department, Available Online at: https://citeseerx.ist.psu.edu/viewdoc/download?doi=10.1.1.125.6555&rep=rep1&type=pdf, Jan. 2005, 4 pages.

Grasso, Playing with RST: Two Algorithms for the Automated Manipulation of Discourse Trees, Text, Speech and Dialogue: Second International Workshop, TSD'99 Plzen, Czech Republic, Lecture Notes in Computer Science, vol. 1692, Sep. 1, 1999, pp. 357-360.

Greenberg, Conversational Experiences: Building Relationships One Conversation at a Time, Social CRM: The Conversation, Oct. 30, 2018, 10 pages.

Gronroos, The Relationship Marketing Process: Communication, Interaction, Dialogue, Value, Journal of Business & Industrial Marketing, vol. 19, No. 2, Mar. 2004, pp. 99-113.

Grosz et al., Centering: a Framework for Modeling the Local Coherence of Discourse, Computational Linguistics, vol. 21, No. 2, Jan. 1995, pp. 203-225.

Gundel et al., Cognitive Status and the Form of Referring Expressions in Discourse, Language, vol. 69, No. 2, Jun. 1993, pp. 274-307.

Hart et al., Text Classification for Data Loss Prevention, Proceedings of the 11th International Conference on Privacy Enhancing Technologies, Jul. 27-29, 2011, 21 pages.

HASIDASemAF: Discourse Structures, Available Online at: http://slideplayer.com/slide/6408486/, 2018, pp. 1-6.

Heerschop et al., Polarity Analysis of Texts Using Discourse Structure, In Proceedings of the 20th ACM International Conference on Information and Knowledge Management, CIKM '11, Oct. 24, 2011, 10 pages.

Hoffman, Financial Report Ontology, Available Online at: http://www.xbrlsite.com/2015/fro/, 2015, 2 pages.

Hogenboom et al., Using Rhetorical Structure in Sentiment Analysis, Communications of the ACM, vol. 58, No. 7, Jul. 2015, pp. 69-77.

Ibeke et al., Extracting and Understanding Contrastive Opinion through Topic Relevant Sentences, Proceedings of the Eighth International Joint Conference on Natural Language Processing, vol. 2, Nov. 27-Dec. 1, 2017, pp. 395-400.

IN202047007045First Examination Report mailed on Mar. 25, 2022, 6 pages.

IN202047043656First Examination Report mailed on Sep. 1, 2022, 6 pages.

Ji et al., Neural Discourse Structure for Text Categorization, Proceedings of the 55th Annual Meeting of the Association for Computational Linguistics, vol. 1, Jul. 30-Aug. 4, 2017, pp. 996-1005.

Ji et al., Representation Learning for Text-Level Discourse Parsing, Association for Computational Linguistics, vol. 1: Long Papers, Available Online at: https://www.aclweb.org/anthology/P14-1002, Jun. 1, 2014, pp. 13-24.

Jijkoun et al., Recognizing Textual Entailment Using Lexical Similarity, Available Online at: https://u.cs.biu.ac.il/~nlp/RTE1/Proceedings/jijkoun_and_de_rijke.pdf, Jan. 2005, 4 pages.

Johnson et al., Procedural Generation of Linguistics, Dialects, Naming Conventions and Spoken Sentences, Proceedings of 1st International Joint Conference of DiGRA and FDG, 2016, pp. 1-9.

Jorgensen et al., Challenges of Studying and Processing Dialects in Social Media, Proceedings of the ACL 2015 Workshop on Noisy User-Generated Text, Jul. 1, 2015, pp. 9-18.

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Japanese Application No. 2020-517950, Notice of Decision to Grant mailed on Nov. 1, 2022, 3 pages.

Japanese Application No. 2020-517950, Office Action mailed on Jul. 12, 2022, 5 pages.

Kan et al., Linear Segmentation and Segment Significance, Department of Computer Science and Center for Research on Information Access, Sep. 15, 1998, 9 pages.

Kelley, An Iterative Design Methodology for User-Friendly Natural Language Office Information Applications, ACM Transaction on Information Systems, vol. 2, No. 1, Mar. 1984, pp. 26-41.

Kerly et al., Bringing Chatbots into Education: Towards Natural Language Negotiation of Open Learner Models, Knowledge-Based Systems, vol. 20, No. 2, Dec. 11, 2006, 14 pages.

Kipper et al., A Large-Scale Classification of English Verbs, Language Resources and Evaluation Journal, vol. 42, Dec. 2008, pp. 21-40.

Koiti, Presentation on Theme: WG2 PWI24617-5 SemAF, Discourse Structure, Berlin HASIDA Koiti AIST, Accessed from Internet on Oct. 14, 2019, 2 pages.

Kostelnik et al., Chatbots for Enterprises: Outlook, Acta Universitatis Agriculturae ET Silviculturae Mendelianae Brunensis, vol. 67, No. 6, Dec. 2019, pp. 1541-1550.

Kovalerchuk et al., Toward Virtual Data Scientist with Visual Means, International Joint Conference on Neural Networks, May 1, 2017, pp. 3073-3080.

Kuyten et al., A Discourse Search Engine Based on Rhetorical Structure Theory, Advances in Information Retrieval: 37th European Conference on IR Research, Lecture Notes in Computer Science, vol. 9022, Mar. 2015, 12 pages.

Kwiatkowski et al., Natural Questions: a Benchmark for Question Answering Research, Transactions of the Association of Computational Linguistics, 2019, 14 pages.

Li et al., DailyDialog: a Manually Labelled Multi-Turn Dialogue Dataset, Proceedings of the Eighth International Joint Conference on Natural Language Processing, Long Papers, vol. 1, Dec. 1, 2017, pp. 986-995.

Lioma et al., Rhetorical Relations for Information Retrieval, Proceedings of the 35th International ACM SIGIR Conference on Research and Development in Information Retrieval, Aug. 12-16, 2012, pp. 931-940.

Lippi et al., Argument Mining from Speech: Detecting Claims in Political Debates, AAAI'16: Proceedings of the Thirtieth AAAI Conference on Artificial Intelligence, Feb. 2016, pp. 2979-2985.

Lo Cascio et al., Grammatica dell'Argomentare: Strategie e Strutture, [A grammar of Arguing: strategiesand structures] Firenze: La Nuova Italia, 1991, pp. 662-663.

Logacheva et al., ConvAI Dataset of Topic-Oriented Human-to-Chatbot Dialogues, The NIPS '17 Competition: Building Intelligent Systems, Sep. 2018, pp. 47-57.

Louis et al., Discourse Indicators for Content Selection in Summaization, SIGDIAL Conference, The Association for Computer Linguistics, Sep. 2010, pp. 147-156.

Lowe et al., On the Evaluation of Dialogue Systems with Next Utterance Classification, Proceedings of the 17th Annual Meeting of the Special Interest Group on Discourse and Dialogue, Sep. 13-15, 2016, pp. 264-269.

Lucas, Computer-Assisted Text Analysis for Comparative Politics, Political Analysis, vol. 23, No. 2, Feb. 4, 2015, pp. 254-277.

Macagno et al., Argumentation Schemes, Handbook of formal argumentation, Cambridge University Press, Aug. 2018, pp. 517-574.

Makhalova et al., Information Retrieval Chatbots Based on Conceptual Models, In Book: Graph-Based Representation and Reasoning, Jun. 2019, pp. 230-238.

Mann et al., Rhetorical Structure Theory: Towards a Functional Theory of Text Organization, Text-Interdisciplinary Journal for the Study of Discourse, vol. 8, No. 3, Jan. 1988, pp. 243-281.

Marir et al., Rhetorical Structure Theory for Content-Based Indexing and Retrieval of Web Documents, ITRE 2004, 2nd International Conference Information Technology: Research and Education, Jun. 28-Jul. 1, 2004, pp. 160-164.

Marks et al., Want Classified Information? Talk to The Chatbot, New Scientist, vol. 223, No. 2980, Aug. 2, 2014, p. 22.

(56) References Cited

OTHER PUBLICATIONS

Mathkoura Novel Rhetorical Structure Approach for Classifying Arabic Security Documents, International Journal of Computer Theory and Engineering, vol. 1, No. 3, Aug. 2009, pp. 195-200.
Matousek et al., Text, Speech and Dialogue, Second International Workshop, TSD'99 Plzen, Czech Republic, Sep. 13-17, 1999, 11 pages.
Maziero et al., Revisiting Cross-Document Structure Theory for Multi-Document Discourse Parsing, Information Processing & Management, vol. 50, No. 2, Mar. 2014, pp. 297-314.
Miceli et al., Emotional and Non-Emotional Persuasion, Applied Artificial Intelligence, Jun. 2006, pp. 1-25.
Mikolov et al., Efficient Estimation of Word Representations in Vector Space, Available Online at: https://arxiv.org/pdf/1301.3781.pdf, Sep. 7, 2013, pp. 1-12.
Miyabe et al., Identifying a Cross-Document Relation Between Sentences, IPSJ SIG Technical Reports, Information Processing Society of Japan, vol. 2005, No. 73, Jul. 2005, 11 pages.
Morato et al., Experiments in Discourse Analysis Impact on Information Classification and Retrieval Algorithms, Information Processing and Management, vol. 39, No. 6, Nov. 2003, pp. 825-851.
Murphy et al., What Makes a Text Persuasive? Comparing Students' and Experts' Conceptions of Persuasiveness, International Journal of Educational Research, vol. 35, pp. 675-698, 2001.
Narducci et al., Improving the User Experience with a Conversational Recommender System, International Conference of the Italian Association for Artificial Intelligence, Nov. 2018, pp. 528-538.
Nguyen et al., A Neural Local Coherence Model, Proceedings of the 55th Annual Meeting of the Association for Computational Linguistics, vol. 1, Jul. 2017, pp. 1320-1330.
International Application No. PCT/US2018/053376, International Preliminary Report on Patentability mailed on Apr. 9, 2020, 12 pages.
International Application No. PCT/US2018/053376, International Search Report and Written Opinion mailed on Feb. 11, 2019, 18 pages.
International Application No. PCT/US2018/053376, Invitation to Pay Additional Fees and Partial Search Report mailed on Dec. 21, 2018, 11 pages.
International Application No. PCT/US2019/031580, International Preliminary Report on Patentability mailed on Nov. 19, 2020, 8 pages.
International Application No. PCT/US2019/031580, International Search Report and Written Opinion mailed on Jul. 5, 2019, 12 pages.
Pennington et al., GloVe: Global Vectors for Word Representation, Proceedings of the 2014 Conference on Empirical Methods in Natural Language Processing (EMNLP), Oct. 25-29, 2014, pp. 1532-1543.
Poesio et al., Centering: a Parametric Theory and Its Instantiations, Computational Linguistics, vol. 30, No. 3, Sep. 1, 2004, pp. 309-363.
Radeva Common Theory of Information Fusion from Multiple Text Sources Step One: Cross-Document Structure, Proceedings of the 1st SIGDial Workshop on Discourse and Dialogue, vol. 10, Oct. 7, 2000, pp. 74-83.
Rajpurkar et al., Know What You Don't Know: Unanswerable Questions for SQuAD, Available Online at: https://arxiv.org/pdf/1806.03822.pdf, Jun. 11, 2018, 9 pages.
Rajpurkar et al., SQuAD: 100,000+ Questions for Machine Comprehension of Text, Proceedings of the Conference on Empirical Methods in Natural Language Processing, Available Online at: https://doi.org/10.18653/v1/D16-1264, Oct. 11, 2016, pp. 2383-2392.
Ritter et al., Data-Driven Response Generation in Social Media, Proceedings of the 2011 Conference on Empirical Methods in Natural Language Processing, Jul. 27-31, 2011, pp. 583-593.
Rose et al., Discourse Processing of Dialogues with Multiple Threads, In Proceedings of the 33rd Annual Meeting of the Association for Computational Linguistics, Jun. 26-30, 1995, pp. 31-38.
Ruder, An Overview of Gradient Descent Optimization Algorithms, Available Online at: https://arxiv.org/pdf/1609.04747.pdf, Jun. 15, 2017, 14 pages.
Sadek et al., A Discourse-Based Approach for Arabic Question Answering, Association for Computing Machinery Transactions on Asian and Low-Resource Language Information Processing, vol. 16, No. 2, Nov. 4, 2016, pp. 1-18.
Sadek et al., Arabic Rhetorical Relations Extraction for Answering "Why" and "How to" Questions, Proceedings of the 17th international Conference on Applications of Natural Language Processing and Information Systems, Jun. 26, 2012, pp. 385-390.
Sakai, Alternatives to Bpref, Proceedings of the 30th Annual International ACM SIGIR Conference on Research and Development in Information Retrieval, Jul. 2007, pp. 71-78.
Schlosser, Can Including Pros and Cons Increase the Helpfulness and Persuasiveness of Online Reviews? The Interactive Effects of Ratings and Arguments, Journal of Consumer Psychology, vol. 21, No. 3, Jul. 2011, pp. 226-239.
Schnabel et al., Evaluation Methods for Unsupervised Word Embeddings, Proceedings of the 2015 Conference on Empirical Methods in Natural Language Processing, Available Online at: https://www.aclweb.org/anthology/D15-1036.pdf, Sep. 17-21, 2015, pp. 298-307.
Schulz et al., A Frame Tracking Model for Memory-Enhanced Dialogue Systems, Available Online at: https://arxiv.org/pdf/1706.01690.pdf, Jun. 6, 2017, 9 pages.
Selivanov, GloVe Word Embeddings, Available Online at: https://cran.rproject.org/web/packages/text2vec/vignettes/glove.html, Feb. 18, 2020, 4 pages.
Seo et al., Online Community Search Using Thread Structure, In Proceedings of the 18th ACM Conference on Information and Knowledge Management, Nov. 2009, 4 pages.
Serban et al., A Survey of Available Corpora for Building Data-Driven Dialogue Systems, Available online at: https://arxiv.org/pdf/1512.05742.pdf, Mar. 21, 2017, 56 pages.
Shaw, 3 Reasons Why People Say One Thing and Do Another, Available Online at: https://beyondphilosophy.com/3-reasons-why-people-say-one-thing-and-do-another/, May 22, 2015, 7 pages.
Sidorov et al., Syntactic N-Grams as Machine Learning Features for Natural Language Processing, Expert Systems with Applications, vol. 41, No. 3, Feb. 15, 2014, pp. 853-860.
Sjoera, The Linguistics Behind Chat Bots, iCapps, Available Online at: http://www.icapps.com/the-linguistics-behind-chatbots/, Feb. 22, 2017, 9 pages.
Somasundaran et al., Supervised and Unsupervised Methods in Employing Discourse Relations for Improving Opinion Polarity Classification, Proceedings of the 2009 Conference on Empirical Methods in Natural Language Processing, Aug. 6-7, 2009, pp. 170-179.
Soricut et al., Sentence Level Discourse Parsing Using Syntactic and Lexical Information, NAACL '03: Proceedings of the 2003 Conference of the North American Chapter of the Association for Computational Linguistics on Human Language Technology—vol. 1, Available Online at: https://www.aclweb.org/anthology/J02-4002, May 27, 2003, pp. 149-156.
Sun et al., Conversational Recommender System, The 41st International ACM SIGIR Conference on Research & Development in Information Retrieval, Available Online at: https://arxiv.org/pdf/1806.03277.pdf, Jul. 8-12, 2018, 10 pages.
Sun et al., Discourse Processing for Context Question Answering Based on Linguistic Knowledge, Knowledge-Based System, vol. 20, No. 6, Aug. 1, 2007, pp. 1-23.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Suwandaratna et al., Discourse Marker Based Topic Identification and Search Results Refining, in Information and Automation for Sustainability (ICIAFs), 5th International Conference, Dec. 2010, pp. 119-125.
Teufel et al., Summarizing Scientific Articles: Experiments with Relevance and Rhetorical Status, Computational Linguistics, vol. 28, No. 4, Dec. 2002, pp. 409-445.

(56) References Cited

OTHER PUBLICATIONS

Thompson et al., A Personalized System for Conversational Recommendations, Journal of Artificial Intelligence Research, vol. 21, No. 1, Mar. 2004, pp. 393-428.
Toulmin, The Uses of Argument, Cambridge at the University Press, 1958, 259 pages.
Tseng et al., Tree-Structured Semantic Encoder with Knowledge Sharing for Domain Adaptation in Natural Language Generation, Available Online at: https://arxiv.org/pdf/1910.06719.pdf, Oct. 2, 2019, 10 pages.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Venkatesh et al., On Evaluating and Comparing Conversational Agents, 31st Conference on Neural Information Processing Systems, Jan. 2018, 10 pages.
Verberne et al., Discourse-Based Answering of Why-Questions, Traitement Automatique des Langues (TAL), vol. 47, No. 2, Sep. 2007, pp. 21-41.
Vorontsov et al., Additive Regularization of Topic Models, Machine Learning, vol. 101, No. 1-3, Oct. 2015, 21 pages.
Walia et al., Semantic Features for Automated Answer Scoring, International Journal if Advance Research in Science and Engineering, vol. 6, No. 10, Oct. 24, 2017, 6 pages.
Walton, Dialogical Models of Explanation, Explanation-Aware Computing: Papers from the Association for the Advancement of Artificial Intelligence Workshop, Technical Report WS-07-06, Association for the Advancement of Artificial Intelligence Workshop Press, Jan. 2007, 9 pages.
Wang et al., A Simple and Generic Belief Tracking Mechanism for the Dialog State Tracking Challenge: on the Believability of Observed Information, Proceedings of the SIGDIAL 2013 Conference, Aug. 22-24, 2013, pp. 423-432.
Wang et al., An Information Retrieval Approach Based on Discourse Type, Proceedings of the 11th International Conference on Applications of Natural Language to Information Systems, May 2006, pp. 197-202.
Wang et al., Kernel Based Discourse Relation Recognition with Temporal Ordering Information, Proceedings of the 48th Annual Meeting of the Association for Computational Linguistics, Jul. 11-16, 2010, pp. 710-719.
Wang et al., Predicting Thread Discourse Structure over Technical Web Forums, Proceedings of the 2011 Conference on Empirical Methods in Natural Language Processing, Jul. 27, 2011, pp. 13-25.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wolf et al., Representing Discourse Coherence: a Corpus-Based Study, Computational Linguistics, vol. 31, No. 2, Jun. 2005, pp. 134-140.
Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, 10 pages.
Young et al., POMDP-Based Statistical Spoken Dialogue Systems: a Review, Proceedings of the IEEE, vol. 101, No. 5, Jan. 9, 2013, pp. 1160-1179.
Yu et al., Detecting User Engagement in Everyday Conversations, Available Online at: https://arxiv.org/pdf/cs/0410027.pdf, Oct. 13, 2004, 4 pages.
ZEILENGALightweight Directory Access Protocol (LDAP) Read Entry Controls, Standards Track, Network Working Group, IETF, RFC 4527, Jun. 2006, 8 pages.
Zhao et al., Application-Driven Statistical Paraphrase Generation, Proceedings of the 47th Annual Meeting of the ACL and the 4th IJCNLP of the AFNLP, Aug. 2-7, 2009, pp. 834-842.
Zhao et al., Joint Syntacto-Discourse Parsing and the Syntacto-Discourse Treebank, Oregon State University, Available Online at: https://arxiv.org/pdf/1708.08484.pdf, Aug. 28, 2017, pp. 2117-2123.
U.S. Appl. No. 18/151,164, Notice of Allowance mailed on Nov. 28, 2023, 8 pages.
U.S. Appl. No. 17/338,295, Notice of Allowance mailed Sep. 29, 2024, eight pages.
BBC Inside Science, Automatic Facebook, Available Online at http://www.bbc.co.uk/programmes/b040Inlf, Apr. 17, 2014, 2 pages.
Data Loss Prevention & Protection, Symantec, Available Online at: http://www.symantec.com/business/theme.jsp?themeid=vontu, Accessed from Internet on Aug. 30, 2018, 6 pages.
Difference in the Way Children with Autism Learn New Behaviors Described, Kennedy Krieger Institute, ScienceDaily, Available online at: www.sciencedaily.com/releases/2009/07/090706113647.htm, Jul. 10, 2009, 2 pages.
Ignore, Deny, Downplay: Accounts of Syrians from Douma Have No Place in Western Narrative, Russia Today, Available Online at: https://www.rt.com/news/425438-douma-witnesses-gas-attack-syria/, Apr. 28, 2018, pp. 1-8.
Language Data, Yahoo Labs, Available Online at: https://webscope.sandbox.yahoo.com/catalog.php?datatype=l&guccounter=1, Accessed Aug. 19, 2019, 5 pages.
One Per Cent, New Scientist, Available Online at http://www.newscientist.com/article/mg22229634.400-one-per-cent.html., Apr. 2, 2014, 4 pages.
Vietnamese Police Detain 8 Suspects in Connection with Illegal Immigration Organizing, People.cn, Available Online at: http://en.people.cn/n3/2019/1104/c90000-9629296.html, Nov. 4, 2019, 1 page.
Welcome to Apache Lucene, Apache Lucene 7.5.0 and Apache Solr 7.5.0, Available Online at: www.lucene.apache.org, Jan. 11, 2018, 38 pages.
U.S. Appl. No. 15/975,685, Non-Final Office Action mailed on Apr. 1, 2020, 23 pages.
U.S. Appl. No. 15/975,685, Non-Final Office Action mailed on Nov. 15, 2019, 23 pages.
U.S. Appl. No. 15/975,685, Notice of Allowance mailed on Jul. 24, 2020, 17 pages.
U.S. Appl. No. 16/010,141, Corrected Notice of Allowability mailed on Oct. 19, 2020, 3 pages.
U.S. Appl. No. 16/010,141, Final Office Action mailed on Jul. 30, 2020, 14 pages.
U.S. Appl. No. 16/010,141, Non-Final Office Action mailed on Feb. 24, 2020, 12 pages.
U.S. Appl. No. 16/010,141, Notice of Allowance mailed on Sep. 1, 2020, 9 pages.
U.S. Appl. No. 16/010,156, Notice of Allowance mailed on Feb. 6, 2020, 13 pages.
U.S. Appl. No. 16/010,156, Notice of Allowance mailed on Nov. 7, 2019, 13 pages.
U.S. Appl. No. 16/142,759, First Action Interview Office Action Summary mailed on Mar. 16, 2021, 6 pages.
U.S. Appl. No. 16/142,759, First Action Interview Pilot Program Pre-Interview Communication mailed on Oct. 6, 2020, 6 pages.
U.S. Appl. No. 16/142,759, Notice of Allowance mailed on Aug. 10, 2021, 8 pages.
U.S. Appl. No. 16/145,702, Corrected Notice of Allowability mailed on Sep. 4, 2020, 3 pages.
U.S. Appl. No. 16/145,702, Final Office Action mailed on May 6, 2020, 19 pages.
U.S. Appl. No. 16/145,702, Final Office Action mailed on Sep. 10, 2019, 25 pages.
U.S. Appl. No. 16/145,702, First Action Interview Office Action Summary mailed on Apr. 29, 2019, 8 pages.
U.S. Appl. No. 16/145,702, First Action Interview Pilot Program Pre-Interview Communication mailed on Feb. 7, 2019, 6 pages.
U.S. Appl. No. 16/145,702, Non-Final Office Action mailed on Feb. 5, 2020, 30 pages.
U.S. Appl. No. 16/145,702, Notice of Allowance mailed on Jul. 1, 2020, 15 pages.
U.S. Appl. No. 16/145,777, Non-Final Office Action mailed on Apr. 3, 2020, 18 pages.

(56) References Cited

OTHER PUBLICATIONS

U.S. Appl. No. 16/145,777, Notice of Allowance mailed on Jul. 15, 2020, 17 pages.
U.S. Appl. No. 16/145,777, Supplemental Notice of Allowability mailed on Sep. 2, 2020, 12 pages.
U.S. Appl. No. 16/240,232, Final Office Action mailed on Oct. 21, 2021, 13 pages.
U.S. Appl. No. 16/240,232, Final Office Action mailed on Apr. 21, 2022, 15 pages.
U.S. Appl. No. 16/240,232, Non-Final Office Action mailed on Apr. 9, 2021, 13 pages.
U.S. Appl. No. 16/240,232, Non-Final Office Action mailed on Jan. 4, 2022, 15 pages.
U.S. Appl. No. 16/260,930, Non-Final Office Action mailed on Aug. 12, 2020, 9 pages.
U.S. Appl. No. 16/260,930, Notice of Allowance mailed on Dec. 16, 2020, 6 pages.
U.S. Appl. No. 16/426,878, Corrected Notice of Allowability mailed on Aug. 12, 2022, 2 pages.
U.S. Appl. No. 16/426,878, Corrected Notice of Allowability mailed on Jun. 23, 2022, 9 pages.
U.S. Appl. No. 16/426,878, Notice of Allowance mailed on May 13, 2022, 10 pages.
U.S. Appl. No. 16/654,258, Non-Final Office Action mailed on Feb. 17, 2022, 33 pages.
U.S. Appl. No. 16/736,517, Non-Final Office Action mailed on Dec. 8, 2021, 17 pages.
U.S. Appl. No. 16/736,517, Notice of Allowance mailed on Feb. 10, 2022, 11 pages.
U.S. Appl. No. 16/789,849, Non-Final Office Action mailed on Feb. 17, 2022, 23 pages.
U.S. Appl. No. 16/789,849, Non-Final Office Action mailed on Jul. 1, 2022, 25 pages.
U.S. Appl. No. 16/789,849, Notice of Allowance mailed on Oct. 26, 2022, 11 pages.
U.S. Appl. No. 16/822,563, Notice of Allowance mailed on Mar. 2, 2022, 16 pages.
U.S. Appl. No. 16/841,200, Notice of Allowance mailed on Apr. 14, 2022, 13 pages.
U.S. Appl. No. 16/998,915, Non-Final Office Action mailed on Jan. 31, 2023, 27 pages.
U.S. Appl. No. 16/998,915, Notice of Allowance mailed on Mar. 30, 2023, 14 pages.
U.S. Appl. No. 17/017,225, Non-Final Office Action mailed on Feb. 2, 2023, 31 pages.
U.S. Appl. No. 17/017,225, Notice of Allowance mailed on May 30, 2023, 17 pages.
U.S. Appl. No. 17/071,608, Non-Final Office Action mailed on Feb. 2, 2023, 25 pages.
U.S. Appl. No. 17/071,608, Notice of Allowance mailed on Jun. 23, 2023, 10 pages.
U.S. Appl. No. 17/823,300, Non-Final Office Action mailed on Mar. 14, 2023, 10 pages.
U.S. Appl. No. 17/823,300, Notice of Allowance mailed on Apr. 4, 2023, 7 pages.
Abbott et al., Internet Argument Corpus 2.0: an SQL Schema for Dialogic Social Media and the Corpora to Go with it, in Language Resources and Evaluation Conference, 2016, pp. 4445-4452.
Abney, Parsing by Chunks, Studies in Linguistics and Philosophy, vol. 44, Springer, Dordrecht, Nov. 10, 1994, 19 pages.
Abro et al., Natural Language Understanding for Argumentative Dialogue Systems in the Opinion Building Domain, Available Online at: arXiv:2103.02691v2 [cs.CL], Feb. 19, 2022, 21 pages.
Airenti et al., Conversation and Behavior Games in the Pragmatics of Dialogue, Cognitive Science, vol. 17, No. 2, Apr. 1993, pp. 197-256.
Ajjour et al., Unit Segmentation of Argumentative Texts, Proceedings of the 4th Workshop on Argument Mining, Sep. 8, 2017, pp. 118-128.
Aker et al., What Works and What Does Not: Classifier and Feature Analysis for Argument Mining, Proceedings of the 4th Workshop on Argument Mining, Sep. 8, 2017, pp. 91-96.
Ariely, Predictably Irrational, 2008, 308 pages.
Arras et al., What is Relevant in a Text Document?: An Interpretable Machine Learning Approach, Public Library of Science One, Available Online at: https://journals.plos.org/plosone/article/fileid=10.1371/journal.pone.0181142&type=printable, Aug. 11, 2017, 23 pages.
Artooras et al., Stanford NLP-VP vs NP, Stack Overflow Website, Mar. 8-9, 2016, 2 pages.
Arya et al., One Explanation Does Not Fit All: a Toolkit and Taxonomy of AI Explainability Techniques, Available Online at: arXiv abs/1909.03012, Sep. 14, 2019, 18 pages.
Auer et al., DBpedia: a Nucleus for a Web of Open Data, International Semantic Web Conference, Lecture Notes in Computer Science, vol. 4825, Nov. 11, 2007, pp. 1-14.
Axelrod, The Evolution of Cooperation, Basic Books, 1984, 9 pages.
Banchs, Movie-DiC: a Movie Dialogue Corpus for Research and Development, Proceedings of the 50th Annual Meeting of the Association for Computational Linguistics, vol. 2, Jul. 8, 2012, pp. 203-207.
Bao et al., Knowledge-based Question Answering as Machine Translation, Association for Computational Linguistics, Jun. 23-25, 2014, pp. 967-976.
Bar-Haim et al., Improving Claim Stance Classification with Lexical Knowledge Expansion and Context Utilization, Proceedings of the 4th Workshop on Argument Mining, Sep. 8, 2017, pp. 32-38.
Baron-Cohen et al., Does the Autistic Child Have a Theory of Mind?, Cognition, vol. 21, No. 1, Oct. 1, 1985, pp. 37-46.
Baroni et al., Argumentation Through a Distributed Self-Stabilizing Approach, Journal of Experimental & Theoretical Artificial Intelligence, vol. 14, No. 4, 2002, pp. 273-301.
Bedi et al., Argumentation-Enabled Interest-Based Personalized Recommender System, Journal of Experimental & Theoretical Artificial Intelligence, vol. 27, No. 2, 2015, pp. 1-45.
Bello et al., Developmental Accounts of Theory-of-mind Acquisition: Achieving Clarity via Computational Cognitive Modeling, In Proceedings of the 28th Annual Conference of the Cognitive Science Society, Jan. 2006, pp. 1014-1019.
Bentahar et al., A Taxonomy of Argumentation Models Used for Knowledge Representation, Artificial Intelligence Review, vol. 33, No. 3, Mar. 2010, 49 pages.
Berzlanovich et al., Coherence Structure and Lexical Cohesion in Expository and Persuasive Texts, Proceedings of the Workshop on Constraints in Discourse III, 2008, 8 pages.
Bhatia et al., Better Document-level Sentiment Analysis from RST Discourse Parsing, Proceedings of the 2015 Conference on Empirical Methods in Natural Language Processing, Sep. 2015, pp. 2212-2218.
Biran et al., Identifying Justifications in Written Dialogs by Classifying Text as Argumentative, International Journal of Semantic Computing, vol. 5, No. 4, Dec. 2011, pp. 363-381.
Biswa, Putt's Law, Peter Principle, Dilbert Principle of Incompetence & Parkinson's Law, Available Online at: http://asmilingassasin.blogspot.com/2015/06/putts-law-peter-principle-dilbert.html, Jun. 10, 2015, 5 pages.
Boguslavsky et al., Multilinguality in ETAP-3: Reuse of Lexical Resources, Proceedings of the Workshop on Multilingual Linguistic Ressources, Aug. 28, 2004, 8 pages.
Bollacker et al., Freebase: a Collaboratively Created Graph Database for Structuring Human Knowledge, Proceedings of the 2008 ACM SIGMOD international conference on Management of data, Jun. 2008, pp. 1247-1250.
Boltuzic et al., Back up your Stance: Recognizing Arguments in Online Discussions, Proceedings of the First Workshop on Argumentation Mining, Jun. 26, 2014, pp. 49-58.
Bordes et al., Question Answering with Subgraph Embeddings, In Proceedings of the 2014 Conference on Empirical Methods in Natural Language Processing EMNLP, Oct. 2014, pp. 615-620.
Borgida et al., Asking Queries About Frames, Proceedings of the 5th International Conference on the Principles of Knowledge Representation and Reasoning, 1996, pp. 340-349.

(56) References Cited

OTHER PUBLICATIONS

Bousquet et al., Introduction to Statistical Learning Theory, Lecture Notes in Artificial Intelligence, vol. 3176, 2004, pp. 175-213.

Bowman et al., Large Annotated Corpus for Learning Natural Language Inference, Available Online at: arXiv preprint arXiv:1508.05326, Aug. 21, 2015, 11 pages.

Boyer et al., MJRTY—A Fast Majority Vote Algorithm, Chapter 5, Automated Reasoning, 1991, pp. 105-117.

Breazeal, A Motivational System for Regulating Human-Robot Interactions, Fifteenth National/tenth Conference on Artificial intelligence/Innovative Applications of Artificial Intelligence, Jul. 1, 1998, 12 pages.

Britt et al., Constructing Representations of Arguments, Journal of Memory and Language, vol. 48, No. 4, May 2003, pp. 794-810.

Buchegger et al., A Case for P2P Infrastructure for Social Networks-Opportunities & Challenges, Proceedings of 6th International Conference on Wireless On-Demand Network Systems and Services, Utah, Feb. 2-4, 2009, 8 pages.

Burke et al., The Intersection of Robust Intelligence and Trust in Autonomous Systems, Association for the Advancement of Artificial Intelligence Spring Symposium, 2014, 102 pages.

Buzing et al., Emerging Communication and Cooperation in Evolving Agent Societies, Journal of Artificial Societies and Social Simulation, vol. 8, No. 1, Available Online at http://jasss.soc.surrey.ac.uk/8/1/2.html, Jan. 31, 2005, 22 pages.

Cabrio et al., Combining Textual Entailment and Argumentation Theory for Supporting Online Debates Interactions, Proceedings of the 50th Annual Meeting of the Association for Computational Linguistics, Jul. 8-14, 2012, pp. 208-212.

Camburu et al., e-SNLI: Natural Language Inference with Natural Language Explanations, Advances in Neural Information Processing Systems, Dec. 6, 2018, 11 pages.

Carlson et al., Building a Discourse-Tagged Corpus in the Framework of Rhetorical Structure Theory, Proceedings of the Second SIGdial Workshop on Discourse and Dialogue, vol. 16, Sep. 1-2, 2001, 10 pages.

Carlson et al., Building a Discourse-Tagged Corpus in the Framework of Rhetorical Structure Theory, Current and New Directions in Discourse and Dialogue, 2003, pp. 85-112.

Carreyrou, Hot Startup Theranos Has Struggled with Its Blood-Test Technology, Available Online at: https://www.wsj.com/articles/theranos-has-struggled-with-blood-tests-1444881901, Oct. 16, 2015, 6 pages.

Carstens et al., Using Argumentation to Improve Classification in Natural Language Problems, Association for Computing Machinery Transactions on Internet Technology, vol. 17, No. 3, Jul. 2017, 23 pages.

Cassell et al., Human Conversation as a System Framework: Designing Embodied Conversational Agents, Embodied Conversational Agents, Dec. 1, 2001, pp. 29-63.

Cassell et al., Negotiated Collusion: Modeling Social Language and Its A. Relationship Effects in Intelligent Agents, User Modeling and Adaptive Interfaces, vol. 13, No. 1-2, Feb. 1, 2003, 34 pages.

Cassimatis, Integrating Cognitive Models Based on Different Computational Methods, Twenty-Seventh Annual Conference of the Cognitive Science Society, vol. 27, 2005, 6 pages.

Castellucci et al., Context-Aware Models for Twitter Sentiment Analysis, Emerging Topics at the First Italian Conference on Computational Linguistics, vol. 1, No. 1, Dec. 2015, pp. 75-89.

Chambers et al., Learning Alignments and Leveraging Natural Logic, In Proceedings of the Association for Computational Linguistics- PASCAL Workshop on Textual Entailment and Paraphrasing, Jun. 28, 2007, 6 pages.

Charolles, Cohesion, Coherence Et Pertinence De Discours, Travaux de Linguistique, vol. 29, 1995, pp. 125-151.

Chen, Understanding Mental States in Natural Language, Proceedings of the 8th International Conference on Computational Semantics, Jan. 2009, pp. 61-72.

Chesnevar et al., Logical Models of Argument, ACM Computing Surveys, vol. 32, No. 4, Dec. 1, 2000, pp. 337-383.

Choi et al., QuAC: Question Answering in Context, Proceedings of the 2018 Conference on Empirical Methods in Natural Language Processing, Oct. 31-Nov. 4, 2018, pp. 2174-2184.

Chinese Application No. 201880030891.1, Office Action mailed on Feb. 16, 2023, 12 pages (9 pages of Original Document and 3 pages of English Translation).

Collins et al., New Ranking Algorithms for Parsing and Tagging: Kernels Over Discrete Structures, and the Voted Perceptron, Proceedings of the 40th Annual Meeting of the Association for Computational Linguistics (ACL), Jul. 2002, pp. 263-270.

Craig et al., Overhearing Dialogues and Monologues in Virtual Tutoring Sessions: Effects on Questioning and Vicarious Learning, International Journal of Artificial Intelligence in Education, Jan. 2000, pp. 242-253.

Croft et al., Search Engines-Information Retrieval in Practice, Pearson Education, 2010, 542 pages.

Damer, Attacking Faulty Reasoning: a Practical Guide to Fallacy-Free Reasoning, Wadsworth Cengage Learning, 2009, 257 pages.

Damonte et al., An Incremental Parser for Abstract Meaning Representation, Proceedings of Equine Analytical Chemistry Laboratory, Apr. 10, 2017, 12 pages.

Damonte et al., Cross-lingual Abstract Meaning Representation Parsing, Available online at: https://arxiv.org/pdf/1704.04539, Feb. 24, 2018, 10 pages.

Das et al., Frame-Semantic Parsing, Computational Linguistics, vol. 40, No. 1, Mar. 2014, pp. 9-56.

De Lara et al., Some Strategies for the Simulation of Vocabulary Agreement in Multi-agent Communities, Journal of Artificial Societies and Social Simulation, vol. 3, No. 4, Available online at: http://www.soc.surrey.ac.uk/JASSS/3/4/2.html, Oct. 31, 2000, 11 pages.

De Mori et al., Spoken Language Understanding, Institute of Electrical and Electronics Engineers Signal Processing Magazine, vol. 25, No. 3, May 2008, pp. 50-58.

De Rosis et al., From Greta's Mind to Her Face: Modelling the Dynamics of Affective States in a Conversational Embodied Agent, International Journal of Human-Computer Studies, vol. 59, Nos. 1-2, Jul. 1, 2003, pp. 81-118.

Denero et al., The Complexity of Phrase Alignment Problems, In Proceedings of Association for Computational Linguistics-08: HLT, Short Papers, Jun. 15-20, 2008, pp. 25-28.

Devillez, Writing: Step by Step, Kendall Hunt, 2003.

Devlin et al., BERT: Pre-Training of Deep Bidirectional Transformers for Language Understanding, Available online at: https://arxiv.org/pdf/1810.04805.pdf, May 24, 2019, 16 pages.

Dias et al., Feeling and Reasoning: a Computational Model for Emotional Characters, EPIA Affective Computing Workshop, Progress in Artificial Intelligence, vol. 3808, Dec. 5, 2005, pp. 127-140.

Dinan et al., Wizard of Wikipedia: Knowledge-Powered Conversational Agents, Available Online at: arXiv:1811.01241v2 [cs.CL], Feb. 21, 2019, 18 pages.

D'Inverno et al., A Formal Specification of dMARS, Intelligent Agents IV: Proceedings of the Fourth International Workshop on Agent Theories, Architectures and Languages, Jul. 24-26, 1997, 22 pages.

Donlon, Robust Intelligence (RI), National Science Foundation, Available Online at: www.nsf.gov/funding/pgm_summ.jsp?pims_id=503305&org=IIS, 2013, 3 pages.

Dosilovic et al., Explainable Artificial Intelligence: a Survey, 41st International Convention on Information and Communication Technology, Electronics and Microelectronics (MIPRO), May 2018, 6 pages.

Du et al., Learning to Ask: Neural Question Generation for Reading Comprehension, Proceedings of the 55th Annual Meeting of the Association for Computational Linguistics, vol. 1, Apr. 29, 2017, 11 pages.

Dwivedi, NLP-Building a Question Answering Model, Towards Data Science, Available Online at: https://towardsdatascience.com/nlp-building-a-question-answering-model-ed0529a68c54, Mar. 29, 2018, 7 pages.

Ebrahim, NLP Tutorial Using Python NLTK (Simple Examples), Dzone, Sep. 24, 2017, pp. 1-10.

(56) References Cited

OTHER PUBLICATIONS

Eckle-Kohler et al., On the Role of Discourse Markers for Discriminating Claims and Premises in Argumentative Discourse, Proceedings of the 2015 Conference on Empirical Methods in Natural Language Processing, Sep. 17-21, 2015, pp. 2236-2242.
Egg et al., Underspecified Discourse Representation, Constraints in Discourse, 2008, pp. 117-138.
Ehrlich et al., Maximum Common Subgraph Isomorphism Algorithms and their Applications in Molecular Science: Review, Wiley Interdisciplinary Reviews: Computational Molecular Science, vol. 1, No. 1, Jan. 21, 2011, pp. 68-79.
European Application No. 18727946.8, Office Action mailed on Dec. 15, 2021, 7 pages.
Fagin et al., Reasoning About Knowledge, The MIT Press, 1996, 75 pages.
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.
Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Feng et al., Text-Level Discourse Parsing with Rich Linguistic Features, Proceedings of the 50th Annual Meeting of the Association for Computational Linguistics, vol. 1, Jul. 8-14, 2012, pp. 60-68.
Feng et al., The Impact of Deep Hierarchical Discourse Structures in the Evaluation of Text Coherence, Proceedings of COLING 2014, the 25th International Conference on Computational Linguistics, Aug. 2014, 10 pages.
Ferretti et al., A Possibilistic Defeasible Logic Programming Approach to Argumentation-Based Decision-Making, Journal of Experimental & Theoretical Artificial Intelligence, vol. 26, No. 4, Jun. 10, 2014, pp. 519-550.
Finn, A Question Writing Algorithm, Journal of Reading Behavior, VII, vol. 4, 1975, pp. 341-367.
Flanigan et al., A Discriminative Graph-Based Parser for the Abstract Meaning Representation, Proceedings of the 52nd Annual Meeting of the Association for Computational Linguistics, Jun. 2014, pp. 1426-1436.
Florou et al., Argument Extraction for Supporting Public Policy Formulation, Proceedings of the 7th Workshop on Language Technology for Cultural Heritage, Social Sciences, and Humanities, Aug. 8, 2013, pp. 49-54.
Foltz et al., The Measurement of Textual Coherence with Latent Semantic Analysis, Discourse Processes, vol. 25, Nos. 2-3, 1998, 31 pages.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Fouad et al., Meta-Agents: Using Multiagent Networks to Manage Dynamic Changes in the Internet of Things, Association for the Advancement of Artificial Intelligence Spring Symposium Series, 2019, 2 pages.
Fox, Discourse Structure and Anaphora: Written and Conversational English, Cambridge University Press, 1987, 19 pages.
Freeley et al., Argumentation and Debate, Critical Thinking for Reasoned Decision Making, Eleventh Edition, vol. 27, No. 3, Jun. 10, 1991, pp. 137-152.
Friederici et al., Verb Argument Structure Processing: the Role of Verb-Specific and Argument-Specific Information, Journal of Memory and Language, vol. 43, No. 3, Oct. 2000, pp. 476-507.
Gabbay, Action, Time and Default, Logical Foundations for Cognitive Agents, 1999, pp. 151-152.
Galitsky, A Computational Simulation Tool for Training Autistic Reasoning About Mental Attitudes, Knowledge-Based Systems, vol. 50, Sep. 2013, 34 pages.

Galitsky, A Demo of a Chatbot for a Virtual Persuasive Dialogue, Persuasive technologies, 14th International Conference, Apr. 9-11, 2019, 98 pages.
Galitsky et al., Accessing Validity of Argumentation of Agents of the Internet of Everything, Artificial Intelligence for the Internet of Everything, Chapter 11, Jan. 2019, pp. 187-216.
Galitsky et al., Argumentation in Text: Discourse Structure Matters, Available Online at: https://nlp.fi.muni.cz/trac/research/raw-attachment/wiki/cs/OCemSeMluvi/paper_15.pdf, 2018, 13 pages.
Galitsky, Assuring Chatbot Relevance at Syntactic Level, Developing Enterprise Chatbots, Apr. 2019, 42 pages.
Galitsky, Building Chatbot Thesaurus, In Developing Enterprise Chatbots, Apr. 2019, pp. 221-252.
Galitsky et al., Building Web Infrastructure for Providing Rating Services and Subscription to Them, Mathematical Modeling, vol. 19, No. 2, 2007, 14 pages.
Galitsky et al., Chatbot Components and Architectures, In Developing Enterprise Chatbots, Springer, 2019, pp. 13-47.
Galitsky et al., Concept-Based Learning of Human Behavior for Customer Relationship Management, Information Sciences, vol. 181, No. 10, May 15, 2011, pp. 2016-2035.
Galitsky et al., Constructing Imaginary Discourse Trees Improves Answering Convergent Questions, Cicling, Apr. 7-13, 2019, 5 pages.
Galitsky, Content Inversion for User Searches and Product Recommendation Systems and Methods, US Patent Application, eBay No. 47088.80, May 9, 2016, 26 pages.
Galitsky, Customers' Retention Requires an Explainability Feature in Machine Learning Systems They Use, 2018 AAAI Spring Symposium Series, 2018, pp. 214-220.
Galitsky, Discourse-Level Dialogue Management, in Developing Enterprise Chatbots: Learning Linguistic Structures, Springer Nature, Apr. 5, 2019, pp. 365-387.
Galitsky et al., Discovering Common Outcomes of Agents' Communicative Actions in Various Domains, Knowledge-Based Systems, vol. 24, No. 2, Mar. 2011, pp. 210-229.
Galitsky et al., Discovering Disinformation: Discourse-Level Approach, Fifteenth Russian National AI Conference, Smolenks Russia, 2016, pp. 23-32.
Galitsky et al., Enabling a Bot with Understanding Argumentation and Providing Arguments, in Developing Enterprise Chatbots, Springer, Apr. 2019, pp. 465-532.
Galitsky, Exhaustive Simulation of Consecutive Mental States of Human Agents, Knowledge-Based Systems, vol. 43, May 2013, 41 pages.
Galitsky et al., Explainable Machine Learning for Chatbots, in Developing Enterprise Chatbots, 2019, pp. 53-83.
Galitsky, Extending the BDI Model to Accelerate the Mental Development of Autistic Patients, Proceedings Second International Conference on Development & Learning, Aug. 7, 2002, 7 pages.
Galitsky et al., How Children with Autism and Machines Learn to Interact, Autonomy and Artificial Intelligence: a Threat or Savior?, Aug. 26, 2017, pp. 195-226.
Galitsky et al., Improving Text Retrieval Efficiency with Pattern Structures on Parse Thickets, Formal Concept Analysis Meets Information Retrieval, ECIR, 2013, 16 pages.
Galitsky, Inductive Learning of Dispute Scenarios for Online Resolution of Customer Complaints, 3rd International Institute of Electrical and Electronics Engineers Conference Intelligent Systems, Sep. 2006, pp. 103-108.
Galitsky et al., Justification of Customer Complaints Using Emotional States and Mental Actions, Proceedings of the Seventeenth International Florida Artificial Intelligence Research Society Conference, Miami Beach, Florida, USA, Jan. 2004, 6 pages.
Galitsky et al., Learning Adversarial Reasoning Patterns in Customer Complaints, Workshop at AAAI, (WS-11-06), Jan. 1, 2011, pp. 2-9.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Discourse-Level Structures for Question Answering, in Developing Enterprise Chatbots: Learning Linguistic Structures, Apr. 2019, pp. 177-220.

(56) References Cited

OTHER PUBLICATIONS

Galitsky et al., Mining the Blogosphere for Contributor's Sentiments, American Association for Artificial Intelligence, Jan. 2006, 3 pages.
Galitsky, Natural Language Question Answering System: Technique of Semantic Headers, Advanced Knowledge International, vol. 2, Apr. 2003, 333 pages.
Galitsky, On a Chatbot Conducting a Virtual Social Dialogue, 28th Association for Computing Machinery International Conference, Nov. 2019, 9 pages.
Galitsky et al., Parse Thicket Representations for Answering Multi-Sentence Search, International Conference on Conceptual Structures, vol. 7735, Jan. 2013, 13 pages.
Galitsky, Reasoning About Attitudes of Complaining Customers, Knowledge-Based Systems, vol. 19, No. 7, Nov. 1, 2006, pp. 592-615.
Galitsky, Recommendation by Joining a Human Conversation, Artificial Intelligence for Customer Relationship Management: Solving Customer Problems, Dec. 24, 2020, pp. 63-92.
Galitsky, Rhetorical Agreement: Maintaining Cohesive Conversations, Springer Nature, Apr. 2019, pp. 327-360.
Galitsky et al., Simulating the Conflict Between Reputation and Profitability for Online Rating Portals, Journal of Artificial Societies and Social Simulation vol. 8, No. 2, Mar. 2005, 21 pages.
Galitsky et al., Team Formation by Children with Autism, Research Gate, Available Online at: https://www.researchgate.net/publication/283023160, Jan. 2015, 10 pages.
Ganter et al., Pattern Structures and Their Projections, International Conference on Conceptual Structures, Jul. 30-Aug. 3, 2001, 16 pages.
Ghosh et al., Analyzing Argumentative Discourse Units in Online Interactions, Proceedings of the First Workshop on Argumentation Mining, Jun. 26, 2014, pp. 39-48.
Golightly et al., Writing and Reading in the Disciplines, Pearson Custom Publishing, 2000.
Goutsos, Modeling Discourse Topic: Sequential Relations and Strategies in Expository Text, Text, vol. 16, No. 4, Dec. 1, 1996, pp. 501-533.
Grasso, Characterising Rhetorical Argumentation, Heriot-watt University, Department of Computing & Electrical Engineering, Jun. 2003, 235 pages.
Grosz, Collaborative Plans for Complex Group Action, Artificial Intelligence, vol. 86, No. 2, Oct. 1, 1996, pp. 269-357.
Grudin, The Rise of Incompetence, Association for Computing Machinery Interactions, Available Online at: https://interactions.acm.org/archive/view/january-february-2016/the-rise-of-incompetence, Jan.-Feb. 2016, 2 pages.
Guo et al., A Deep Relevance Matching Model for Ad-Hoc Retrieval, In Proceedings of the 25th ACM International on Conference on Information and Knowledge Management, Oct. 24-28, 2016, 11 pages.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hall et al., The Weka Data Mining Software: an Update, Special Interest Group on Knowledge Discovery and Data Mining, Explorations Newsletter, vol. 11, No. 1, Available Online at: http://dx.doi.org/10.1145/1656274.1656278, Jun. 2009, pp. 10-18.
Halliday et al., Cohesion in English, vol. 14, No. 1, 1980, pp. 47-50.
Hara et al., Exploring Difficulties in Parsing Imperatives and Questions, Proceedings of the 5th International Joint Conference on Natural Language Processing, Nov. 8-13, 2011, pp. 749-757.
Haussler, Convolution Kernels on Discrete Structures UCSC-CRL-99-10, University of California, Santa Barbara Technical Report, Jul. 8, 1999, 38 pages.
Hayes et al., The Future of Social Media Entertainment, Available Online at: http://www.personalizemedia.com/the-future-of-social-media-entertainment-slides/., Oct. 26, 2008, 6 pages.

Heilman et al., Good Question! Statistical Ranking for Question Generation, Human Language Technologies: The 2010 Annual Conference of the North American Chapter of the Association for Computational Linguistics, Jun. 2, 2010, pp. 609-617.
Hobbs, Coherence and Coreference, Cognitive Science, vol. 3, No. 1, Jan.-Mar. 1979, pp. 67-90.
Hogenboom et al., Polarity Classification Using Structure-Based Vector Representations of Text, Decision Support Systems, vol. 74, Jun. 1, 2015, 18 pages.
Ilvovsky, Going Beyond Sentences When Applying Tree Kernels, Proceedings of the Student Research Workshop, vol. 20, No. 4, Jun. 22-27, 2014, pp. 56-63.
Indian Application No. 201947044096, First Examination Report mailed on Jan. 13, 2022, 5 pages.
Indian Application No. 202047007447, First Examination Report mailed on Sep. 9, 2021, 6 pages.
Indian Application No. 202047028577, First Examination Report mailed on May 17, 2022, 7 pages.
Izquierdo et al., Appearances Can Be Deceiving: Lessons Learned Re-Implementing Axelrod's Evolutionary Approach to Norms, Journal of Artificial Societies and Social Simulation, vol. 8, No. 3, Available Online at http://jasss.soc.surrey.ac.uk/8/3/2.html, Jun. 30, 2005, 25 pages.
Jansen et al., Worldtree: a Corpus of Explanation Graphs for Elementary Science Questions Supporting Multi-Hop Inference, CoRR, abs/1802.03052, 2018, 9 pages.
Jasinskaja et al., Rhetorical Relations, on the Coherence and Structure of Discourse, Available at: https://sfb1252.uni-koeln.de/sites/sfb_1252/user_upload/Pdfs_Publikationen/Jasinskaja_Karagjosova_accepted_Rhetorical_Relations_draft.pdf, Aug. 13, 2015, pp. 1-23.
Ji et al., An Information Retrieval Approach to Short Text Conversation, Available Online at: arXiv:1408.6988v1 [cs.IR], Aug. 29, 2014, 21 pages.
Jiang et al., Semantic Similarity Based on Corpus Statistics and Lexical Taxonomy, in Proceedings of International Conference Research on Computational Linguistics, Aug. 1997, 15 pages.
Jindal et al., Opinion Spam and Analysis, Proceeding WSDM '08 Proceedings of the 2008 International Conference on Web Search and Data Mining, Feb. 11, 2008, pp. 219-229.
Joachims et al., Cutting-Plane Training of Structural SVMs, Machine Learning, vol. 77, No. 1, May 9, 2009, pp. 27-59.
John et al., Estimating Continuous Distributions in Bayesian Classifiers, Proceedings of the Eleventh Conference on Uncertainty in Artificial Intelligence, Aug. 18, 1995, 8 pages.
Japanese Application No. 2021-206038, Office Action mailed on Jul. 25, 2023, 2 pages.
Japanese Application No. 2021-206038, Office Action mailed on Jan. 24, 2023, 5 pages.
Japanese Application No. 2022-092790, Office Action mailed on Jul. 25, 2023, 2 pages.
Japanese Application No. 2022-092790, Office Action mailed on Jan. 24, 2023, 3 pages.
Kaiser et al., The Visual Perception of Motion by Observers with Autism Spectrum Disorders: a Review and Synthesis, Psychonomic Bulletin and Review, vol. 16, No. 15, Oct. 2009, pp. 761-777.
Kaminka et al., Flexible Teamwork in Behavior-based Robots, Proceedings, The Twentieth National Conference on Artificial Intelligence and the Seventeenth Innovative Applications of Artificial Intelligence Conference, Jul. 9-13, 2005, pp. 108-113.
Kaminka et al., Robust Multi Agent Teams via Socially-Attentive Monitoring, Journal of Artificial Intelligence Research, vol. 12, No. 1, Feb. 1, 2000, pp. 105-147.
Kapoor et al., Algorithms for Generating All Spanning Trees of Undirected and Weighted Graphs, Siam J. Computer, vol. 24, No. 2, Apr. 1, 1995, pp. 461-472.
Keltner et al., Understanding Emotions, Third Edition, Wiley & Co., Feb. 1996, 521 pages.
Kennedy et al., Like-me Simulation as an Effective and Cognitively Plausible Basis for Social Robotics, International Journal of Social Robotics, vol. 1, No. 2, Feb. 24, 2009, pp. 181-194.
Khardon et al., The Subsumption Lattice and Query Learning, Journal of Computer and System Sciences, vol. 72, No. 1, Feb. 2006, pp. 72-94.

(56) References Cited

OTHER PUBLICATIONS

Kittredge et al., An Advanced English Grammar with Exercises, The Athenaeum Press, 1913, 266 pages.

Klenner, A Model for Multi-Perspective Opinion Inferences, Proceedings of IJCAI Workshop Natural Language Meets Journalism, Jul. 9, 2016, pp. 6-11.

Kocisky et al., The NarrativeQA Reading Comprehension Challenge, Transactions of the Association for Computational Linguistics, vol. 6, May 2018, pp. 317-328.

Kohavi, A Study of Cross-Validation and Bootstrap for Accuracy Estimation and Model Selection, Proceedings of the 14th International Joint Conference on Artificial Intelligence, vol. 2, Aug. 20, 1995, 7 pages.

Kon, Are Simple Business Request Letters Really Simple? A Comparison of Chinese and English Business Request Letters, Text-Interdisciplinary Journal for the Study of Discourse, vol. 18, No. 1, Jan. 1, 1998, pp. 103-141.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Krakovna et al., Increasing the Interpretability of Recurrent Neural Networks Using Hidden Markov Models, ICML Workshop on Human Interpretability in Machine Learning, Sep. 30, 2016, pp. 46-50.

Krishna et al., Automatic Generation and Insertion of Assessment Items in Online Video Courses, Proceedings of the 20th International Conference on Intelligent User Interfaces Companion, Mar. 29-Apr. 1, 2015, pp. 1-4.

Kuchaiev et al., Topological Network Alignment Uncovers Biological Function and Phylogeny, Journal of the Royal Society Interface, vol. 7, Mar. 24, 2010, pp. 1341-1354.

Kumar et al., A Framework for Automatic Question Generation from Text using Deep Reinforcement Learning, Proceedings of the 2019 IJCAI Workshop SCAI: The 4th International Workshop on Search-Oriented Conversational AI, Aug. 3, 2019, 7 pages.

Kushman et al., Learning to Automatically Solve Algebra Word Problems, Proceedings of the 52nd Annual Meeting of the Association for Computational Linguistics, Jun. 23-25, 2014, pp. 271-281.

Kuyten et al., Fully Automated Generation of Question-Answer Pairs for Scripted Virtual Instruction, International Conference on Intelligent Virtual Agents, Sep. 12, 2012, pp. 1-14.

Kwiatkowski et al., Scaling Semantic Parsers With on-the-fly Ontology Matching, Empirical Methods in Natural Language Processing, Oct. 18-21, 2013, pp. 1545-1556.

Kwon et al., Identifying and Classifying Subjective Claims, The Proceedings of the 8th Annual International Digital Government Research Conference, May 20-23, 2007, pp. 76-81.

Lake et al., Human-Level Concept Learning Through Probabilistic Program Induction, Science, vol. 350, No. 6266, Dec. 11, 2015, pp. 1332-1338.

Lan et al., Albert: A Lite BERT for Self-Supervised Learning of Language Representations, in Conference Paper at ICLR 2020, Feb. 9, 2020, pp. 1-17.

Larsson et al., Information State and Dialogue Management in the TRINDI Dialogue Move Engine Toolkit, Natural Language Engineering, vol. 6, Nos. 3-4, Sep. 2000, pp. 323-340.

Lavie et al., METEOR: an Automatic Metric for MT Evaluation with High Levels of Correlation with Human Judgments, Proceedings of the Second Workshop on Statistical Machine Translation, Jun. 2007, 4 pages.

Lawless et al., AI and the Mitigation of Error: a Thermodynamics of Teams, Association for the Advancement of Artificial Intelligence Spring Symposia, Mar. 2016, 8 pages.

Lawless et al., Robust Intelligence (RI) Under Uncertainty: Mathematical Foundations of Autonomous Hybrid (Human-Machine-Robot) Teams, Organizations and Systems, Structure and Dynamics, vol. 6, No. 2, 2013, 35 pages.

Lawrence et al., Combining Argument Mining Techniques, Working Notes of the 2nd Argumentation Mining Workshop, Jun. 4, 2015, pp. 127-136.

Lawrence et al., Mining Argumentative Structure from Natural Language Text Using Automatically Generated Premise-Conclusion Topic Models, Proceedings of the 4th Workshop on Argument Mining, Sep. 8, 2017, pp. 39-48.

Lee, Genres, Registers, Text Types, Domain, and Styles: Clarifying the Concepts and Navigating a Path Through the BNC Jungle, Language Learning & Technology, vol. 5, No. 3, Sep. 2001, pp. 37-72.

Levchuk et al., Active Inference in Multiagent Systems: Context-driven Collaboration and Decentralized Purpose-driven Team Adaptation, Artificial Intelligence for the Internet of Everything, Jan. 2019, 9 pages.

Levesque et al., Golog: a Logic Programming Language for Dynamic Domains, Journal of Logic Programming, vol. 31, No. 1-3, Apr.-Jun. 1997, pp. 59-83.

Li et al., A Diversity-Promoting Objective Function for Neural Conversation Models, Available Online at: arXiv:1510.03055v3 [cs.CL], Jun. 10, 2016, 11 pages.

Li et al., Adversarial Learning for Neural Dialogue Generation, Available Online at: https://www.aclweb.org/anthology/D17-1230.pdf, Sep. 24, 2017, 13 pages.

Li et al., Annotating the Little Prince with Chinese AMRs, LAW-2016, Berlin, Germany, Aug. 11, 2016, 9 pages.

Li et al., Chinese Abstract Meaning Representation, Available online at: https://catalog.ldc.upenn.edu/LDC2021T13, 2019, 2 pages.

Li et al., Deep Reinforcement Learning for Dialogue Generation, Proceedings of the 2016 Conference on Empirical Methods in Natural Language Processing, Nov. 1-5, 2016, pp. 1192-1202.

Li et al., Dialogue History Matters! Personalized Response Selection in Multi-Turn Retrieval-Based Chatbots, Available Online at: https://arxiv.org/abs/2103.09534, Mar. 17, 2021, 25 pages.

Li et al., Shifting Matrix Management: a Model for Multi-agent Cooperation, Engineering Applications of Artificial Intelligence, vol. 16, No. 3, Apr. 1, 2003, pp. 191-201.

Liang, Lambda Dependency-Based Compositional Semantics, Technical report, Available Online at: https://arxiv.org/pdf/1309.4408.pdf, Sep. 19, 2013, 7 pages.

Lin et al., A PDTB-Styled End-to-End Discourse Parser, Natural Language Engineering, vol. 20, No. 2, Apr. 2014, pp. 151-184.

Ling et al., Program Induction by Rationale Generation: Learning to Solve and Explain Algebraic Word Problems, CoRR, abs/1705.04146, Oct. 23, 2017, 10 pages.

Lippi et al., Argumentation Mining: State of the Art and Emerging Trends, ACM Transactions on Internet Technology, vol. 16, No. 2, Article 10, Mar. 2016, pp. 1-25.

Lippi et al., MARGOT: a Web Server for Argumentation Mining, Expert Systems with Applications, vol. 65, Dec. 2016, pp. 292-303.

Lisetti, Embodied Conversational Agents for Psychotherapy, CHI 2008 Workshop on Technology in Mental Health, vol. 5, No. 3, Jul. 31, 2008, 12 pages.

Liu et al., How NOT to Evaluate Your Dialogue System: an Empirical Study of Unsupervised Evaluation Metrics for Dialogue Response Generation, Proceedings of the Conference on Empirical Methods in Natural Language Processing, Jan. 3, 2017, 15 pages.

Liu et al., ROBERTa: a Robustly Optimized BERT Pretraining Approach, Available Online at: https://arxiv.org/abs/1907.11692, Jul. 26, 2019, 13 pages.

Liu et al., Towards Better Analysis of Deep Convolutional Neural Networks, Institute of Electrical and Electronics Engineers Transactions on Visualization and Computer Graphics, vol. 23, No. 1, May 2016, pp. 1-10.

Lowe et al., The Ubuntu Dialogue Corpus: a Large Dataset for Research in Unstructured Multi-Turn Dialogue Systems, in Proceedings of the 16th Annual Meeting of the Special Interest Group on Discourse and Dialogue, Feb. 4, 2016, 10 pages.

Luan et al., LSTM based Conversation Models, Department of Electrical Engineering, University of Washington, Mar. 31, 2016, 5 pages.

(56) References Cited

OTHER PUBLICATIONS

Lyons et al., Trust and Human-Machine Teaming: a Qualitative Study, Artificial Intelligence for the Internet of Everything, 2019, pp. 101-116.
MacCartney et al., A Phrase-Based Alignment Model for Natural Language Inference, Conference on Empirical Methods in Natural Language Processing, Oct. 25, 2008, pp. 802-811.
Macewan, The Essentials of Argumentation, D. C. Heath, 1898, 474 pages.
Makhalova et al., Pattern Structures for News Clustering, Proceedings of the 4th International Conference on What can FCA do for Artificial Intelligence, vol. 1430, Jul. 2015, pp. 35-42.
Mann et al., Rhetorical Structure Theory: Description and Construction of Text Structures, University of Southern California, Oct. 1986, 22 pages.
Mansilla et al., Asknext: an Agent Protocol for Social Search, Information Sciences, vol. 190, May 1, 2012, pp. 144-161.
Mansilla et al., Automation of Social Networks with QA Agents, Proceedings of 9th International Conference on Autonomous Agents and Multi-Agent Systems, AAMAS, Jan. 2010, pp. 1437-1438.
Marcu et al., An Unsupervised Approach to Recognizing Discourse Relations, Proceedings of the 40th Annual Meeting of the Association for Computational Linguistics (ACL), Jul. 2002, 8 pages.
Marcu, From Discourse Structures to Text Summaries, Proceedings of the ACL Workshop on Intelligent Scalable Text Summarization, 1997, pp. 82-88.
Markle-Huss et al., Improving Sentiment Analysis with Document-Level Semantic Relationships from Rhetoric Discourse Structures, 50th Hawaii International Conference on System Sciences, Jan. 2017, pp. 1142-1151.
May et al., SemEval-2017 Task 9: Abstract Meaning Representation Parsing and Generation, Proceedings of the 11th International Workshop on Semantic Evaluation, Aug. 3-4, 2017, pp. 536-545.
McCarthy, Making Robots Conscious of Their Mental States, Proceedings of Machine Intelligence Conference 15, Jul. 1995, 8 pages.
McNamara et al., Are Good Texts Always Better? Interactions of Text Coherence, Background Knowledge, and Levels of Understanding in Learning from Text, Cognition and Instruction, vol. 14, No. 1, Mar. 1996, pp. 1-43.
Mercier et al., Why Do Humans Reason? Arguments for an Argumentative Theory, Behavioral and Brain Sciences, vol. 34, No. 2, Apr. 2011, pp. 57-111.
Milenkovic et al., Uncovering Biological Network Function via Graphlet Degree Signatures, Cancer Informatics, vol. 6, Apr. 14, 2008, pp. 257-273.
Mitkov et al., A Computer-Aided Environment for Generating Multiple-Choice test items, Natural Language Engineering, vol. 12, No. 2, Jun. 2006, pp. 177-194.
Mittu et al., Introduction to the Symposium on AI and the Mitigation of Human Error, Association for the Advancement of Artificial Intelligence Spring Symposia, Mar. 2016, 4 pages.
Moens et al., Argumentation Mining: Where are We Now, Where Do We Want to Be and How Do We Get There?, FIRE '12 & '13: Post-Proceedings of the 4th and 5th Workshops of the Forum for Information Retrieval Evaluation, No. 2, Dec. 2013, pp. 1-6.
Moens et al., Automatic Detection of Arguments in Legal Texts, Proceedings of the 11th International Conference on Artificial Intelligence and Law, ICAIL 2007, Jun. 4-8, 2007, pp. 225-230.
Molnar, Interpretable Machine Learning. A Guide for Making Black Box Models Explainable, Available online at: https://christophm.github.io/interpretable-ml-book/, Aug. 14, 2018, 185 pages.
Montaner et al., A Taxonomy of Recommender Agents on the Internet, Artificial Intelligence Review, vol. 19, No. 4, Jun. 1, 2003, pp. 285-330.
Moskowitz et al., Human Caused Bifurcations in a Hybrid Team—a Position Paper, Association for the Advancement of Artificial Intelligence Spring Symposia, 2016, 4 pages.
Mozina et al., Argument Based Machine Learning from Examples and Text, First Asian Conference on Intelligent Information and Database Systems, Apr. 2009, pp. 18-23.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International Association for the Advancement of Artificial Intelligence Conference on Weblogs and Social Media, Jan. 2013, pp. 409-418.
Nakamura et al., Another Diversity-Promoting Objective Function for Neural Dialogue Generation, Association for the Advancement of Artificial Intelligence, Nov. 21, 2018, 8 pages.
Narasimhan, Nvidia Clocks Worlds Fastest Bert Training Time and Largest Transformer Based Model, Paving Path for Advanced Conversational AI, nVIDIA Developer Blog, Available Online at: https://developer.nvidia.com/blog/training-bert-with-gpus/, Aug. 13, 2019, 5 pages.
Novikova et al., Why We Need New Evaluation Metrics for NLG, Proceedings of the 2017 Conference on Empirical Methods in Natural Language Processing, Available Online at: http://aclanthology.lst.uni-saarland.de/D17-1238.pdf, Sep. 7-11, 2017, pp. 2241-2252.
Olivia et al., Case-based BDI Agents: an Effective Approach for Intelligent Search on the World Wide Web, Intelligent Agents in Cyberspace, Jan. 1999, pp. 20-27.
Oppong, What Was I Thinking? (The Science of Systematic Irrationality), Available Online at: https://medium.com/kaizen-habits/what-was-i-thinking-the-science-of-systematic-irrationality-e053e5476fcf, Oct. 25, 2018, 6 pages.
Oraby et al., And That's a Fact: Distinguishing Factual and Emotional Argumentation in Online Dialogue, Proceedings of the 2nd Workshop on Argumentation Mining, Jun. 4, 2015, pp. 116-126.
O'Reilly et al., Reversing the Reverse Cohesion Effect: Good Texts Can Be Better for Strategic, High-Knowledge Readers, Discourse Processes, vol. 43, No. 2, Dec. 5, 2007, pp. 121-152.
Ospina et al., Eliciting the Patient's Agenda-Secondary Analysis of Recorded Clinical Encounters, Journal of General Internal Medicine, vol. 34, No. 1, Jul. 2018, pp. 36-40.
Ourioupina et al., Application of Default Reasoning to Semantic Processing Under Question-Answering, DIMACS Tech Report 16, May 2001, pp. 1-22.
Ouyang et al., Improving Recommendation by Deep Latent Factor-Based Explanation, Associated for the Advancement of Artificial Intelligence, 2020, 9 pages.
Palmer, SemLink: Linking PropBank, VerbNet and FrameNet, Proceedings of the Generative Lexicon Conference, GL 2009, Sep. 17, 2009, 54 pages.
Papineni et al., BLEU: a Method for Automatic Evaluation of Machine Translation, Proceedings of the 40th Annual Meeting on Association for Computational Linguistics, Jul. 2002, pp. 311-318.
Parameswaran, Emotions in Intelligent Agents, FLAIRS-02 Proceedings, May 14-16, 2001, pp. 82-86.
Paranjape et al., Human-Like Informative Conversations: Better Acknowledgements Using Conditional Mutual Information, Available Online at: arXiv:2104.07831v1 [cs.CL], Apr. 16, 2021, 14 pages.
Park et al., Multimodal Explanations: Justifying Decisions and Pointing to the Evidence, CoRR, abs/1802.08129, Feb. 15, 2018, 11 pages.
International Application No. PCT/US2018/031890, International Preliminary Report on Patentability mailed on Nov. 21, 2019, 9 pages.
International Application No. PCT/US2018/031890, International Search Report and Written Opinion mailed on Aug. 17, 2018, 12 pages.
International Application No. PCT/US2018/053392, International Preliminary Report on Patentability mailed on Apr. 9, 2020, 7 pages.
International Application No. PCT/US2018/053392, International Search Report and Written Opinion mailed on Dec. 17, 2018, 11 pages.
International Application No. PCT/US2019/015696, International Preliminary Report on Patentability mailed on Aug. 13, 2020, 8 pages.
International Application No. PCT/US2019/015696, International Search Report and Written Opinion mailed on Apr. 23, 2019, 12 pages.

(56) References Cited

OTHER PUBLICATIONS

International Application No. PCT/US2021/035515, International Preliminary Report on Patentability mailed on Jan. 5, 2023, 10 pages.

International Application No. PCT/US2021/035515, International Search Report and Written Opinion mailed on Sep. 15, 2021, 14 pages.

Pechsiri et al., Mining Causality from Texts for Question Answering System, Institute of Electronics, Information and Communication Engineers Transactions, on Information and Systems, vol. 90, No. 10, Oct. 2007, pp. 1523-1533.

Pelsmaekers et al., Rhetorical Relations and Subordination in L2 Writing, Linguistic Choice Across Genres: Variation in Spoken and Written English, Jul. 15, 1998, pp. 191-213.

Persing et al., Modeling Argument Strength in Student Essays, Proceedings of the 53rd Annual Meeting of the Association for Computational Linguistics and the 7th International Joint Conference on Natural Language Processing, Jul. 26-31, 2015, pp. 543-552.

Peter et al., The Peter Principle, Buccaneer Books, 1968, 179 pages.

Peters et al., Deep Contextualized Word Representations, Proceedings of the 2018 Conference of the North American Chapter of the Association for Computational Linguistics: Human Language Technologies, vol. 1, Jun. 1-6, 2018, pp. 2227-2237.

Pisarevskaya et al., An Anatomy of a Lie: Discourse Patterns in Customer Complaints Deception Dataset, in Companion Proceedings of the 2019 World Wide Web Conference, 2019, pp. 373-380.

Piwek et al., T2D: Generating Dialogues Between Virtual Agents Automatically from Text, Intelligent Virtual Agents, Sep. 17, 2007, pp. 161-174.

Plotkin, A Note on Inductive Generalization, Machine Intelligence 5, Chapter 8, 1970, pp. 153-163.

Polleti et al., Explanations Within Conversational Recommendation Systems: Improving Coverage Through Knowledge Graph Embeddings, Association for the Advancement of Artificial Intelligence (www.aaai.org), 2020, 8 pages.

Ponti, Machine Learning Techniques Applied to Dependency Parsing, Available Online at: https://vision.unipv.it/AI/AIRG/MachineLearningTechniquesAppliedTo DependencyParsingRevised.pdf, Oct. 2015, 45 pages.

Prasad et al., The Penn Discourse TreeBank 2.0, Proceedings of the Sixth International Conference on Language Resources and Evaluation, 2008, 8 pages.

Qu et al., Weakly-Supervised Open-Retrieval Conversational Question Answering, Available Online at: arXiv:2103.02537v1 [cs.IR], Mar. 3, 2021, 15 pages.

Radford et al., Learning to Generate Reviews and Discovering Sentiment, Available Online at: https://arxiv.org/pdf/1704.01444.pdf, Apr. 2017, 9 pages.

Rayana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.

Recasens et al., The Life and Death of Discourse Entities: Identifying Singleton Mentions, Proceedings of Conference of the North American Chapter of the Association for Computational Linguistics: Human Language Technologies, Jun. 9-14, 2013, pp. 627-633.

Redeker, Coherence and Structure in Text and Discourse, In: William Black & Harry Bunt (eds.), Abduction, Belief and Context in Dialogue. Studies in Computational Pragmatics, Jan. 2000, pp. 1-28.

Reiter, Proving Properties of States in the Situational Calculus, Journal Artificial Intelligence, vol. 64, No. 2, Dec. 1993, 17 pages.

Ribeiro et al., Why Should I Trust You? Explaining the Predictions of Any Classifier, KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.

Rich et al., Collagen: a Collaboration Manager for Software Interface Agents, User Modeling and User-Adapted Interaction, vol. 8, No. 3-4, Mar. 1998, 36 pages.

Robinson, A Machine-Oriented Logic Based on the Resolution Principle, Journal of the Association for Computing Machinery, vol. 12, No. 1, Jan. 1965, pp. 23-41.

Ruppenhofer et al., FrameNet II: Extended Theory and Practice, Available Online at: https://framenet.icsi.berkeley.edu/fndrupal/the_book., 2016, 129 pages.

Salton et al., On the Specification of Term Values in Automatic Indexing, Journal of Documentation, vol. 29, No. 4, Apr. 1, 1973, 35 pages.

Salton et al., Term Weighting Approaches in Automatic Text Retrieval, Information Processing & Management, vol. 24, No. 5, Nov. 1987, 22 pages.

Sardianos et al., Argument Extraction from News, Proceedings of the 2nd Workshop on Argumentation Mining, Jun. 4, 2015, pp. 56-66.

Scheffler et al., Mapping PDTB-Style Connective Annotation to RST-Style Discourse Annotation, Proceedings of the 13th Conference on Natural Language Processing, 2016, pp. 242-247.

Scheutz, Agents With or Without Emotions, Proceedings of the Fifteenth International Florida Artificial Intelligence Research Society Conference, May 14, 2002, pp. 89-93.

Schnedecker, Les Chaines De Reference Dans Les Portraits Journalistiques : Elements De Description, Travaux de Linguistique, Jan. 2005, pp. 85-133.

Schnedecker, Noms Propres et Chaines De Reference, Recherches Linguistiques, 1997, 3 pages.

Scholman et al., Examples and Specifications That Prove a Point: Identifying Elaborative and Argumentative Discourse Relations, Dialogue & Discourse, vol. 8, No. 2, Jul. 2017, pp. 56-83.

Serasset et al., Association for Computational Linguistics, Stroudsburg, pp. 7-14.

Serban et al., A Hierarchical Latent Variable Encoder-Decoder Model for Generating Dialogues, vol. 31 No. 1: Proceedings of the Thirty-First Association for the Advancement of Artificial Intelligence Conference on Artificial Intelligence, Jun. 14, 2016, 15 pages.

Serban et al., Building End-to-End Dialogue Systems Using Generative Hierarchical Neural Network Models, Proceedings of the Thirtieth Association for the Advancement of Artificial Intelligence Conference on Artificial Intelligence, Apr. 6, 2016, 8 pages.

Serban et al., Generating Factoid Questions with Recurrent Neural Networks: The 30M Factoid Question-Answer Corpus, Proceedings of the 54th Annual Meeting of the Association for Computational Linguistics, vol. 1 Long Papers, May 29, 2016, 13 pages.

Severyn et al., Fast Support Vector Machines for Convolution Tree Kernels, Data Mining Knowledge Discovery, vol. 25, No. 2, Sep. 2012, 33 pages.

Shoham, Agent-Oriented Programming, Artificial Intelligence, vol. 60, No. 1, Mar. 1, 1993, pp. 51-92.

Shuldiner, Raising Them Right: AI and the Internet of Big Things, Chapter 8, Artificial Intelligence for the Internet of Everything, Feb. 21, 2019, pp. 139-143.

Sloman, Architecture-Based Conceptions of Mind, in Proceedings of 11th International Congress of Logic, Methodology and Philosophy of Science, 2000, 18 pages.

Socher et al., Recursive Deep Models for Semantic Compositionality Over a Sentiment Treebank, Proceedings of the 2013 Conference on Empirical Methods in Natural Language Processing, Oct. 2013, pp. 1631-1642.

Sordoni et al., A Neural Network Approach to Context-Sensitive Generation of Conversational Responses, Available Online at: arXiv:1506.06714v1 [cs.CL], Jun. 22, 2015, 11 pages.

Stab et al., Identifying Argumentative Discourse Structures in Persuasive Essays, Proceedings of the 2014 Conference on Empirical Methods in Natural Language Processing (EMNLP), Oct. 1, 2014, pp. 46-56.

Stab et al., Recognizing Insufficiently Supported Arguments in Argumentative Essays, Proceedings of the 15th Conference of the European Chapter of the Association for Computational Linguistics (EACL 2017), vol. 1, Apr. 3-7, 2017, pp. 980-990.

(56) References Cited

OTHER PUBLICATIONS

Stab et al., Recognizing the Absence of Opposing Arguments in Persuasive Essays, Proceedings of the 3rd Workshop on Argument Mining, Aug. 7-12, 2016, pp. 113-118.

Stein et al., Towards More Flexible and Common-sensical Reasoning About Beliefs, Representing Mental States and Mechanisms, 1995 AAAI Spring Symposium, Mar. 1995, 9 pages.

Stone et al., Multiagent Systems: a Survey from a Machine Learning Perspective, Autonomous Robots, vol. 8, No. 3, Jun. 1, 2000, 57 pages.

Suchanek et al., A Core of Semantic Knowledge, in Proceedings of the 16th international conference on World Wide Web, May 8-12, 2007, pp. 697-706.

Sun et al., Exploiting Product Related Review Features for Fake Review Detection, Mathematical Problems in Engineering, vol. 2016, No. 1, Aug. 4, 2016, 8 pages.

Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.

Taboada et al., Rhetorical Structure Theory: Looking Back and Moving Ahead, Discourse Studies, vol. 8, No. 3, Jan. 24, 2006, pp. 423-459.

Taboada, The Genre Structure of Bulletin Board Messages, Text Technology, vol. 13, No. 2, Nov. 2, 2004, pp. 55-82.

Tai et al., Improved Semantic Representations from Tree-Structured Long Short-Term Memory Networks, Available Online at: https://arxiv.org/pdf/1503.00075.pdf, May 30, 2015, 11 pages.

Tamma et al., Ontologies for Supporting Negotiation in E-commerce, Engineering Applications of Artificial Intelligence, vol. 18, No. 2, Mar. 2005, pp. 223-236.

Tao et al., Multi-Representation Fusion Network for Multi-Turn Response Selection in Retrieval-Based Chatbots, in Proceedings of the Twelfth ACM International Conference on Web Search and Data Mining, Feb. 11-15, 2019, pp. 267-275.

Theranos, Wall Street Journal: Letter to the Editor, Theranos Works to Realize Access to Preventive Care, Available Online at: https://theranos.com/news/posts/wall-street-journal-letter-to-the-editor, Dec. 22, 2015, 4 pages.

Todirascu et al., Coherence and Cohesion for the Assessment of Text Readability, Proceedings of NLPCS 2013, Oct. 2013, pp. 11-19.

Torrance et al., Rhetorical Structure Analysis as a Method for Understanding Writing Processes, Presented at the Multidisciplinary Approaches to Discourse (MAD) Workshop, Information Technology Research Institute Technical Report Series, Aug. 2001, 9 pages.

Trafton et al., ACT-R/E: an Embodied Cognitive Architecture for Human-Robot Interaction, Journal of Human-Robot Interaction, vol. 2, No. 1, Feb. 2013, 26 pages.

Traum, Rhetorical Relations, Action and Intentionality in Conversation, Proceedings ACL SIG Workshop on Intentionality and Structure in Discourse Relations, Jun. 1993, pp. 132-135.

Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.

Turek, Explainable Artificial Intelligence (XAI), Available Online at: https://www.darpa.mil/program/explainable-artificial-intelligence, Accessed from Internet on Aug. 27, 2019, pp. 1-10.

Turner, A Model Explanation System: Latest Updates and Extensions, ICML Workshop on Human Interpretability in Machine Learning, Available Online at: https://arxiv.org/pdf/1606.09517v1.pdf, Jun. 30, 2016, pp. 1-5.

Van Dijk, Explorations in the Semantics and Pragmatics of Discourse, Text and Context, Longman Linguistics Library, 1977, 274 pages.

Van Eemeren, Argumentation Theory and Argumentative Practices: a Vital but Complex Relationship, Informal Logic, vol. 37, No. 4, Dec. 2017, pp. 322-350.

Van Eemeren et al., Fundamentals of Argumentation Theory: a Handbook of Historical Backgrounds and Contemporary Developments, Routledge, Taylor & Francis Group, Mar. 1, 1996, 440 pages.

Vapnik, The Nature of Statistical Learning Theory, Springer Science, 1995, 201 pages.

Virtanen, Analysing Argumentative Strategies: a Reply to a Complaint, Anglicana Turkuensia, vol. 14, 1995, pp. 539-547.

Walton, Argumentation Schemes for Presumptive Reasoning, Lawrence Erlbaum Associates, Publishers, 1996, 39 pages.

Wang et al., A Dataset for Research on Short-Text Conversation, Proceedings of the 2013 Conference on Empirical Methods in Natural Language Processing, Oct. 18-21, 2013, pp. 935-945.

Wang et al., A Joint Model for Question Answering and Question Generation, Learning to Generate Natural Language Workshop, ICML, Jun. 5, 2017, 7 pages.

Webber et al., Discourse Structure and Language Technology, Natural Language Engineering, vol. 18, No. 4, Oct. 2012, pp. 437-490.

Wei et al., Is This Post Persuasive? Ranking Argumentative Comments in Online Forum, Proceedings of the 54th Annual Meeting of the Association for Computational Linguistics, Aug. 7-12, 2016, pp. 195-200.

Weigand et al., Argumentation Semantics of Communicative Action, Proceedings of the 9th International Working Conference on the Language-Action Perspective on Communication Modelling, Jun. 2004, pp. 159-178.

Wilks, Machine Conversations, The Springer International Series in Engineering and Computer Science, vol. 511, 1999, 38 pages.

Wooldridge, Reasoning about Rational Agents, MIT Press, Jul. 14, 2000, 2 pages.

Wu et al., Adaptive Peer to Peer Social Networks for Distributed Content Based Web Search, Social Information Retrieval Systems: Emergent Technologies and Applications for Searching the Web Effectively, IGI Global, 2007, 31 pages.

Wu et al., Enhancing Text Representation for Classification Tasks with Semantic Graph Structures, International Journal of Innovative Computing, Information and Control, vol. 7, No. 5, May 2011, pp. 2689-2698.

Wu et al., Sequential Matching Network: a New Architecture for Multi-Turn Response Selection in Retrieval-Based Chatbots, in Proceedings of the 55th Annual Meeting of the Association for Computational Linguistics, vol. 1, May 15, 2017, 10 pages.

Yang et al., Reflections on Rational Choice-The Existence of Systematic Irrationality, The Journal of Socio-Economics, vol. 37, No. 3, Jun. 2008, pp. 1218-1233.

Yao et al., Information Extraction over Structured data: Question Answering with Freebase, In Proceedings of the 52nd ACL, Jun. 23-25, 2014, pp. 956-966.

Yao et al., Online Deception Detection Refueled by Real World Data Collection, Proceedings of Recent Advances in Natural Language Processing, Jul. 28, 2017, 10 pages.

Yao et al., Semantics-Based Question Generation and Implementation, Dialogue & Discourse, vol. 3, No. 2, Mar. 17, 2012, pp. 11-42.

Yih et al., Semantic Parsing via Staged Query Graph Generation: Question Answering with Knowledge Base, Microsoft Research, Proceedings of the 53rd Annual Meeting of the Association for Computational Linguistics and the 7th International Joint Conference on Natural Language Processing, vol. 1, Jul. 26-31, 2015, pp. 1321-1331.

Yu et al., A Multi-Agents Based E-Maintenance System with Case-based Reasoning Decision Support, Engineering Applications of Artificial Intelligence, vol. 16, No. 4, Jun. 1, 2003, 12 pages.

Yuan et al., Machine Comprehension by Text-to-Text Neural Question Generation, Proceedings of the 2nd Workshop on Representation Learning for Natural Language Processing, Aug. 3, 2017, pp. 15-25.

Zhou et al., Multi-Turn Response Selection for Chatbots with Deep Attention Matching Network, Proceedings of the 56th Annual Meeting of the Association for Computational Linguistics (vol. 1: Long Papers), Jul. 2018, pp. 1118-1127.

Zhou et al., Multi-View Response Selection for Human-Computer Conversation, Proceedings of the 2016 Conference on Empirical Methods in Natural Language Processing, Nov. 2016, pp. 372-381.

(56) References Cited

OTHER PUBLICATIONS

Zhu et al., Explainable AI for Designers: a Human-Centered Perspective on Mixed-Initiative Co- Creation, Institute of Electrical and Electronics Engineers Conference on Computational Intelligence and Games (CIG), 2018, 8 pages.
European Application No. 19727786.6, "Summons to Attend Oral Proceedings", mailed on Feb. 26, 2025, 8 pages.
Chinese Application No. 202110608704.7, Office Action mailed on Aug. 28, 2025, 10 pages (5 pages of Original Document and 5 pages of English Translation).
Japanese Application No. 2022-191911, Office Action mailed on Aug. 12, 2025, 4 pages.

* cited by examiner

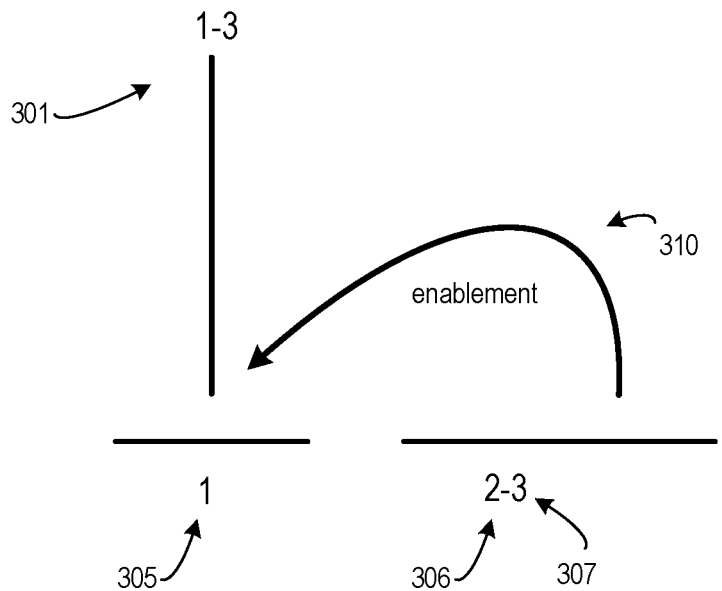
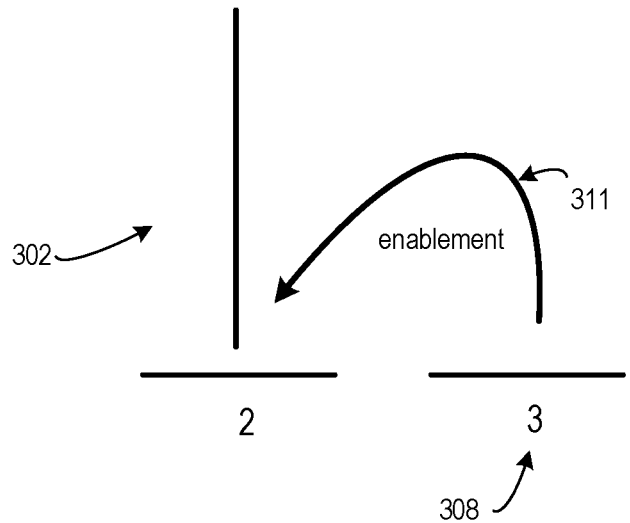
FIG. 3

2500

| | | |
|---|---|---|
| 2501 | Agent | China has rejected calls for an independent international investigation into the origin of the coronavirus" |
| 2502 | User | Why would they do it ? Don't believe that. |
| 2503 | Agent | [doubt is detected] [(*Attribution* ("China has rejected...") = According to BBC]<br>    *This is* "According to BBC" |
| 2504 | User | Are politicians involved in this? |
| 2505 | Agent | [Searching for 'politi...' & 'involv...' tokens in EDUs] "the demands were politically motivated" |
| 2506 | User | Why is that? |
| 2507 | Agent | [Detected explainability request. Looking for *Explanation*("the demands were politically...". ]<br>"A top diplomat in the UK, Chen Wen explained the BBC |
| 2508 | User | Who is Chen Wen? |
| 2509 | Agent | [question is about an entity from the answer but foreign to the thread. So search on the web and then continue navigate DT]Chen Wen is ... [Found information on the web]. *Notice also that* [*Elaboration, Joint*, or other default rhetorical relation from the current node ] "and would divert China attention from fighting the pandemic ." |
| 2510 | User | And how can countries tackle coronavirus? |
| 2511 | Agent | [Searching for 'countr...' & 'tackle...' & 'coronavirus' tokens in EDUs & rhetorical relations related to 'how' such as *Explanation, Cause, Means* etc].<br>Selected fragment:<br>    EU believes<br>        means<br>            TEXT:that information about how it initially spread could help<br>            TEXT:countries tackle the disease .<br>"EU believes that information about how it initially spread could help countries tackle the disease" |
| 2512 | User | Why is it EU business? |
| 2513 | Agent | [question is about an entity from the answer but foreign to the thread. So search on the web and then continue navigate DT]<br>[Found node with EDU: "The virus is thought to have been caused ... "Formed question for this EDU and the relation]<br>*Do you know what causes* "the virus"? |
| 2514 | User | Yes I know, it is caused by ... |
| 2515 | Agent | [The user confirmed. It does not matter what the user knows. Proceed to the next EDU & relation]<br>"It is caused by a poor hygiene emerged at a wildlife market in the city of Wuhan" |

*FIG. 25*

MANAGEMENT OF A FOCUSED INFORMATION SHARING DIALOGUE BASED ON DISCOURSE TREES

CROSS-REFERENCES TO RELATED APPLICATIONS

This application is a continuation of U.S. application Ser. No. 17/235,329, filed on Apr. 20, 2021, which is a continuation-in-part of Ser. No. 16/995,302 filed on Aug. 17, 2020, now issued as U.S. Pat. No. 11,295,085, issued Apr. 5, 2022, which is a divisional of U.S. application Ser. No. 16/145,644, filed on Sep. 28, 2018, now issued as U.S. Pat. No. 10,853,574, issued Dec. 1, 2020, which claims the benefit of U.S. Provisional Application No. 62/564,961, filed on Sep. 28, 2017 and U.S. Provisional Application No. 62/729,335, filed on Sep. 10, 2018, all of which are incorporated by reference in entirety. U.S. application Ser. No. 17/235,329 filed on Apr. 20, 2021 claims the benefit of U.S. Provisional Application No. 63/032,895, filed on Jun. 1, 2020, which is incorporated by reference in its entirety. U.S. application Ser. No. 17/235,329 filed on Apr. 20, 2021. This application is also a continuation of Ser. No. 17/003,593, filed on Aug. 26, 2020, now issued as U.S. Pat. No. 11,748,572, issued Sep. 5, 2023, which is a continuation of U.S. Ser. No. 16/260,939, filed on Jan. 29, 2019, now U.S. Pat. No. 10,817,670, issued Oct. 27, 2020, which is a continuation in part of U.S. Ser. No. 16/010,091, filed on Jun. 15, 2018, now U.S. Pat. No. 10,679,011, issued Jun. 9, 2020, which is a continuation in part of U.S. Ser. No. 15/975,683, filed on May 9, 2018, now U.S. Pat. No. 10,796,102, issued Oct. 6, 2020, all of which are incorporated by reference in their entirety. U.S. Ser. No. 16/260,939, filed on Jan. 29, 2019, claims the benefit of U.S. Ser. No. 62/623,999, filed on Jan. 30, 2018, and 62/646,795, filed on Mar. 22, 2018, which are incorporated by reference in their entirety.

TECHNICAL FIELD

This disclosure is generally concerned with linguistics. More specifically, this disclosure relates to using discourse trees to manage a dialogue session.

BACKGROUND

Due to improvements in computational linguistics and machine learning, autonomous agents can be trained to answer questions received from a user device or manage a dialogue with the user device. For instance, a variety of content is available for training autonomous agents, such as customer service histories or other databases.

But autonomous agents operating with machine learning models trained from such content suffer from deficiencies. For instance, many deep learning systems are unable to separate topic structure and navigation structure, nor can such solutions guarantee that all relevant information is actually presented to a user.

As such, improved solutions for presenting information to user devices are needed.

BRIEF SUMMARY

Generally, systems, devices, and methods of the present disclosure relate to managing a dialogue between an autonomous agent and a user device. For instance, a computing device creates a discourse tree from a body of text and determines a main topic of the body of text from the discourse tree. The computing device provides the main topic to the user device, and in response, receives a user utterance. The computing device conducts a mixed initiative dialogue and attempts to drive a user through fragments of text-based content, adjusting for user interest. The computing device determines an intent from the user utterance and navigates the discourse tree to locate relevant information consistent with the intent. The computing device navigates a user through fragments of text in an order that is determined by the user interest and by the configuration of the discourse tree.

In an aspect, a method involves creating a discourse tree from text including fragments. The discourse tree includes a root node, nonterminal nodes, and terminal nodes. Each nonterminal node represents a rhetorical relationship between two of the fragments and each terminal node is associated with one of the fragments. The fragments are elementary discourse units. The method involves determining, from the discourse tree, a subset of terminal nodes that are associated with a nonterminal node representing a rhetorical relationship of type elaboration and associated with a nucleus elementary discourse unit of the elaboration. The method further involves calculating, for each node of the subset of terminal nodes, a respective path length from the root node. The method further involves identifying, from the subset of terminal nodes, a topic node having a path length that is a smallest path length of the path lengths. The method further involves determining, from the topic node, a topic of the discourse tree by extracting a noun phrase from the nucleus elementary discourse unit associated with the topic node. The method further involves providing the topic to a user device.

In another aspect, the method further involves identifying, in the discourse tree, a satellite elementary discourse unit associated with the topic node via the rhetorical relationship of type elaboration. The method further involves providing text associated with the satellite elementary discourse unit to the user device.

In another aspect, the method further involves identifying, in the discourse tree, an additional terminal node from the subset of terminal nodes, the additional terminal node having an additional path length equal to or greater than the path length. The method further involves extracting additional text from an additional nucleus elementary discourse unit associated with the additional terminal node. The method further involves providing the additional text to the user device.

In another aspect, the method further involves navigating, in the discourse tree, to an additional non-terminal node that is connected to the topic node and represents an additional rhetorical relation. The method further involves determining, from the additional non-terminal node, an additional topic by extracting an additional noun phrase from an additional nucleus elementary discourse unit associated with additional non-terminal node. The method further involves, responsive to determining that the additional rhetorical relation is one of type elaboration, condition, or temporal sequence, performing actions. The actions include extracting additional text from the additional nucleus elementary discourse unit and providing the additional text to the user device.

In another aspect, the method further involves receiving, from the user device, an utterance. The method further involves determining that the utterance indicates familiarity with additional topic. The method further involves identifying, in the discourse tree, an additional non-terminal node that includes text representing the additional topic and represents an additional rhetorical relation. The method further involves, responsive to determining that the additional rhetorical relation is one of type elaboration, condition, or contrast, performing actions. The method further involves extracting additional text from an elementary discourse unit associated with a terminal node that is connected to the additional terminal node. The method further involves providing the additional text to the user device.

In another aspect, the method further involves receiving, from the user device, an utterance. The method further involves determining that the utterance includes a confirmation of an interest in an additional topic. The method further involves identifying, in the discourse tree, an additional non-terminal node that includes text representing the additional topic and represents an additional rhetorical relation. The method further involves extracting additional text from an elementary discourse unit associated with a terminal node that is connected to the additional non-terminal node. The method further involves providing the additional text to the user device.

In another aspect, the method further involves receiving an utterance from the user device. The method further involves determining that the utterance includes a question that is unrelated to the topic. The method further involves responsive to the determining, performing actions. The actions include identifying one or more keywords from the utterance, identifying an additional text by providing a query comprising the keywords to a search engine, and providing text from one or more elementary discourse units of the additional text to the user device.

In another aspect, the method further involves forming, from the discourse tree, a communicative discourse tree that represents the text by matching each fragment that has a verb to a respective verb signature. The method further involves identifying, from the communicative discourse tree, a verb signature that corresponds to the topic node. The method further involves extracting a subject from the verb signature. The method further involves providing the subject to the user device.

The above methods can be implemented as tangible computer-readable media and/or operating within a computer processor and attached memory.

BRIEF DESCRIPTION OF THE DRAWINGS

FIG. 3 depicts a further example of a discourse tree in accordance with an aspect.

FIG. 25 depicts an exemplary dialogue from resulting from the discourse tree depicted in FIG. 24, in accordance with an aspect.

DETAILED DESCRIPTION

Figure 1:
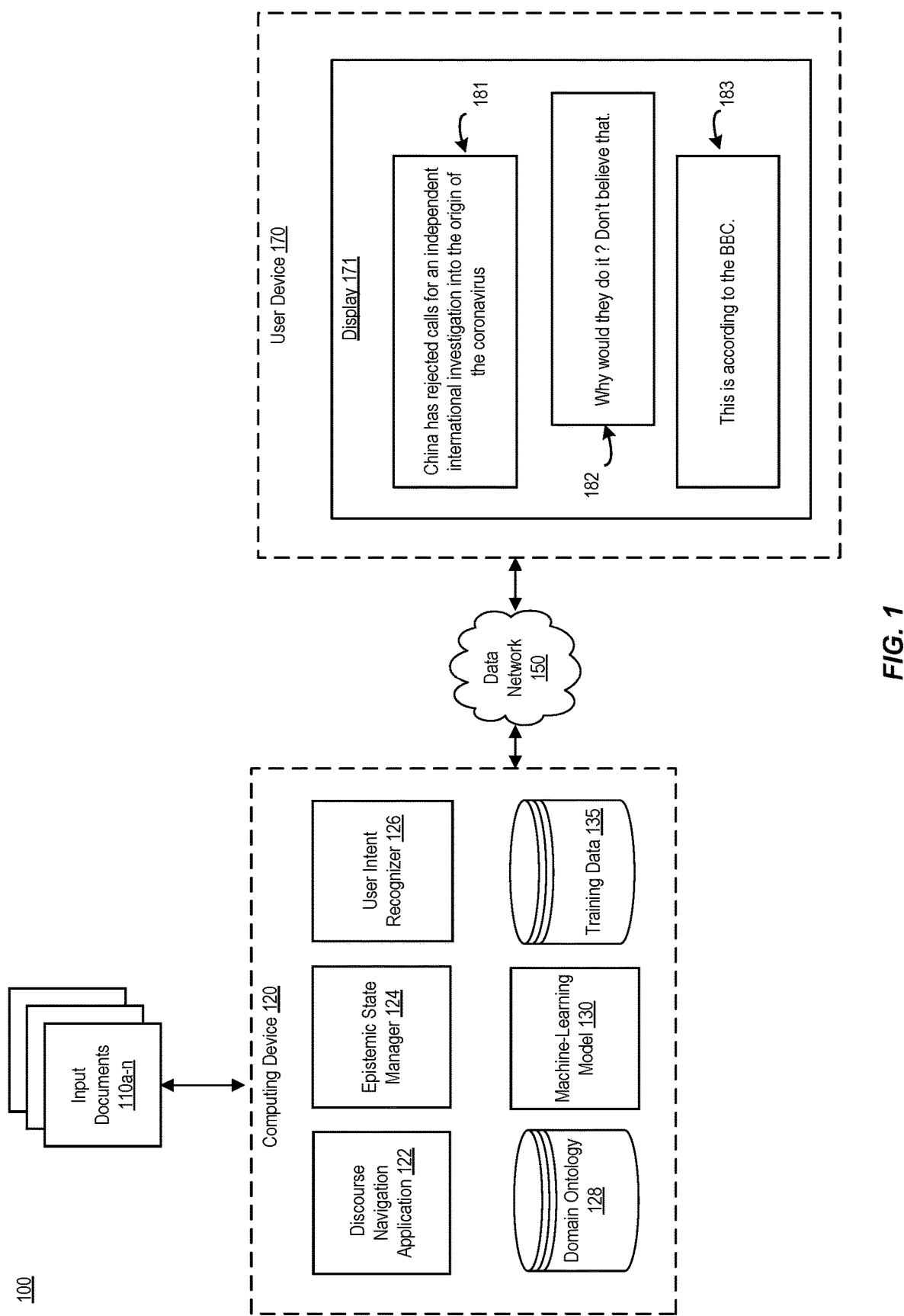
FIG. 1 shows an exemplary rhetoric classification environment in accordance with an aspect.

Disclosed techniques provide technical improvements to the areas of computer-implemented linguistics. More specifically, certain aspects involve autonomous agents that manage dialogue with user devices by leveraging discourse trees and/or communicative discourse trees. As explained herein, discourse trees represent rhetorical relationships between elementary discourse units of a particular document. Communicative discourse trees (CDTs) are discourse trees that are supplemented with one or more communicative actions. A communicative action is a cooperative action undertaken by individuals based on mutual deliberation and argumentation.

In an example, an autonomous agent ("chat bot") manages a dialogue session. The agent processes an input document and forms discourse trees from the document. Using the rhetorical relations in the discourse tree, the agent determines a topic of the document and provides the topic to the user device. The user device transmits an utterance to the agent, and in turn, the agent determines an intent of the utterance. Examples of intent include disagreement, requests for further explanations, requests for details, or requests for a contrasting view. Based on the intent, the agent navigates the discourse tree according to one or more rhetorical relations to obtain a relevant response. This process can continue as the user device navigates the document.

By contrast, existing keyword-based solutions fail to capture a relevancy for different parts of text within a body of text, resulting in autonomous agents that attempt to imitate human dialogue without a full understanding of communicative discourse. Such solutions cause autonomous agents to emit a random sequence of utterances, making accomplishing a task or providing a recommendation difficult.

Discourse trees originate from Rhetorical Structure Theory (RST). RST models a logical organization of text employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences.

The leaves of a discourse tree correspond to EDUs, the contiguous atomic text spans. Adjacent EDUs are connected by coherence relations (e.g., attribution, sequence), forming higher-level discourse units. The leaves of a particular EDU are logically related. This relationship is referred to as the coherence structure of the text. Example relations include elaboration and enablement. As used herein, "nuclearity" refers to which text segment, fragment, or span, is more central to a writer's purpose. A "nucleus" refers to a span of text that is more central to a writer's purpose than a "satellite," which is less central to a writer's purpose.

Certain Definitions

As used herein, "textual unit" refers to a unit of text. Examples include an elementary discourse unit, phrase, fragment, sentence, paragraph, page, and document.

As used herein, "entity" refers to something with a distinct and independent existence. An entity may be used in a textual unit. Examples of entities include a person, a company, a location, a thing, a name of a document, or a date or time.

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "index" is a table, data structure, pointer, or other mechanism that links two keywords, data, or parts of text. An index can include searchable content. Examples of an index include an inverse index, a searchable index, and a string match. An inverse index is also searchable.

Turning now to the figures, FIG. 1 shows an exemplary document navigation environment in accordance with an aspect. FIG. 1 includes one or more of input documents 110a-n, computing device 120, user device 170, and data network 150. In the example depicted in FIG. 1, computing device 120 implements an autonomous agent that manages a dialogue with user device 170 using discourse trees and/or communicative discourse trees.

More specifically, computing device 120 can execute one or more of discourse navigation application 122, epistemic state manager 124, user intent recognizer 126, and machine learning model 130. Additionally, computing device 120 can include domain ontology 128 and training data 135. Examples of computing device 120 are distributed system 3000 and client computing devices 3002, 3004, 3006, and 3008.

User device 170 can be any mobile device such as a mobile phone, smart phone, tablet, laptop, smart watch, and the like. User device 170 communicates with computing device 120 via data network 160 to computing device 120 or to remote server. Data network 160 can be any public or private network, wired or wireless network, Wide Area Network, Local Area Network, or the Internet. The functionality of user device 170 can be implemented in software, e.g., via an application or a web application. User device 170 includes display 171.

In a more specific example, discourse navigation application 122 creates a discourse tree from one of input documents 110a-n. Discourse navigation application 122 uses the created discourse tree to navigate a user device through the input document. For instance, display 171 depicts three messages 181-183. Discourse navigation application 122 outputs message 181 to the user device, which reads "China has rejected calls for an independent international investigation into the origin of the coronavirus." In response, the user device provides message 182, which reads "Why would they do it? Don't believe that." Discourse navigation application 122 determines skepticism in message 182 and generates message 183, which states "this is according to the BBC."

Various techniques can be used to determine such an intent of a message. Based on the intent, discourse navigation application 122 can determine how to respond. An example of a process involving how to respond can be found with respect to process 2300 in FIG. 23. Discourse navigation application 122 can continue this process of navigation until the discourse tree has been entirely traversed.

Epistemic state manager 124 can model a state of knowledge of a user. For instance, initially, when the autonomous agent initiates a dialogue with a user, the user's background knowledge is not known. But over the course of a dialogue session, the epistemic state manager 124 updates based on new information receive from user device 170. In some cases, the epistemic state is used to provide an adjusted response to user device 170.

User intent recognizer 126 detects a user state from utterances received from user device 170. For example, a user might desire more information. Or the user might desire to know an opposing viewpoint.

Domain ontology 128 includes information such as terminology, entities, and so forth about a particular domain (e.g., subject). In some cases, an autonomous agent can be domain-specific. Examples of domains include finance, business, engineering, and so forth.

In some aspects, disclosed techniques can use machine-learning to perform various functions. Machine learning model 130 can be trained and/or used by discourse navigation application 122 to make predictions and/or classifications. For instance, machine learning model 130 can be trained with training data 135 to predict whether two discourse trees match each other, or whether a particular discourse tree corresponds to text having argumentation.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Relations

As discussed, aspects described herein use rhetorical relations and discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible. Table 2 below lists different rhetorical relations.

TABLE 2

| Relation Name | Nucleus | Satellite |
|---|---|---|
| Antithesis | ideas favored by the author | ideas disfavored by the author |
| Background | text whose understanding is beingfacilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | |

TABLE 2-continued

| Relation Name | Nucleus | Satellite |
|---|---|---|
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown in Table 3 below.

TABLE 3

| Relation Name | Span | Other Span |
|---|---|---|
| Contrast | One alternate | The other alternate |
| Joint | (unconstrained) | (unconstrained) |
| List | An item | A next item |
| Sequence | An item | A next item |

Figure 2:
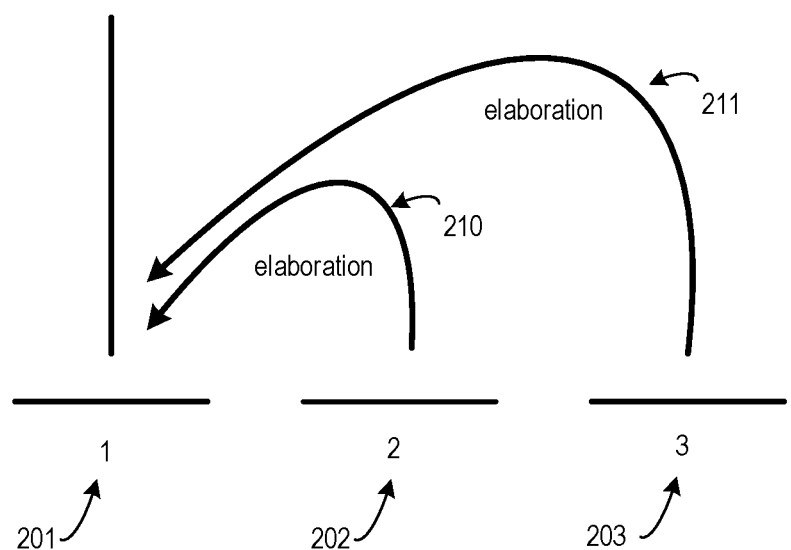
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 211. The numbers in FIG. 2 correspond to the three text spans. FIG. 2 corresponds to the following example text with three text spans numbered 1, 2, 3:

1. Honolulu, Hawaii will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202.

Relation 210 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 311. Relation 310, enablement, describes the relationship ibetween components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 310 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
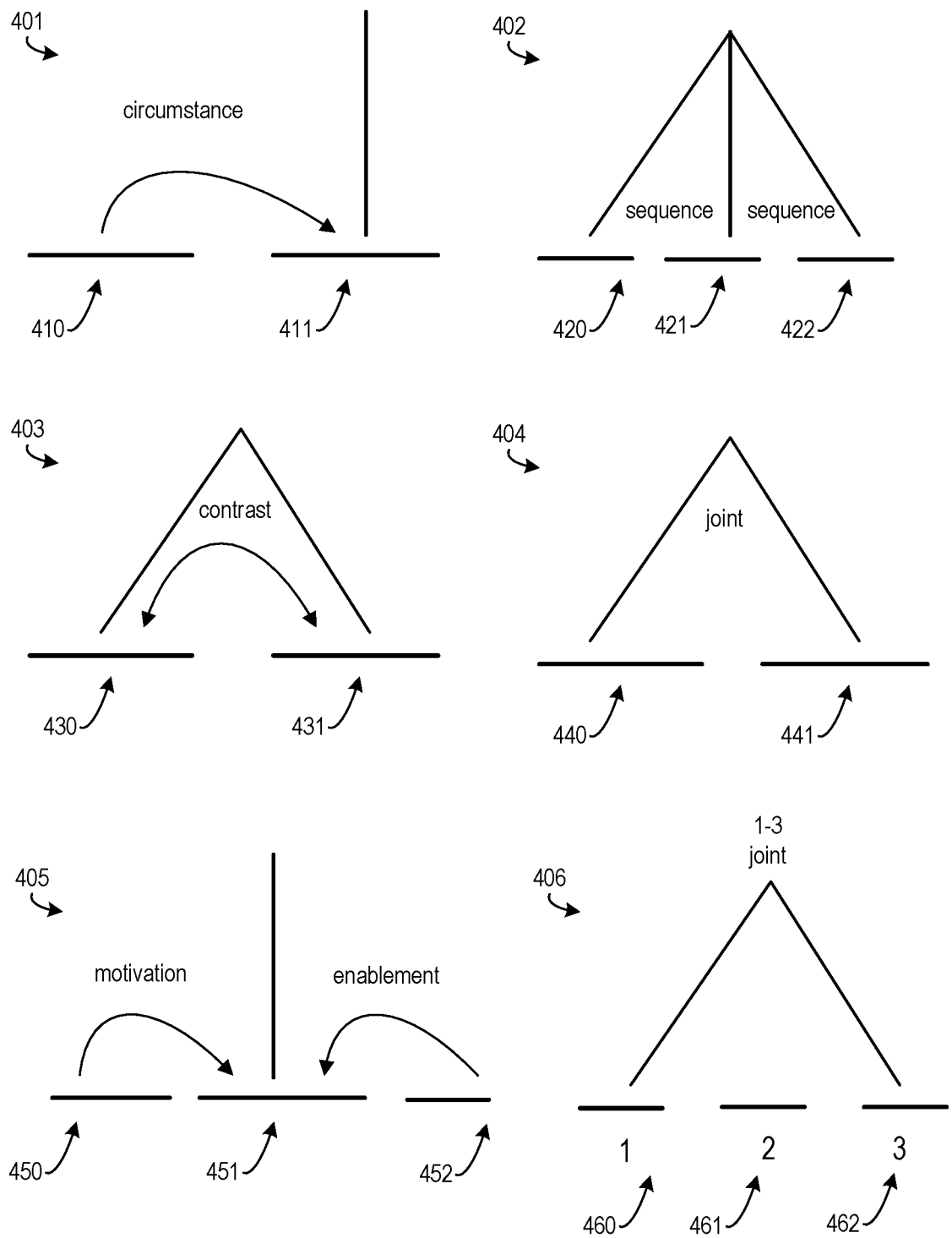
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 411. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
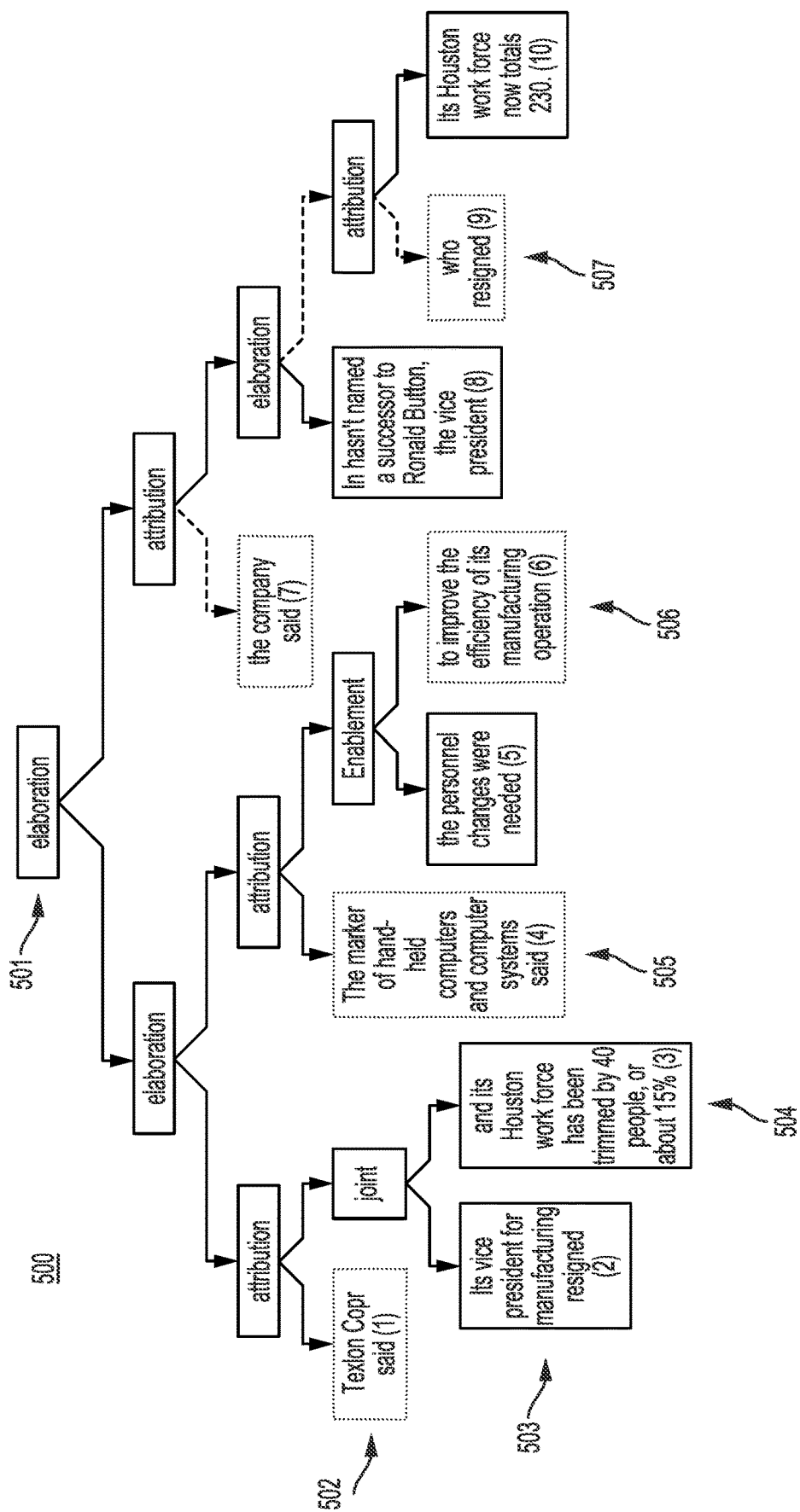
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
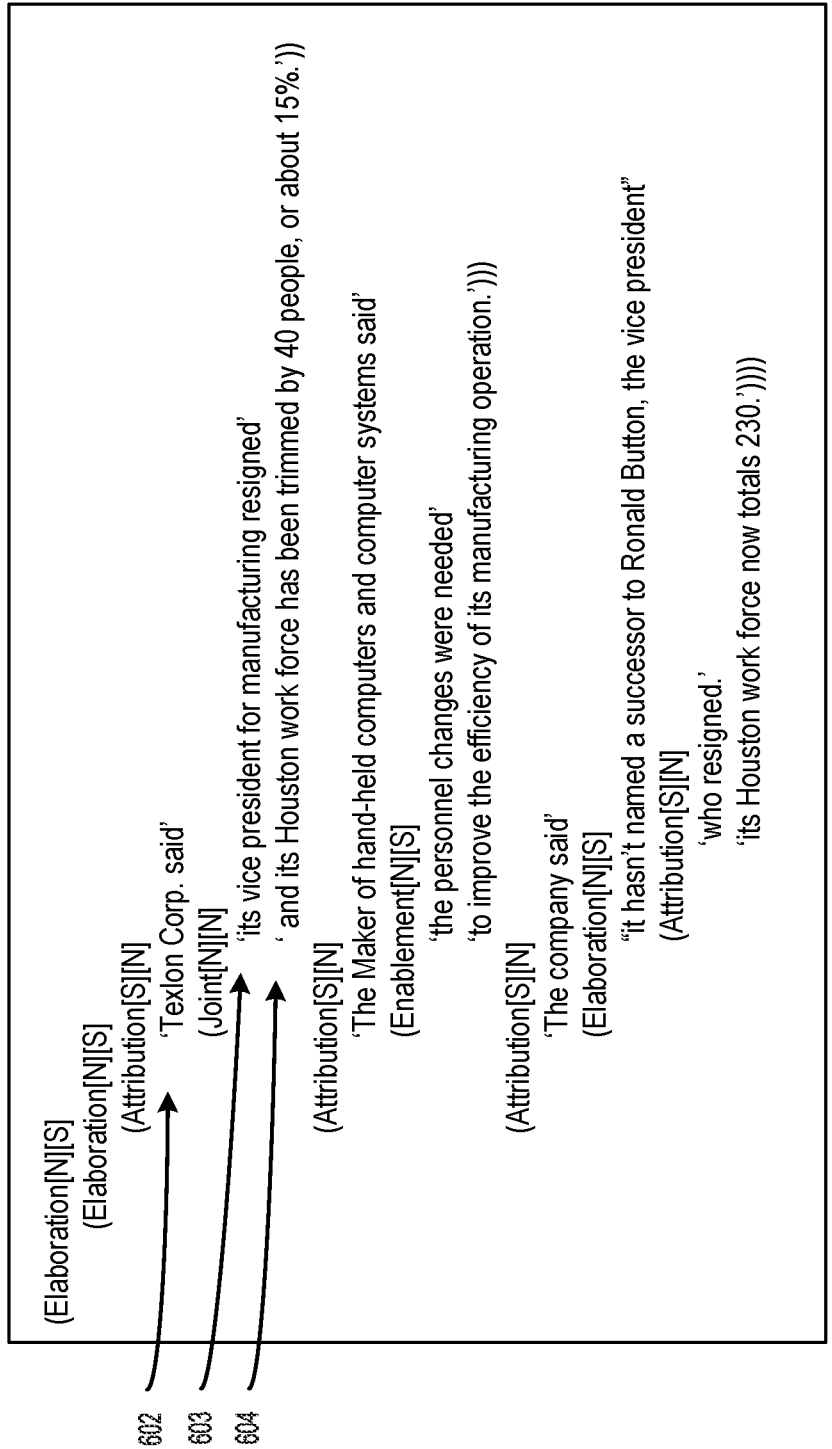
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of informative instances among the retrieved instances, while recall (also known as sensitivity) is the fraction of informative instances that have been retrieved over the total amount of informative instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 20 of which were informative while failing to return 40 additional informative pages, its precision is $20/30=2/3$ while its recall is $20/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Analyzing Request and Response Pairs

Figure 7:
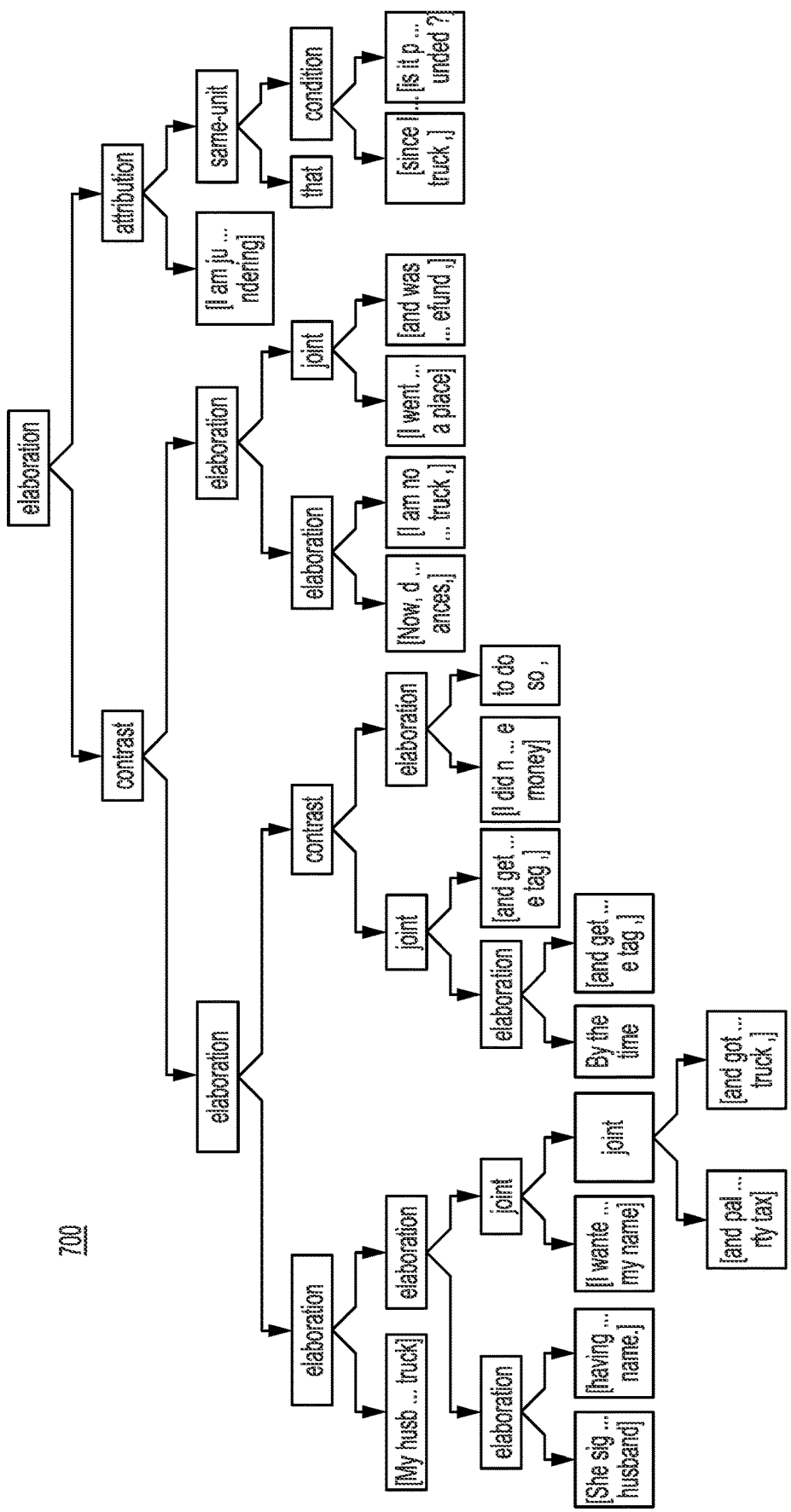
FIG. 7 depicts an exemplary DT for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts discourse tree 700, which represents the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
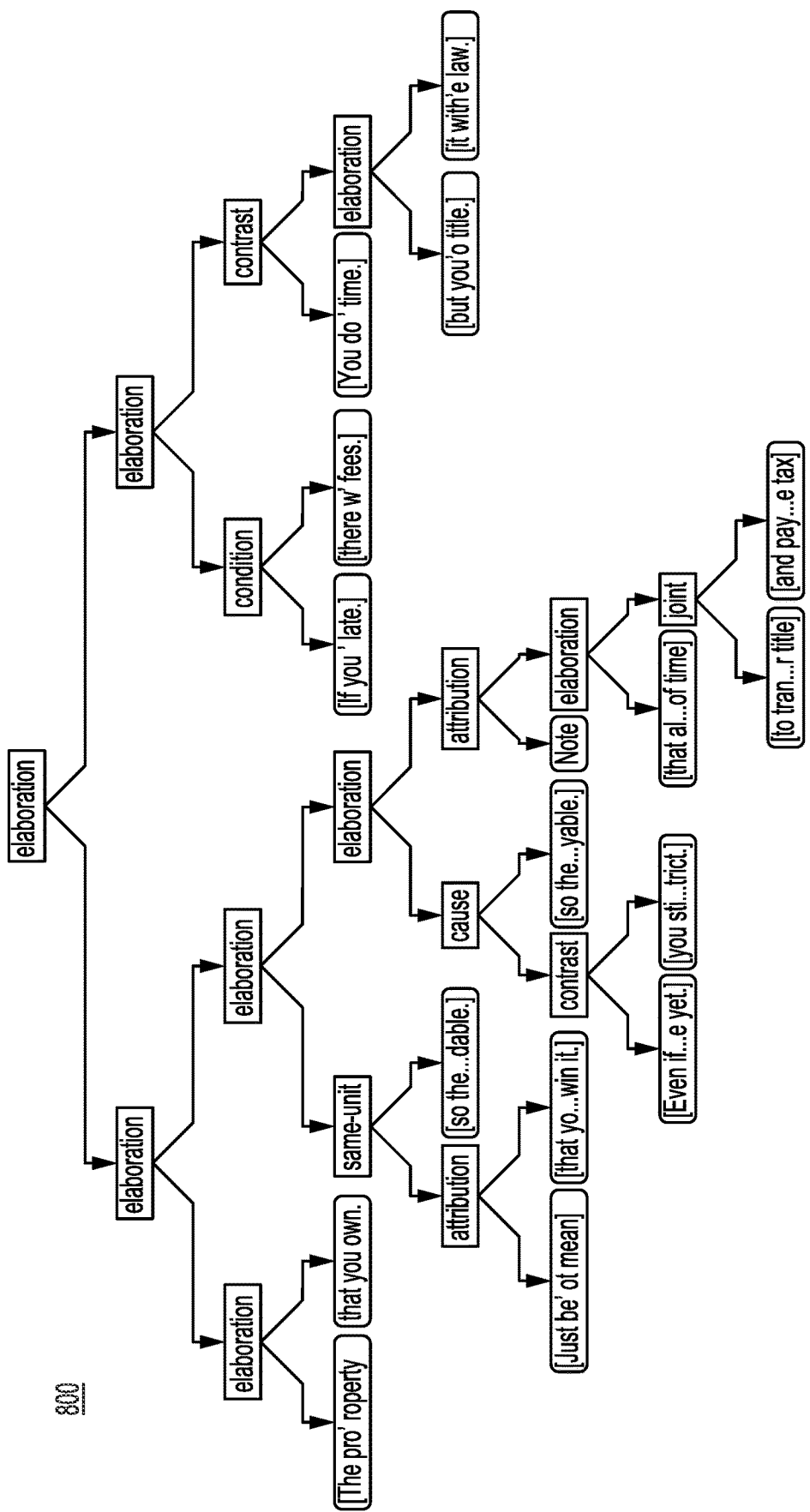
FIG. 8 depicts an exemplary response for the question represented in FIG. 7.

FIG. 8 depicts an exemplary response for the question represented in FIG. 7, according to certain aspects of the present invention. FIG. 8 depicts discourse tree 800. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
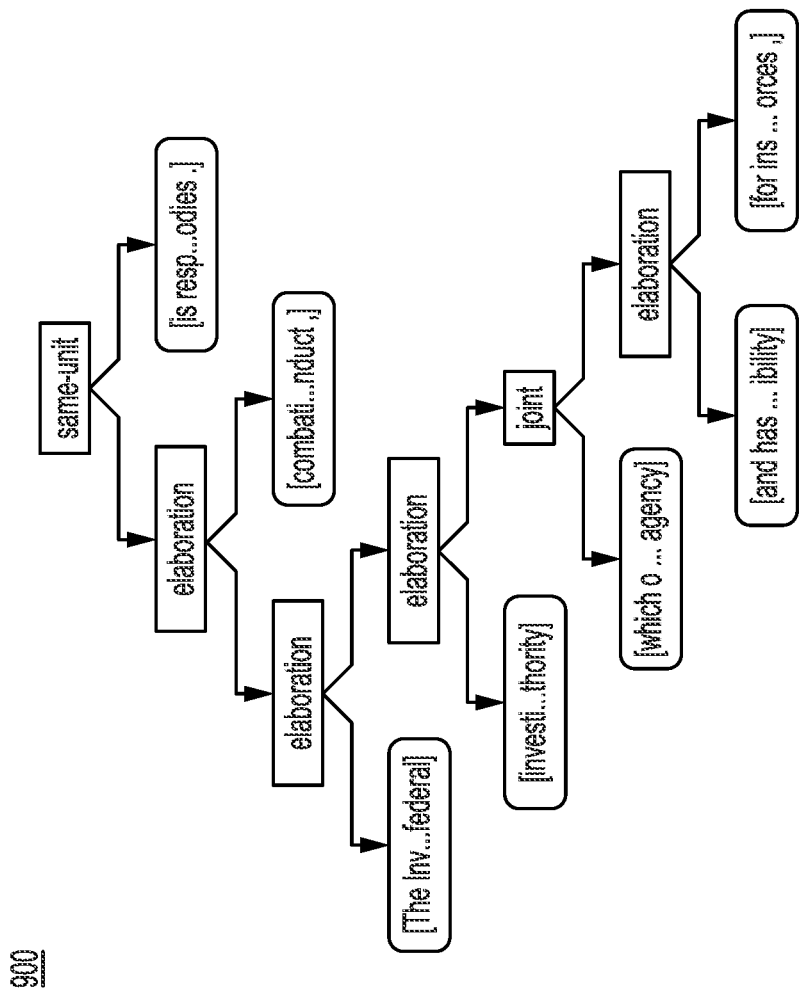
FIG. 9 illustrates a discourse tree for an official answer in accordance with an aspect.

FIG. 9 illustrates a discourse tree for an official answer in accordance with an aspect. FIG. 9 depicts a discourse tree 900 for an official answer, or mission statement, that states "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
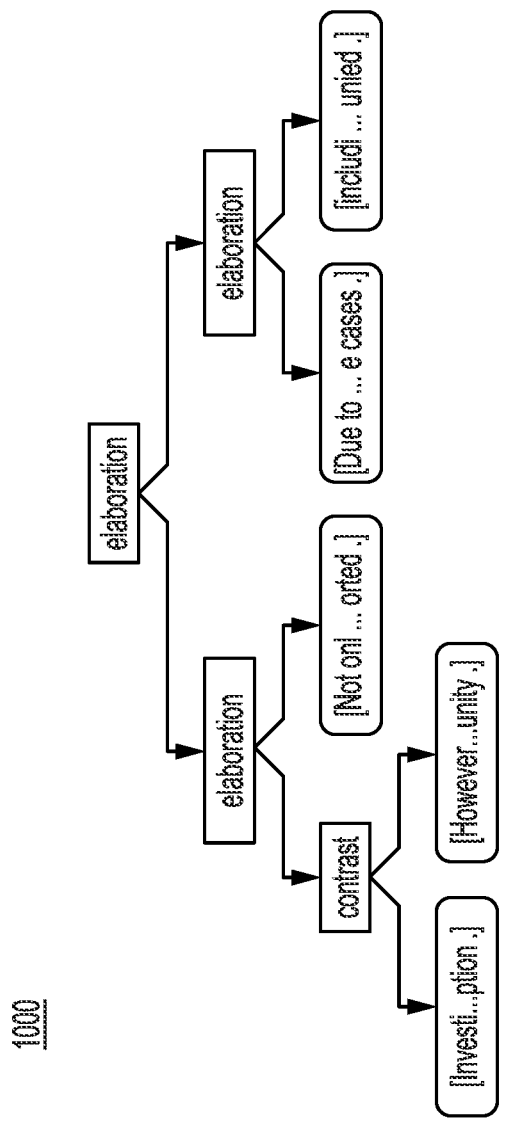
FIG. 10 illustrates a discourse tree for a raw answer in accordance with an aspect.
Figure 11:
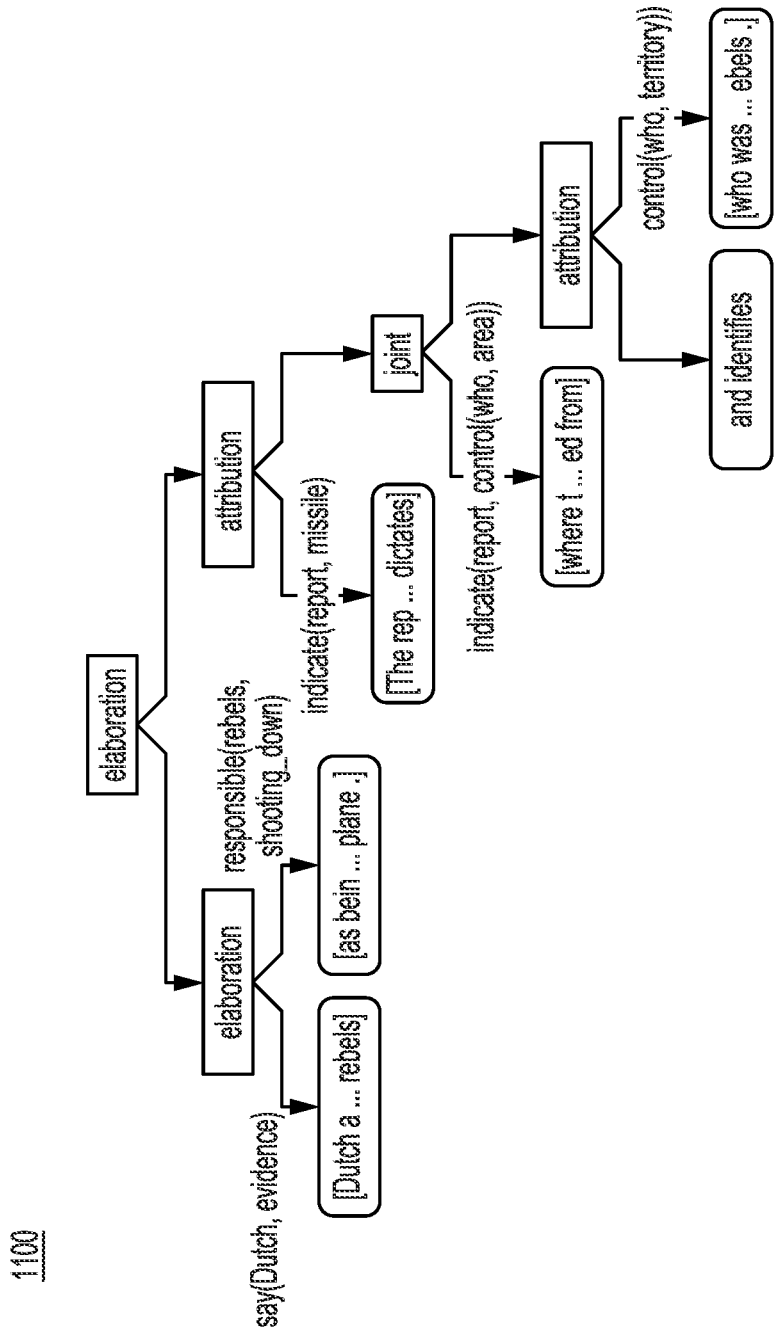
FIG. 11 illustrates a communicative discourse tree for a claim of a first agent in accordance with an aspect.

FIG. 10 illustrates a discourse tree 1000 for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is," then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Extended Discourse Trees

Aspects of the present disclosure facilitate navigating an extended discourse tree built from a corpus of relevant content such as multiple documents. Extended discourse trees are a combination of discourse trees of individual textual units (e.g., paragraphs) from multiple documents. Aspects use extended discourse trees to not only allow zooming in based on keywords but also on navigating in or out or back based on how documents are interconnected, thereby enabling an autonomous agent to provide content navigation such as guided search.

Figure 16:
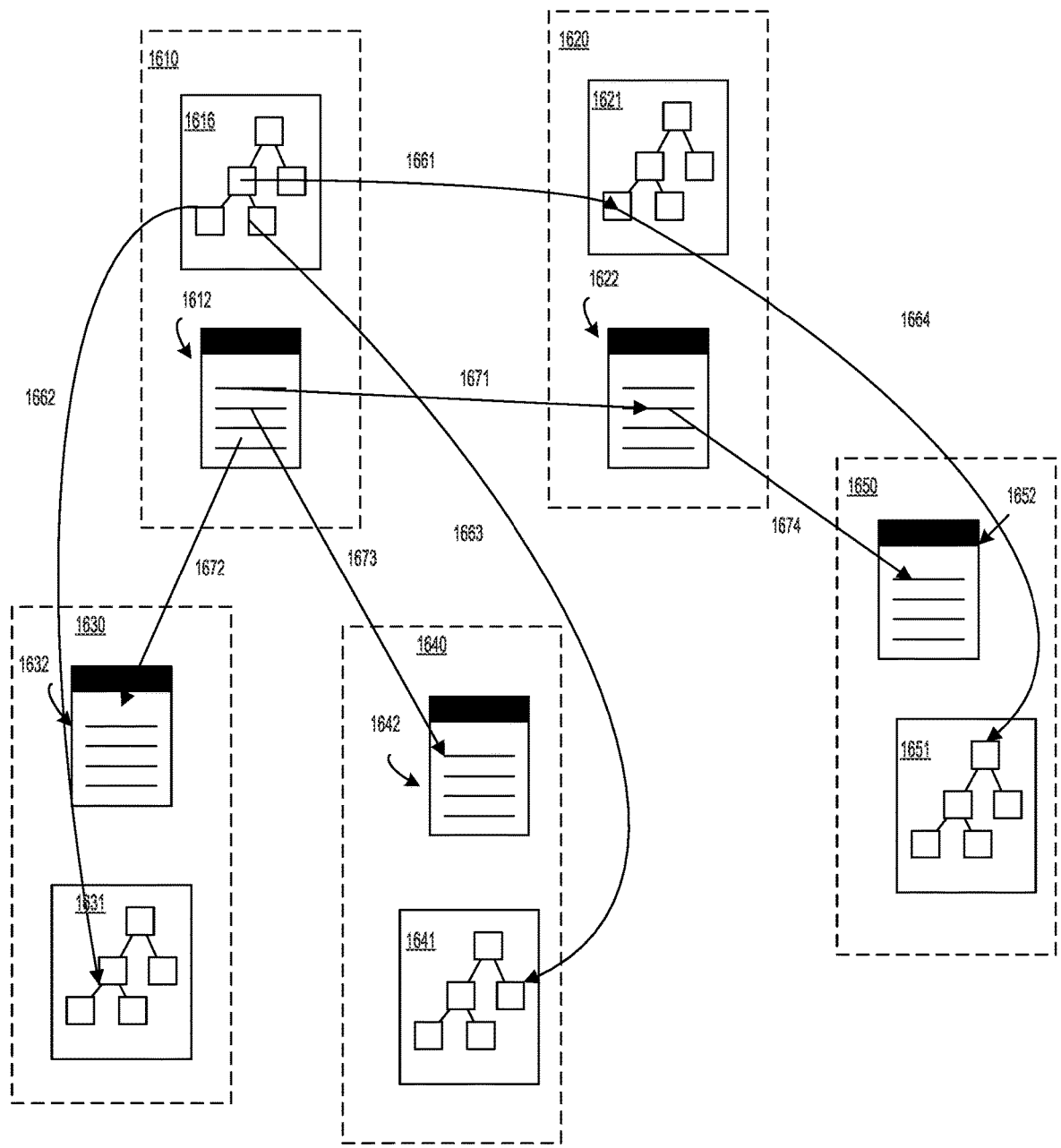
FIG. 16 depicts an example of an extended discourse tree, in accordance with an aspect.

FIG. 16 depicts an example of an extended discourse tree, in accordance with an aspect. FIG. 16 depicts extended discourse tree 1600. Extended discourse tree 1600 includes groups 1600, 1620, 1630, 1640, and 1650. Each group includes a document and a discourse tree generated from the document. For example, group 1610 includes discourse tree 1616 and document 1612, group 1620 includes discourse tree 1621 and document 1622, and so on.

Figure 12:
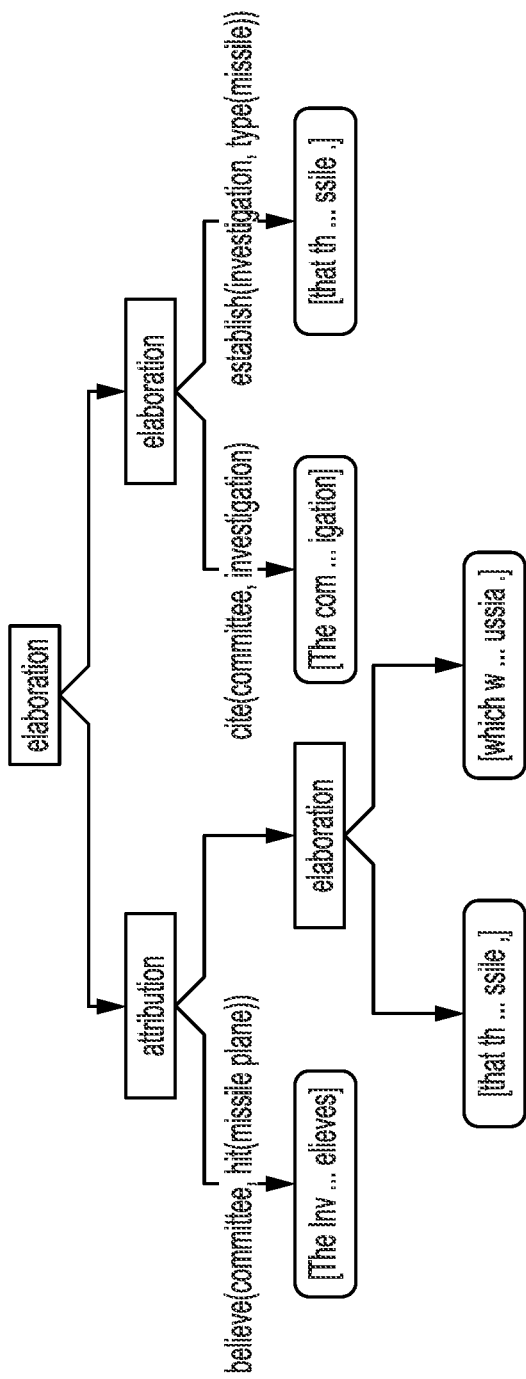
FIG. 12 illustrates a communicative discourse tree for a claim of a second agent in accordance with an aspect.
Figure 13:
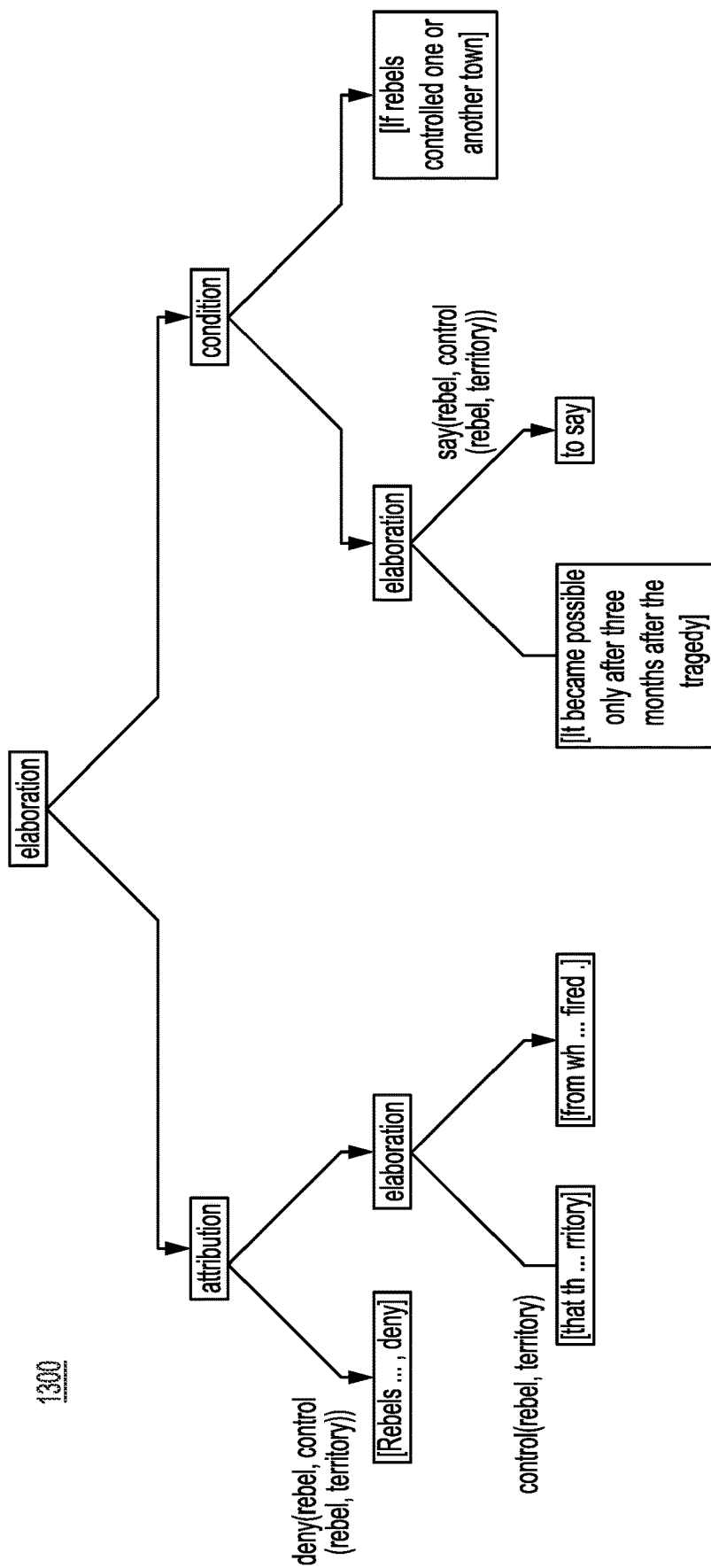
FIG. 13 illustrates a communicative discourse tree for a claim of a third agent in accordance with an aspect.
Figure 14:
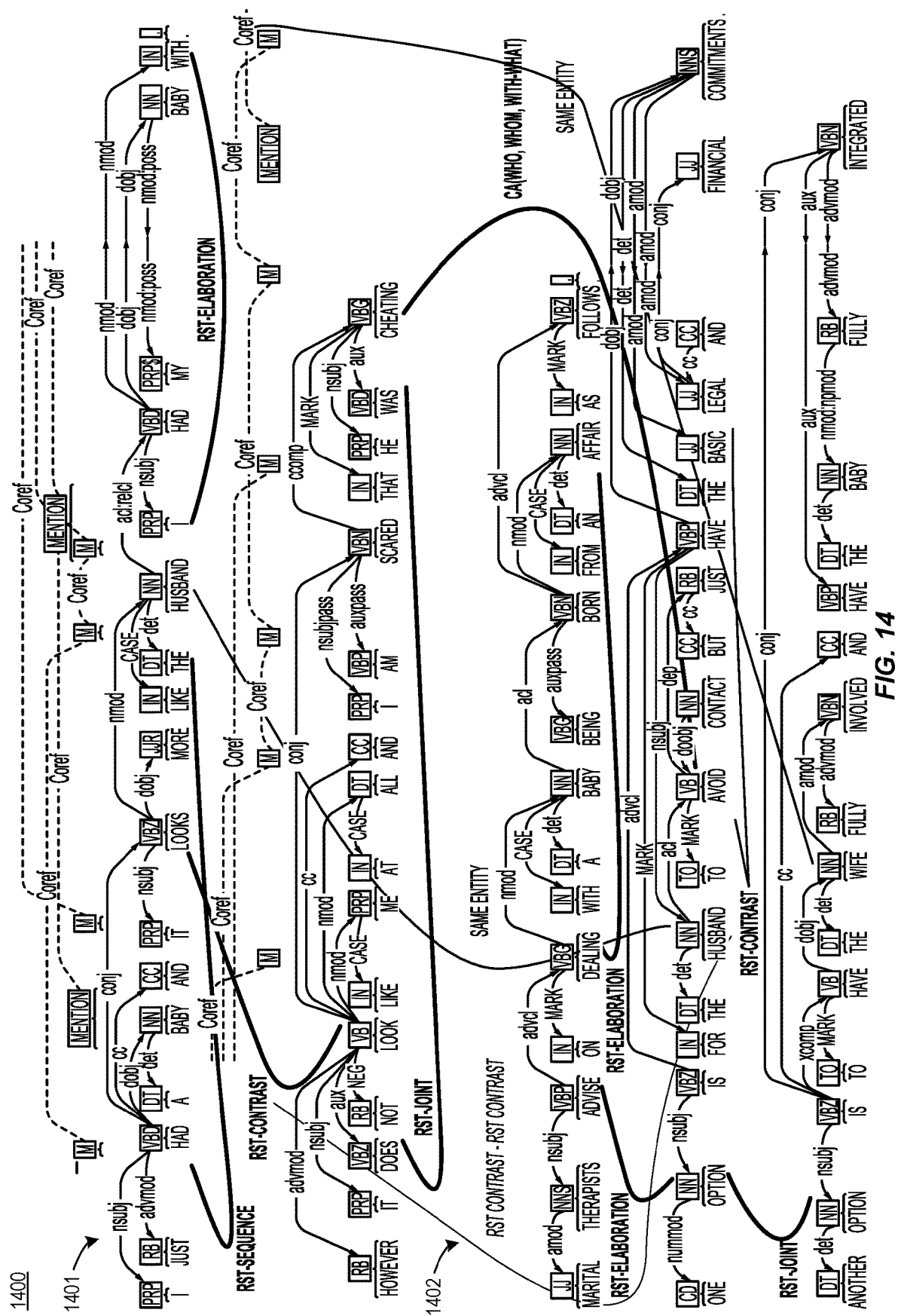
FIG. 14 illustrates parse thickets in accordance with an aspect.
Figure 15:
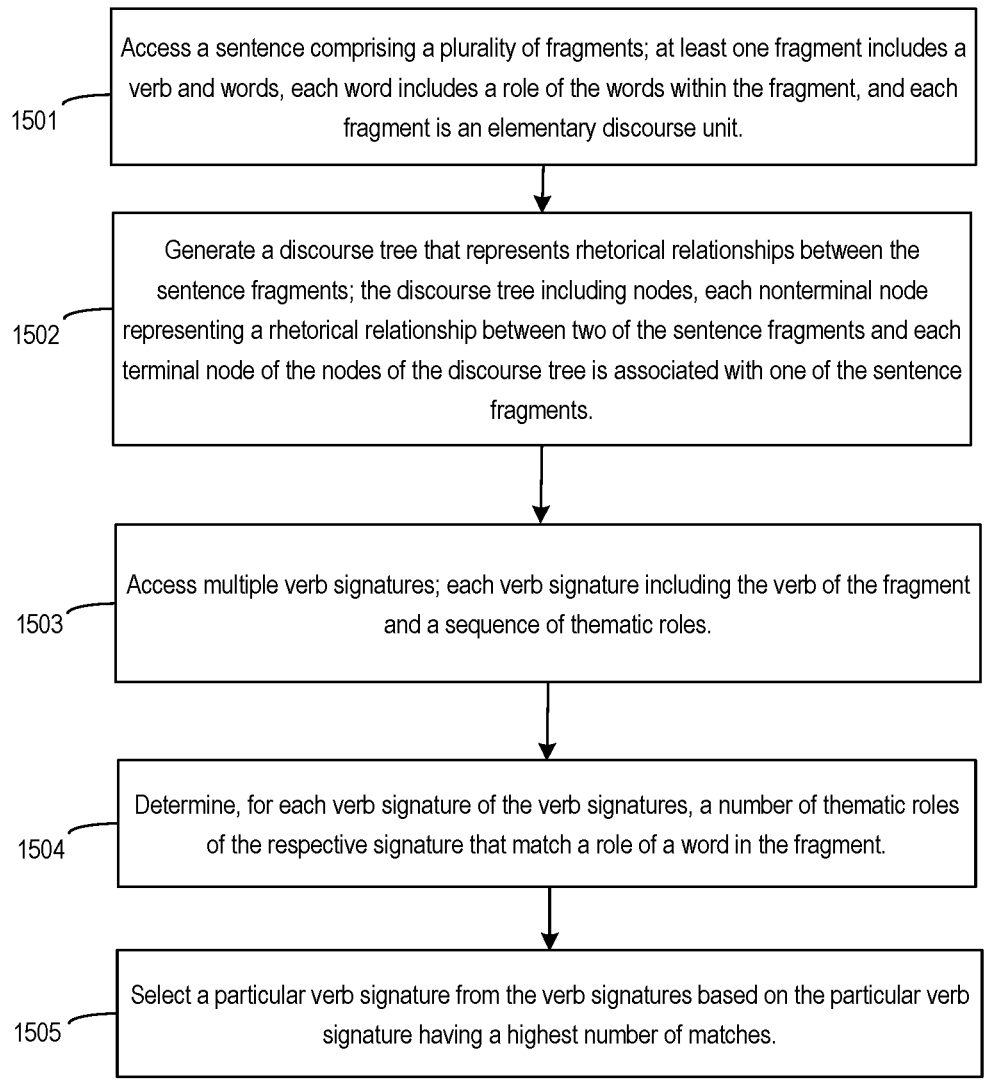
FIG. 15 illustrates an exemplary process for building a communicative discourse tree in accordance with an aspect.

In addition to links between within particular discourse trees, e.g., discourse trees 1616, 1621, 1631, 1641, and 1651, extended discourse tree 1600 includes inter-discourse tree links 1661-1664 and associated inter-document links 1671-1674. As explained further with respect to FIG. 12, discourse navigation application 122 constructs discourse trees 1616-1615. Discourse tree 1616 represents document 1612, discourse tree 1621 represents document 1622, and so on. Extended discourse tree 1600 is built by building a discourse tree for each paragraph or document.

Inter-discourse tree link 1661 connects discourse tree 1616 and 1621, inter-discourse tree link 1662 connects discourse tree 1621 and 1631, inter-discourse tree link 1663 connects discourse tree 1616 and 1641, and inter-discourse tree link 1664 connects discourse tree 1621 and 1651. Based on inter-discourse tree links 1661-1664, discourse navigation application 122 creates inter-document links 1671, 1672, 1673, and 1674, which correspond to inter-discourse tree links 1661, 1662, 1663, and 1664 respectively. Inter-document links 1671-1674 can be used to navigate documents 1612, 1622, 1632, 1642, and 1652.

Discourse navigation application 122 determines one or more entities within a first discourse tree of the discourse trees 1616-1615. Examples of entities include places, things, people, or companies. Discourse navigation application 122 then identifies the same entities present in the other discourse trees. Based on the determined entities, discourse navigation application 122 determines a rhetorical relationship between each matching entity.

For example, if an entity "San Francisco" occurs in document 1612, e.g., "San Francisco is in California," and document 1622 further explains that "San Francisco has a moderate climate but can be quite windy," discourse navigation application 122 would determine that the rhetorical relationship between the entity "San Francisco" is one of "elaboration" and mark links 1661 and 1671 as "elaboration." Continuing the example, discourse navigation application 122 determines links 1662-1664 and corresponding links 1672-1674 based on determined rhetorical relations. Discourse navigation application 122 combines the discourse trees of the paragraphs of the documents to form extended discourse tree 1600.

By using the links in extended discourse tree 1600, discourse navigation application can navigate between paragraphs of the same document or between documents, e.g., document 1612 and 1622. For example, if a user is interested in more information on a particular topic, discourse navigation application 122 navigates through an elaboration rhetorical relation from nucleus to satellite within a paragraph or an elaboration rhetorical relation hyperlink to a document that offers more specific information on the topic.

Conversely, if a user decides that a suggested topic is not exactly what is needed, the user can return to a higher-level view of the documents (e.g., from satellite to nucleus, or from narrow document to broad document). In turn, discourse navigation application 122 navigates an elaboration relationship in the opposite order, i.e., from a satellite to the nucleus at either the paragraph or between documents. Similarly, discourse navigation application 122 facilitates other navigation options such as relying on contrast or condition rhetorical relationships for exploring controversial topics.

To build rhetoric links between text fragments in different paragraphs or documents, discourse navigation application 122 identifies a relationship between entities by using a fictitious text fragment, or a temporary paragraph, from the respective text fragments of the original paragraph and perform coreference analysis and discourse parsing on the paragraph.

Figure 17:
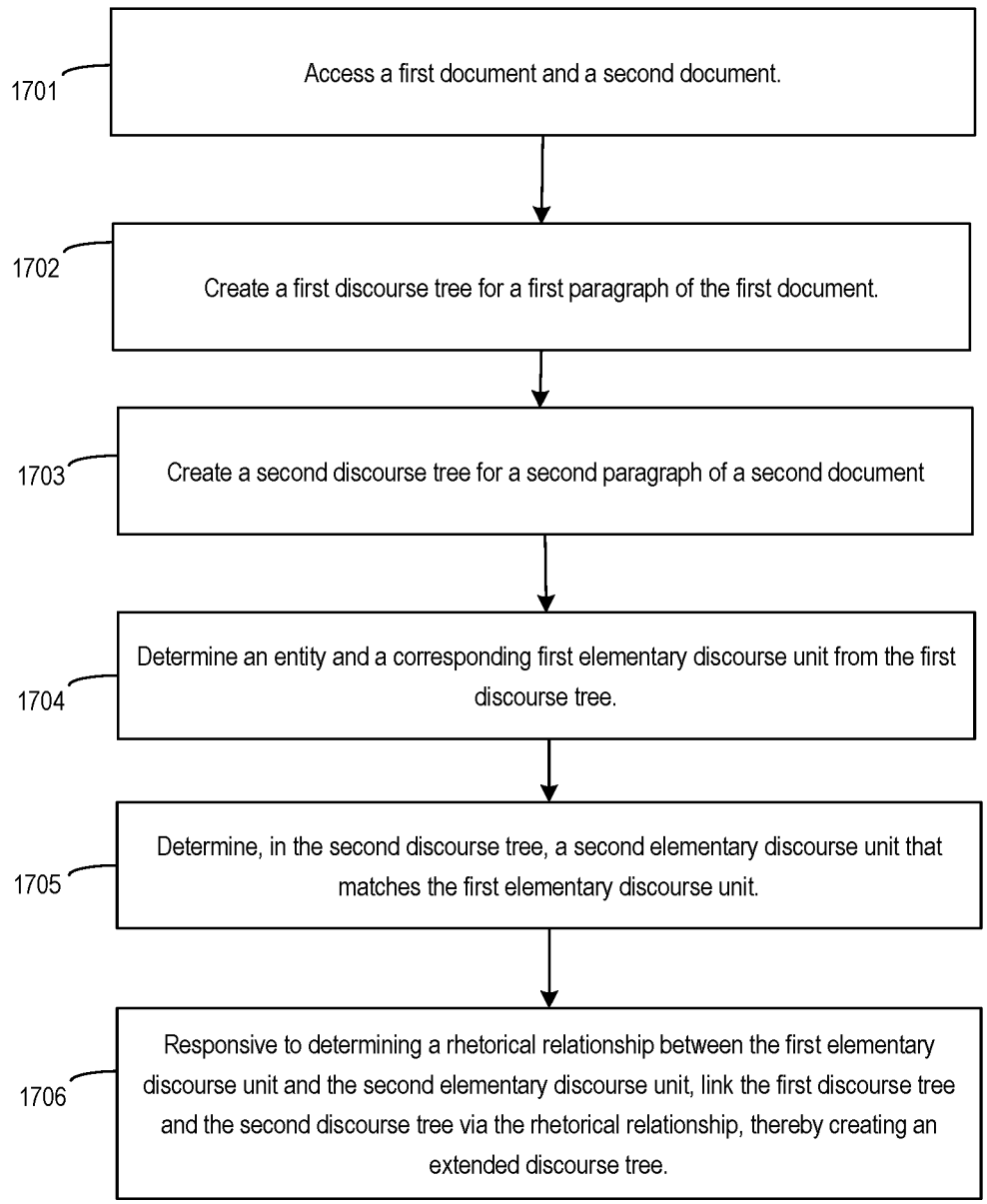
FIG. 17 depicts a flowchart of an example of a process for creating an extended discourse tree, in accordance with an aspect.

FIG. 17 depicts a flowchart of an example of a process 1700 for creating an extended discourse tree, in accordance with an aspect. The input of process 1700 is a set of documents, and an output is an extended discourse tree, which is encoded as a regular discourse tree with the labels of document identification for each node. For example purposes, process 1700 is described with respect to two documents, e.g., documents 110a-b, but process 1700 can use any number of documents.

At block 1701, process 1700 involves accessing a first document and a second document. Examples of documents include texts, books, news articles, and other electronic documents.

In an aspect, discourse navigation application 122 selects documents that are similar or identical in topic. For example, discourse navigation application 122 can determines a content score for each document, e.g., by determining similarity in keywords between documents. For example, discourse navigation application 122 determines that a first content score for the first document and a second content score for the second document are within a threshold and based on the similarity, uses the first and second documents to create an extended discourse tree.

In an aspect, discourse navigation application 122 performs document analysis that includes the generation of document trees representing the sentential and phrasal structure of the document. Rhetorical relations associated with an inter-document link can determine different navigation scenarios. By default, elaboration can be used. Discourse navigation application 122 offer a link to another document that is related by an attribution relation if the user is interested in questions such as "why," or "how." Discourse navigation application 122 can offer a link to a document that is related by a contrast relation if a user expresses disagreement with an originally presented document or asks for a document that provides a counterpoint to the current document.

In a further aspect, discourse navigation application 122 obtains the first and second document by executing a user query. Examples of user queries include "climate change" or "documents on linguistics."

At block 1702, process 1700 involves creating a first discourse tree for a first paragraph of a first document. Discourse navigation application 122 accesses a paragraph from the first document. Each sentence of the paragraph includes fragments, or elementary discourse units. At least one fragment includes a verb. Each word in the fragment includes role, e.g., the function, of the word within the fragment. Discourse navigation application 122 generates a discourse tree that represents rhetorical relationships between the fragments. The discourse tree includes multiple nodes, each nonterminal node representing a rhetorical relationship between two fragments and each terminal node associated with one of the fragments. Discourse navigation application 122 continues in this manner, building a set of discourse trees for each paragraph in the first document. Process 1700 is described with respect to a paragraph as a unit of text but other sizes of text can be used.

At block 1703, process 1700 involves creating second discourse tree for a second paragraph of a second document. At block 1703, process 1700 performs substantially similar steps for the second document as performed for the first document at block 1702. In the case that process 1700 creates an extended discourse tree for more than two documents, process 1700 performs the functions described at block 1702 on multiple documents. Process 1700 can iterate through all pairs of discourse trees in the set of discourse trees where each discourse tree corresponds to a document. Pairs of discourse trees can be represented by:

$DT_i$ and $DT_j \in DTA$.

At block 1704, process 1700 involves determining an entity and a corresponding first elementary discourse unit from the first discourse tree. Various methods can be used such as keyword processing (searching for one of a list of predefined keywords in the sentences of the first document), using a trained machine-learning model, or searching an internet resource. Discourse navigation application 122 identifies all noun phrases and named entities in the discourse trees $DT_i$ and $DT_j$.

In an example, discourse navigation application 122 extracts a noun phrase from the discourse tree. Discourse navigation application 122 then classifies the noun phrase as either (i) an entity or (ii) not an entity by using a trained machine learning model.

At block 1705, process 1700 involves determining, in the second discourse tree, a second elementary discourse unit that matches the first elementary discourse unit. More specifically, discourse navigation application 122 computes overlap and identify common entities $E_{i,j}$ between $DT_i$ and $DT_j$. Discourse navigation application 122 establishes relationships between occurrences of entities in $E_{i,j}$ such as equals, sub-entity, or part-of. Discourse navigation application 122 then forms inter-paragraph rhetorical links $R(E_{i,j})$ for each entity pair occurrence in $E_{i,j}$.

At block 1706, process 1700 involves responsive to determining a rhetorical relationship between the first elementary discourse unit and the second elementary discourse unit, linking the first discourse tree and the second discourse tree via the rhetorical relationship, thereby creating an extended discourse tree. More specifically, discourse navigation application 122 classifies a rhetorical relation for each rhetorical link by forming a merging of text fragments, e.g., $EDU(E_i)$ and $EDU(E_j)$, building its DT and using recognized relation label for this rhetorical link.

In an aspect, discourse navigation application 122 combines the first elementary discourse unit and the second elementary discourse unit into a temporary paragraph. Discourse navigation application 122 then determines a rhetorical relationship between the first and second elementary discourse units within the temporary paragraph by applying discourse parsing to the temporary paragraph.

In a further aspect, responsive to not determining a rhetorical relationship, discourse navigation application 122 creates a default rhetorical relationship of type elaboration between the first elementary discourse unit and the second elementary discourse unit and links the first discourse tree and the second discourse tree.

In an aspect, discourse navigation application 122 performs automated building and categorizing of links between textual spans across documents. Here the following family of approaches can be used: lexical distance, lexical chains, information extraction, and linguistic template matching. Lexical distance can use a cosine similarity across pairs of sentences, and lexical chains can be more robust leveraging synonymy and hypernymy.

Extended discourse trees can form relationships between two or more documents at different levels of granularity. For example, relationships can be determined between elementary discourse units, as described with respect to process 1700. Additionally, extended discourse trees can represent relationships between words, sentences, paragraphs, sections of documents, or entire documents. As depicted, each individual graph consists of smaller subgraphs for each individual document. Links are shown that represent logical connection between topics within a single document.

Figure 18:
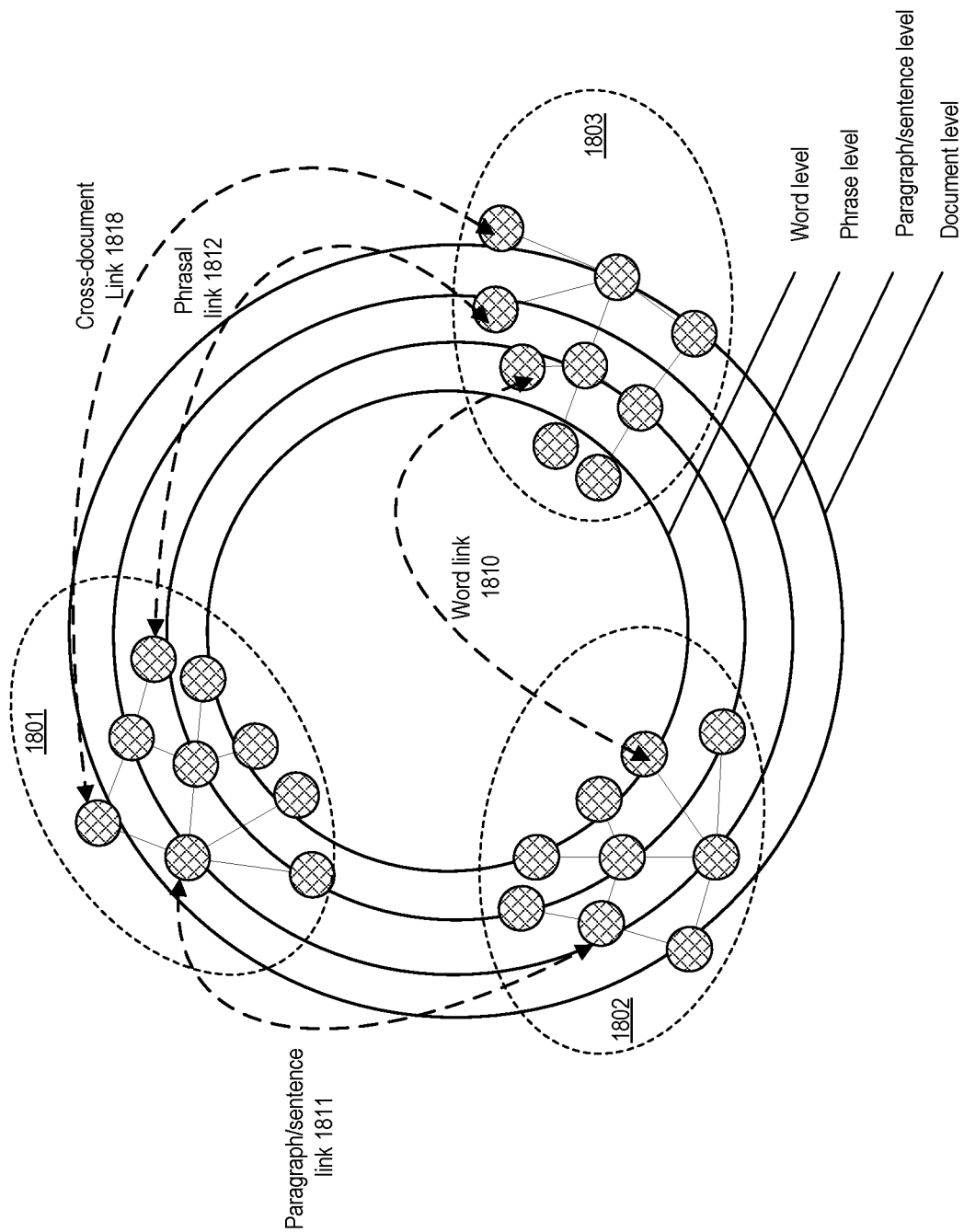
FIG. 18 also depicts relationships between textual units of documents at different levels of granularity, in accordance with an aspect.

FIG. 18 also depicts relationships between textual units of documents at different levels of granularity, in accordance with an aspect. FIG. 18 depicts discourse trees 1801, 1802, and 1803, each corresponding to a separate document. FIG. 18 also depicts various inter-document links, such as word link 1810 that links words in discourse trees 1802 and 1803, paragraph/sentence link 1811 that links paragraphs or sentences in documents 1801 and 1802, phrasal link 1812 that links phrases in documents 1801 and 1803, and cross-document link 1818 that links documents 1801 and 1803. Discourse navigation application 122 can use links 1810-1818 to navigate between documents 1801-1803.

Using Extended Discourse Trees for Navigation

Extended discourse trees such as those created by process 1700 can be used to navigate documents or other bodies of text. Extended discourse trees enable different applications such as autonomous agents, improved search and navigation, and question-answer coordination.

Figure 19:
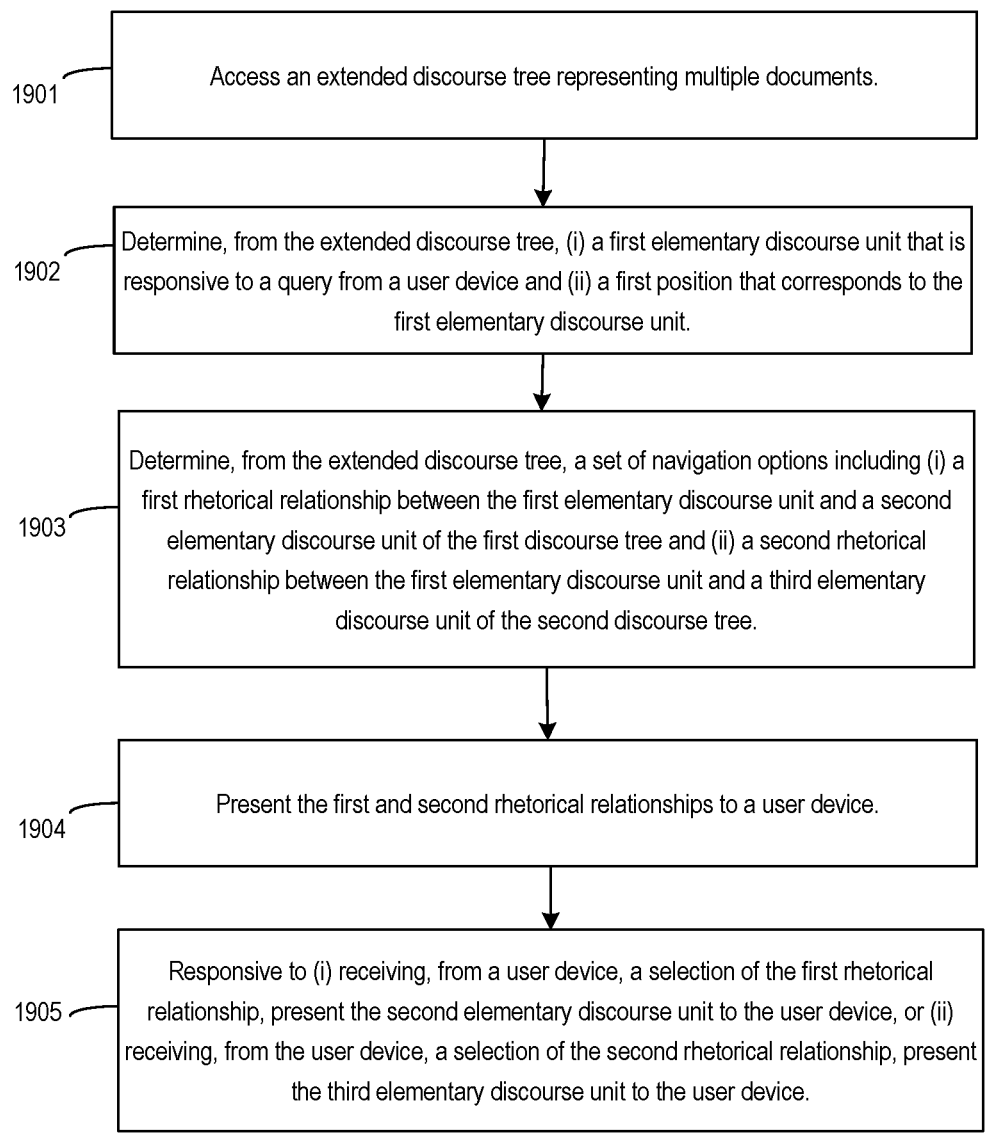
FIG. 19 depicts a flowchart of an example of a process for using an extended discourse tree to navigate between documents, in accordance with an aspect.

FIG. 19 depicts a flowchart of an example of a process 1900 for using an extended discourse tree to navigate between documents, in accordance with an aspect.

At block 1901, method 1900 involves accessing an extended discourse tree representing multiple documents. As described with respect to process 1200, an extended discourse tree can include a first discourse tree for a first document and a second discourse tree for a second document and a set of links between the documents representing rhetorical relations.

In an aspect, the documents can be responsive to a particular user question or query. Discourse navigation application 122 can perform a search of a set of documents, database, or internet resource to determine relevant documents. Additionally, discourse navigation application 122 can use the question or query as the first document and a document that includes an answer to the question or query as the second document.

At block 1902, method 1900 involves determining, from the extended discourse tree, a first elementary discourse unit that is responsive to a query from a user device and a first position that corresponds to the first elementary discourse unit. Determining a first elementary discourse unit can involve matching one or more keywords from the query in the first elementary discourse unit. For example, if a threshold number of keywords in the query match an elementary discourse unit, then the elementary discourse unit is selected.

For example, discourse navigation application 122 receives a user query, e.g., "Atlanta." Discourse navigation application 122 determines a first elementary discourse unit that includes the entity "Atlanta." Discourse navigation application 122 then determines the associated position within the first discourse tree. Position can be indicated by different means such as a node number or an ordered pair that includes a document identifier and a paragraph identifier.

At block 1903, method 1900 involves determining, from the extended discourse tree, a set of navigation options. The options can include rhetorical relations between elementary discourse units within a document such as a first rhetorical relationship between the first elementary discourse unit and a second elementary discourse unit of the first discourse tree. Options can also include rhetorical relations between documents such as a second rhetorical relationship between the first elementary discourse unit of the first discourse tree and a third elementary discourse unit of the second discourse tree.

Continuing the above example, discourse navigation application 122 determines that two options are available: one within the first discourse tree that elaborates on "Atlanta," e.g., "the Atlanta Braves" and another in the second discourse tree that includes further information on "Georgia Tech."

At block 1904, method 1900 involves presenting the first and second rhetorical relationships to a user device. Continuing the above, example, user device 170 presents "the Atlanta Braves," and "Georgia Tech," to the user.

At block 1905, method 1900 involves responsive to (i) receiving, from a user device, a selection of the first rhetorical relationship, presenting the second elementary discourse unit to the user device, or (ii) receiving, from the user device, a selection of the second rhetorical relationship, presenting the third elementary discourse unit to the user device.

Continuing the above example, user device 170 receives a selection of "Georgia Tech," and in response, discourse navigation application 122 provides the elementary discourse unit corresponding to "Georgia Tech," e.g., "Georgia Tech is a research university in Atlanta," to user device 170.

In an aspect, discourse navigation application 122 uses the selected result to perform further analysis. For example, based on the selection of "Georgia Tech," discourse navigation application can search for entities related to "Georgia Tech" in one or more documents or search for additional documents to analyze and optionally integrate into the extended discourse tree.

Applications of Extended Discourse Trees to Autonomous Agents

Autonomous agents are designed to imitate human intellectual activity maintaining a dialogue. Agents can operate in an iterative manner to provide efficient and effective information for users. Existing solutions for implementing autonomous agents, including those that use deep learning of word sequences in dialogs, attempt to build a plausible sequence of words to respond to a user query. In contrast, certain aspects described herein use extended discourse trees to enable an agent to guide a user to navigate to an appropriate answer as fast as possible.

For example, if a user formulates the following query "Can I pay with one credit card for another," the agent attempts to recognize user intent and a background knowledge about this user to establish a proper context. For example, an individual may wish to pay with one credit card for another to avoid late payment fee when cash is unavailable. Instead of giving answers in the form of snippets with links to relevant web pages to this question like major search engines do, certain aspects provide topics of answers for a user to choose from. Such topics gives a user a chance to assess how his request was understood on one hand and what are the knowledge area associated with her question on the other hand. In our examples, topics include "balance transfer", "using funds on a checking account", or "canceling your credit card." A user is prompted to select a clarification option, drill into either of these options, or decline all options and request a new set of topics which the agent can identify.

Using extended discourse trees, discourse navigation application 122 can start with the root node of a discourse tree that represents a section of text that matches the user query most closely. Then, discourse navigation application 122 builds a set of possible topics by extracting phrases from elementary discourse units which are satellites of the root node of the discourse tree. If the user accepts a given topic, the navigation continues along the chosen edge of the graph. Otherwise, if no topic covers the user interest, discourse navigation application 122 navigates backward in the extended discourse tree and proceeds to another other section or another document that matched the original user query.

Figure 20:
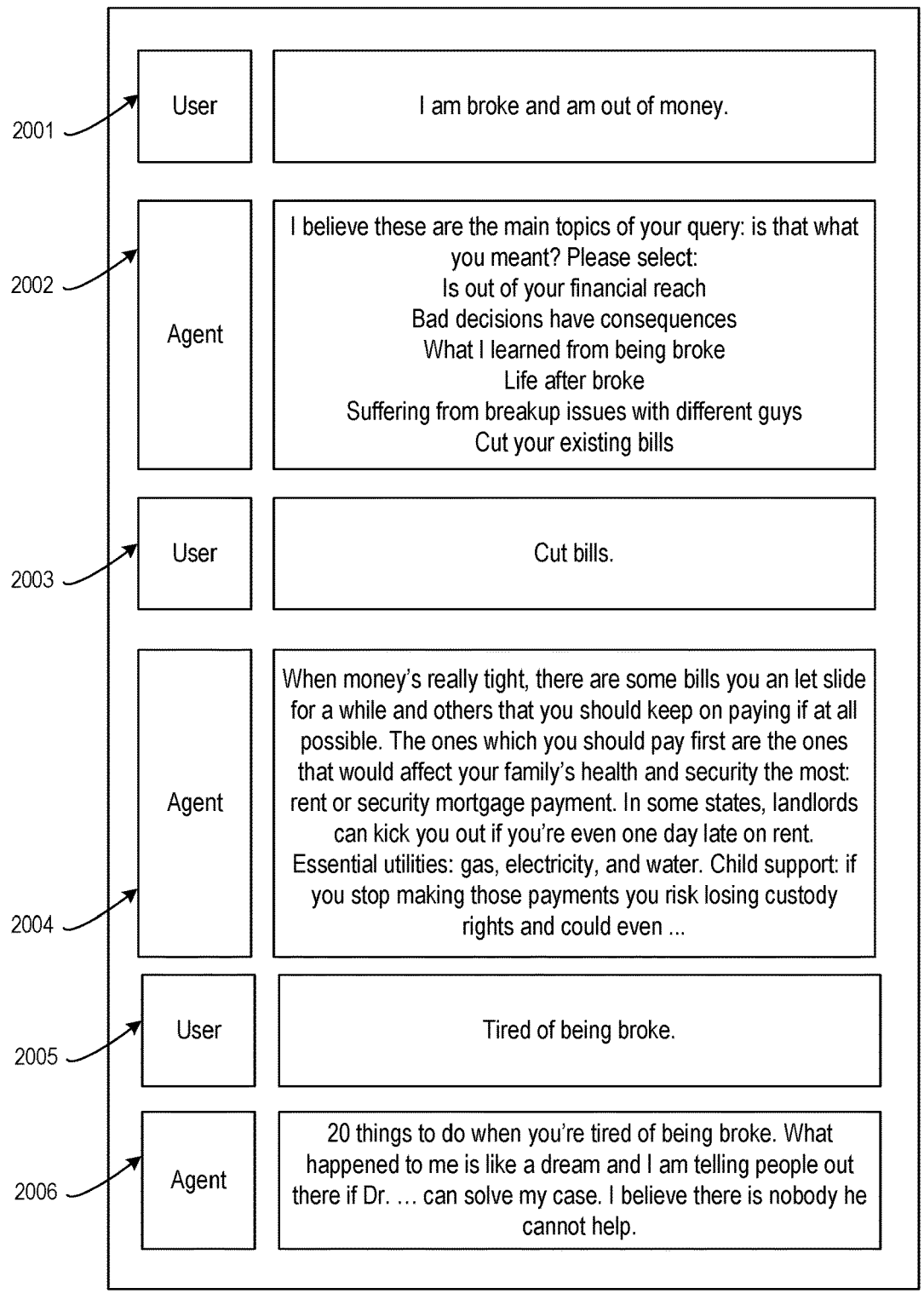
FIG. 20 depicts an example of an autonomous agent using an extended discourse tree to answer user questions, in accordance with an aspect.

FIG. 20 depicts an example of an autonomous agent using an extended discourse tree to answer user questions, in accordance with an aspect. FIG. 20 depicts chat window 2000, which includes messages 2001-2006. Messages 2001, 2003, and 2005 are sent by user device 170 and messages 2002, 2004, and 2006 are sent by the autonomous agent implemented by discourse navigation application 122.

As can be seen, user device 170 initiates a conversation the agent by sending message 2001 that states "I am broke and out of money." The agent navigates an extended discourse tree, finds the topic in a first discourse tree within the extended discourse tree, and determines several topics that are responsive to message 2001.

As illustrated in message 2002, topics include "Is out of your financial reach," "Bad decisions have consequences," "What I learned from being broke," "Life after broke," "Suffering from breakup issues with different guys," "Cut your existing bills." Each topic is determined by navigating links in the extended discourse tree. Each topic can be in the first discourse tree or another discourse tree, as the extended discourse tree includes links between documents and within documents.

With message 2003, user device 170 selects the "cut bills" option from the options provided by the agent. Then, the agent provides user device 170 with a paragraph of associated text. This process continues as illustrated by messages 2004-2006.

Applications of Extended Discourse Trees to Search and Content Exploration

On the web, information is usually represented in web pages and documents, with certain section structure. Answering questions, forming topics of candidate answers and attempting to provide an answer based on user selected topic are the operations which can be represented with the help of a structure which includes discourse trees of texts involved. When a certain portion of text is suggested to a user as an answer, this user might want to drill in something more specific, ascend to a more general level of knowledge or make a side move to a topic at the same level. These user intents of navigating from one portion of text to another can be represented as coordinate or subordinate discourse relations between these portions.

Aspects of the present disclosure improve access times for web-based search. For example, aspects can dynamically organize chunks of text from various webpages and documents into a tree form so that depending on user's choice the system navigates to the intended terminal leaf of this tree as fast as possible. Additionally, if a user describes her problem in multiple sentences, the autonomous agent attempts to address this problem by finding an answer whose rhetoric structure is coordinated with that of the questions. By doing that, the agent is providing answers not only about the entities from questions but also matching logical interrelationships between them.

Content Exploration

In an aspect, extended discourse trees are used to facilitate content exploration. In an example, user device 170 receives a question from a user "What is faceted search?" The user desires to understand how faceted search operates and therefore would like to become fluent with other associated concepts.

In response, discourse navigation application 122 provides further content exploration or search options. Discourse navigation application 122 determines a relevant set of documents by forming an extended discourse tree.

Figure 21:
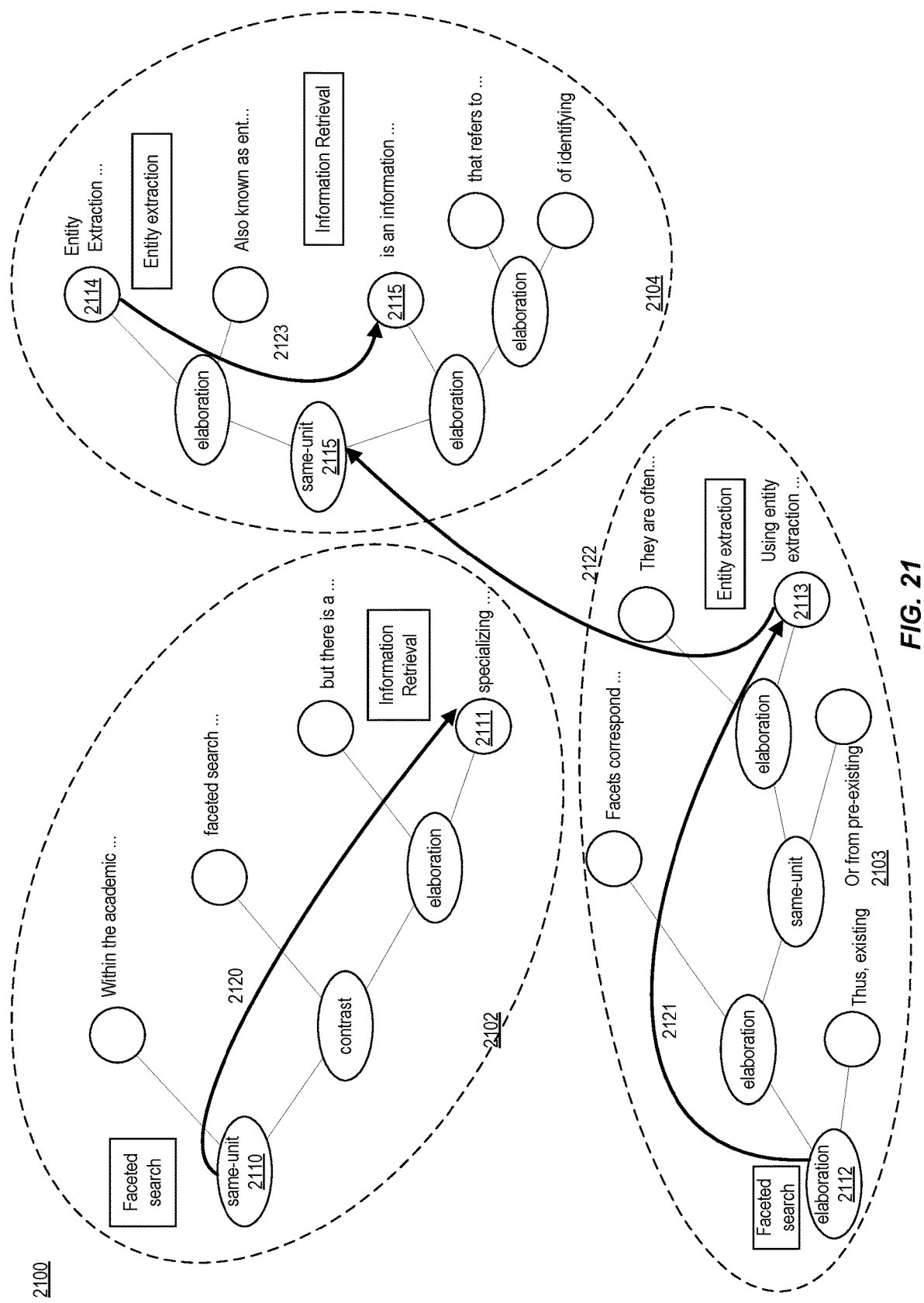
FIG. 21 depicts an example of an extended discourse tree, in accordance with an aspect.

FIG. 21 depicts an example of an extended discourse tree, in accordance with an aspect. FIG. 21 depicts extended discourse tree 2100, which includes discourse trees 2102, 2103, and 2104. Each discourse tree 2102-2104 is created from a specific paragraph of text. In this example, discourse navigation application 122 creates individual discourse trees 2102-2104 from different paragraphs of text. However, different size units of text are possible such as sentences or multiple paragraphs.

More specifically, discourse navigation application 122 creates discourse tree 2103 from the following text that relates to the topic of faceted search: "Facets correspond to properties of the information elements. They are often derived by analysis of the text of an item using entity extraction techniques or from pre-existing fields in a database such as author, descriptor, language, and format. Thus, existing web-pages, product descriptions or online collections of articles can be augmented with navigational facets."

Additionally, discourse navigation application 122 creates discourse tree 2102 from the following text that also relates to the topic of faceted search: "Within the academic community, faceted search has attracted interest primarily among library and information science researchers, but there is a limited interest of computer science researchers specializing in information retrieval."

Discourse navigation application 122 creates discourse tree 2104 from the following text that relates to the topic of entity extraction: "Entity extraction, also known as entity name extraction or named entity recognition, is an information retrieval technique that refers to the process of identifying and classifying key elements from text into pre-defined categories."

From the created discourse trees, discourse navigation application 122 identifies the following additional entities for content exploration: (1) entity extraction, (2) information retrieval, (3) pre-existing fields in a database, and (4) augmented with navigational facets. More specifically, discourse navigation application 122 determines that these entities are related by elaboration relations and creates links 2120-2123. Information retrieval, represented by node 2111, elaborates on faceted search, represented by node 2110, therefore link 2120 connects nodes 2110 and 2111. Entity extraction, represented by node 2113 elaborates on faceted search, represented by node 2112, therefore link 2121 connects nodes 2112 and 2113. Information retrieval, represented by node 2115, elaborates on entity extraction, node 2114, therefore link 2123 relates connects nodes 2114 and 2115. Finally, discourse navigation application 122 that node 2115 elaborates on entity extraction, therefore discourse navigation application 122 creates an inter-discourse tree link 2122 that connects nodes 2113 and 2115.

Discourse navigation application 122 provides the entities to user device 170. User device 170 provides the entities to a user, who can either follow a link to land on a single piece of information or run a new search to get to multiple search results to choose from. For example, starting at "faceted search," user device 170 can navigate to information retrieval (e.g., via link 2120 to node 2111), entity extraction (e.g., via link 2121 from node 2112 to node 2113), to information retrieval (via link 2122), or to further information on information retrieval (via link 2123 to node 2115).

Creating Additional Extended Discourse Trees

Discourse navigation application 122 can construct additional extended discourse trees from existing extended discourse trees. More specifically, by using machine learning model 130, discourse navigation application 122 can create an extended discourse tree based on discourse trees for text that is in a first domain (e.g., engineering) by using a set of extended discourse trees for text that is in a second domain (e.g., law).

In an example process, discourse navigation application 122 accesses a first discourse tree representing a first document of a set of documents and a second discourse tree representing a second document from the set of documents.

Continuing the example, the discourse navigation application 122 obtains a reference extended discourse tree from a set of extended discourse trees by applying the first discourse tree and the second discourse tree to a trained classification mode, e.g., machine learning model 130. The set of extended discourse trees includes multiple extended discourse trees created by a process such as process 1700. More specifically, the classification model iterates through the set of extended discourse trees to identify a first candidate discourse tree and a second candidate discourse tree. The classification model identifies the first candidate discourse tree and the second candidate discourse tree as a best match for the first discourse tree and the second discourse tree. The classification model can use different models such as classifiers or nearest neighbor, etc.

Continuing the example, the discourse navigation application 122 determines, from the reference extended discourse tree, one or more links between the first reference discourse tree and the second reference discourse tree. Links can be determined by using process 1700 (e.g., block 1706). The discourse navigation application 122 then propagates the links to the first discourse tree and the second discourse tree, thereby creating an extended discourse tree. In this manner, discourse navigation application 122 has created an extended discourse tree by identifying an extended discourse tree that includes discourse trees that are similar to the first and second discourse tree and then by generating appropriate inter-discourse tree links.

Datasets for Evaluation

We experiment with the TREC datasets of the Web 2009 (queries 1-50) and Web 2010 (queries 51-100) tracks, that contain collectively 100 queries and their relevance assessments on the Clueweb09 cat. B dataset2 (50,220,423 web pages in English crawled between January and February 2009). We choose these datasets because they are used widely in the community, allowing comparisons with state-of-the-art. We remove spam using the spam rankings of Cormack et al. with the recommended setting of percentile score<70 indicating spam3. We consider a subset of this collection, consisting of the top 1000 documents that have been retrieved in response to each query by the baseline retrieval model on tuned settings (described in section 4.1.2) using the Indri IR system.

We formed a dataset of Q/A pairs related to car repair recommendations. These pairs were extracted from dialogues as first and second utterance, so that the question is seven-fifteen keywords and answer is three to six sentences. This resource was obtained to train a dialog support system but it also proved to be useful to evaluate search. This dataset is scraped from (CarPros 2017) and is available at (Github Car Repair Dataset 2017).

Answer (Webscope 2017) is a set of question-answer pairs with broad topics. Out of the set of 140 k user questions we selected 3300 of those, which included three to five sentences. Answers for most questions are fairly detailed so no filtering by sentence length was applied to answers.

Our social media dataset includes the Request-Response pairs mainly from postings on Facebook. We also used a smaller portion of LinkedIn.com and vk.com conversations related to employment. In the social domains the standards of writing are fairly low. The cohesiveness of text is very limited and the logical structure and relevance frequently absent. The authors formed the training sets from their own accounts and also public Facebook accounts available via API over a number of years (at the time of writing Facebook API for getting messages is unavailable). In addition, we used 860 email threads from Enron dataset. Also, we collected the data of manual responses to postings of an agent which automatically generates posts on behalf of human users-hosts. We formed 4000 pairs from the various social network sources.

The dataset of financial questions is scraped from Fidelity.com. This dataset would demonstrate how search relevance improvement may occur in a vertical domain with a reasonable coverage. We compared the efficiency of information access using the proposed chat bot in comparison with a major web search engines such as Google, for the queries where both systems have relevant answers. For a search engines, misses are search results preceding the one relevant for a given user. For a chat bot, misses are answers which causes a user to choose other options suggested by the agent, or request other topics.

The topics of question included personal finance. Twelve users (author's colleagues) asked the agent 15-20 questions reflecting their financial situations, and stopped when they were either satisfied with an answer or dissatisfied and gave up. The same questions were sent to Google, and evaluators had to click on each search results snippet to get the document or a webpage and decide on whether they can be satisfied with it.

The structure of comparison of search efficiency for the chat bot vs the search engine is shown in Table 4. The top portion of arrows shows that all search results (on the left) are used to form a list of topics for clarification. The arrow on the bottom shows that the bottom answer ended up being selected by the chat bot based on two rounds of user feedback and clarifications.

Figure 22:
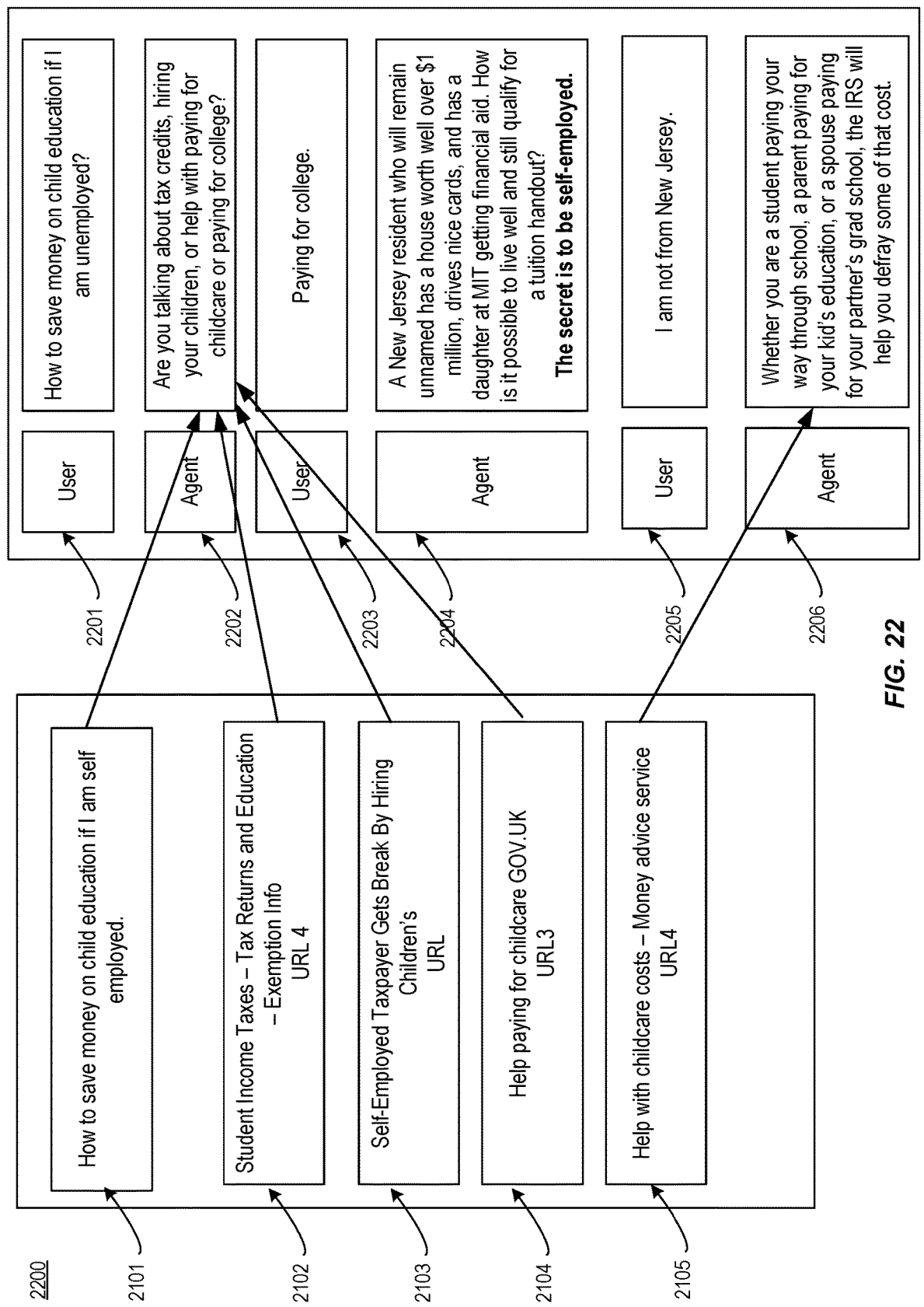
FIG. 22 depicts a comparison between navigation using a search engine and navigation using an autonomous agent enabled with extended discourse trees, in accordance with an aspect.

FIG. 22 depicts a comparison between navigation using a search engine and navigation using an autonomous agent enabled with extended discourse trees, in accordance with an aspect. FIG. 22 depicts comparison 2200, which includes question 2201 presented to a search engine, results 2102-2105 gathered in response to the search, interactions 2201-2206 between user, and autonomous agent. The arrows show how multiple search results on distinct topics converged into a single clarification request enumerating automatically extracted topics.

Instead of looking into all search results to find the relevant one (using a search engine, on the left), a user answers a clarification request composed by the agent and drills into his topic of interest (on the right). The arrows show how multiple search results on distinct topics are converged into a single clarification request enumerating automatically extracted topics. A selected topic would then navigate a user to a new document or a new section of the same document.

TABLE 4

Comparison of the time spent and a number of iterations for the chat bot of this demo proposal and Google search in the domain of personal finance.

| Parameter/search engine | Conventional web search | Chat bot |
| --- | --- | --- |
| Average time to satisfactory search result, sec | 45.3 | 58.1 |
| Average time of unsatisfactory search session (ended in giving up and starting a new search,) sec | 65.2 | 60.5 |
| Average number of iterations to satisfactory search result | 5.2 | 4.4 |
| Average number of iterations to unsatisfactory search result | 7.2 | 5.6 |

One can observe in Table 4 that the chat bot's time of knowledge exploration session is longer than search engines'. Although it might seem to be less beneficial for users, businesses prefer users to stay longer on their websites, since the chance of user acquisition grows. Spending 7% more time on reading agent answers is expected to allow a user to better familiarize himself with a domain, especially when these answers follow the selections of this user. The number of steps of an exploration session for agent is a quarter of what is required by a search engine. Traditional ways to measure search engine performance such as MAP and NDCG are also applicable for a comparison between conventional search engines and chat bots with respect to efficiency of information access (Sakai 2007). Using a chat bot with extended discourse tree-driven navigation is an efficient and fruitful way of information access, in comparison with conventional search engines and chat bots focused on imitation of a human intellectual activity.

Dialogue Management Using Discourse Trees

As discussed, certain aspects relate to using discourse trees or communicative discourse trees to navigate text. An example of an application is data exploration. In some task-oriented domains, an objective is to fully inform a user about a particular important piece of information. Further, believability of the information is helpful. The user should believe the information that is being provided. To facilitate this, autonomous agents can rely on text relating to rhetorical relations of types explanation and argumentation in certain cases. In this manner, autonomous agents can navigate a user through possible disagreements and misunderstandings to ensure that an issue is fully explained.

In a more specific example, rather than providing the whole paragraph of text to a user, an autonomous agent can divide the text into logical parts, determined by using discourse trees, and provide relevant parts of text to the user on a part-by-part basis, thereby improving an educational value of the text. The agent uses the discourse tree (DT), which provides a structure for how the author of the text organized her thoughts. As discussed, a DT is a labeled tree in which the leaves correspond to contiguous units for clauses (elementary discourse units, EDUs). Adjacent EDUs, as well as higher-level (larger) discourse units, are organized in a hierarchy by rhetorical relation (e.g., Reason, Temporal sequence). An anti-symmetric relation involves a pair of EDUs: nuclei, which are core parts of the relation, and satellites, which are the supportive parts of the rhetorical relation. A satellite is delivered by the autonomous agent to a user as an utterance when a corresponding nucleus has already been received and acknowledged by the user. Rhetorical relations are applied recursively in a text, until all units in that text are constituents in rhetorical relations. Therefore, a discourse tree includes a top-level relation that encompasses other relations at lower levels.

Further, some aspects use communicative discourse trees (CDTs). CDTs are designed to combine rhetorical information with speech act structures to CDTs are DTs with arcs labeled with expressions for communicative actions. These expressions are logic predicates expressing the agents involved in the respective speech acts and their subjects. The purpose of adding these labels is to incorporate the speech act—specific information into DTs so that their learning occurs over a richer features set than just rhetorical relations and syntax of elementary discourse units (EDUs).

As discussed rhetorical relations act between a nucleus and a satellite can be considered the most important parts of text whereas satellites contribute to the nuclei and are secondary. A nucleus contains basic information and satellite contains additional information about nucleus. The satellite can often be incomprehensible without the corresponding nucleus. By contrast, a text where a satellites have been deleted can be understood to a certain extent. Hence the content delivery should generally be established in a way that nucleus is delivered first and satellite second. If the user is explicitly asking about a topic which occurs in a satellite, the satellite can be delivered but its nucleus should be given in one form or another as well.

Navigating a body of text can be done in a linear fashion: starting from the first phrase or sentence fragment, and finishing with the last phrase or fragment. But by navigating in this manner, the user is not presented information from general to specific (including attributes and relations between entities). Hence, certain aspects improve readability and comprehensibility by using discourse-based techniques. Additionally or alternatively, a user intent is determined from user utterances. Determining intent is useful in navigating text in a manner that keeps a user engaged in listening or reading. A list of user intents is presented in Table 5.

TABLE 5

Basic user intents
User Intent

Figure 23:
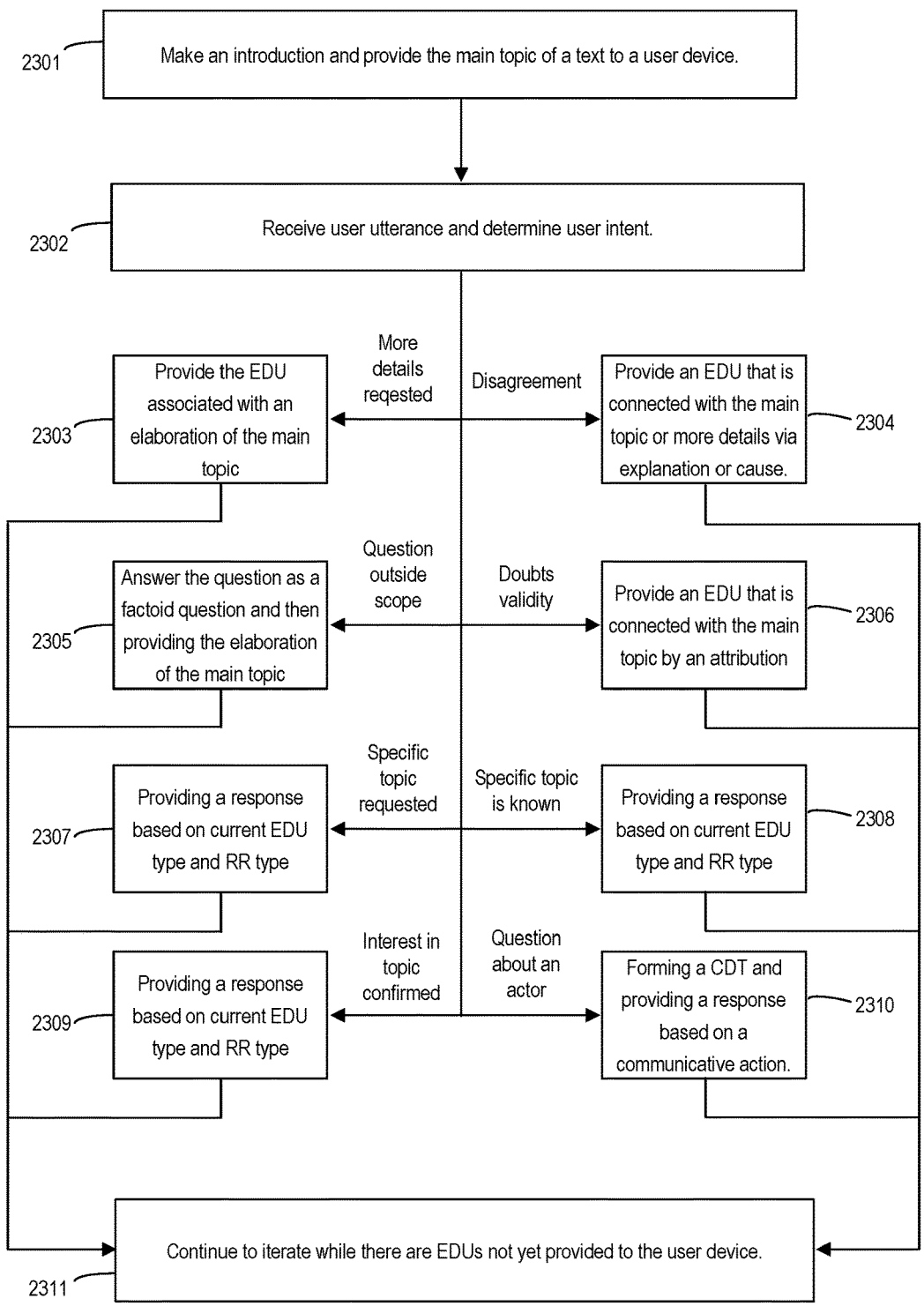
FIG. 23 depicts a flowchart of an example of a process for using a discourse tree to navigate within a document, in accordance with an aspect.

Ask for a specific topic
Confirm that topic is familiar
Confirm that there is an interest in a topic
Go to more details/zoom in
Learn a reason
Learn a consequence
Learn an argument for a claim
Disagree with a statement FIG. 23 depicts a flowchart of an example of a process 2300 for using a discourse tree to navigate within a document, in accordance with an aspect. Process 2300 can be used to traverse a discourse tree and provide information to satisfy a user's intent as the intent changes throughout navigation.

At block 2301, process 2300 involves making an introduction and providing a main topic of a text to a user device. In an example, discourse navigation application 122 accesses input documents 110a-n, identifies the main topic from one or more of the input documents 110a-n, and provides the topic to user device 170.

Discourse navigation application 122 implements an autonomous agent. Navigating a discourse tree of text T is an efficient way to communicate the content of the text. The agent commences by making an introduction and then providing the main topic $M_T$. In an aspect, the introduction includes an encouragement to the user to continue conversation, such as a question or a knowledge sharing request.

The main topic can be obtained from the discourse tree. As discussed with respect to process 1500, creating a discourse tree involves identifying fragments, or elementary discourse units, from the text. Each discourse tree includes a root node (normally shown at the top of the graph), nonterminal nodes, and terminal nodes, Each nonterminal node represents a rhetorical relationship between two of the fragments. Each terminal node is associated with one of the fragments (e.g., represents text of a fragment).

To form a main topic, the discourse navigation application 122 calculates for each node of the subset of terminal nodes, a respective path length from the root node. The discourse navigation application 122 identifies, from the subset of terminal nodes, a topic node having a path length that is a smallest path length of the path lengths. The discourse navigation application 122 then determines, from the topic node, a topic of the discourse tree by extracting a noun phrase from the nucleus elementary discourse unit associated with the topic node.

At block 2302, process 2300 involves receiving a user utterance and determining a user intent. For instance, the agent can ask whether the user wants more details, whether the user disagrees, etc. The user can ask for more details $E_T$, disagree $E_T$ or ask a question on a topic outside of the scope of this text $O_T$.

Determining intent can involve machine-learning or algorithmic techniques. For instance, discourse navigation application 122 can provide the utterance into machine learning model 130, which can be trained to classify an utterance as a request for more details, a disagreement, a request for a specific topic, and so forth. In other cases, algorithmic techniques, e.g., a set of rules that analyze words or phrases in the utterance can be used. An example of such a technique is disclosed in co-pending U.S. patent application Ser. No. 17/162,740, entitled "Using Communicative Discourse Trees To Detect A Request For An Explanation," which is herein incorporated by reference in its entirety.

The agent's continued encouragement to the user can depend on the rhetorical relation for the current navigation node (now, the $M_T$ node). The user replies (formulates a question) in a certain form, depending on the encouragement question of the agent. Examples include:

Elaboration→Want to know more?
Contrast→But you know what?
Attribution→Do you know the source?
Cause/Consequence/Reason→Do you know why?

Once the user question is received by the agent, the user question is analyzed with respect to if an external knowledge source needs to be searched and/or if a machine reading comprehension approach should be initiated to find a value for a factoid question and also identify a location of an elementary discourse unit in which an answer occurs. Based on the intent, the agent determines whether a user changed the topic and whether navigation around the discourse tree is required.

At block 2303, process 2300 involves determining that the user is asking for more details (represented by $I_T$) and providing the EDU associated with an elaboration of the main topic ($M_T$). Examples of utterances that indicate a request for more details include "tell me about entity e" (where e is an entity), or "Yes, tell me more." In some cases, machine learning can be used to classify intent.

In a more specific example, discourse navigation application 122 identifies, in the discourse tree, a parent node directly connected to the topic node. From the parent node, discourse navigation application 122 identifies, in the discourse tree, an additional terminal node that is related to the parent node via a rhetorical relation of type elaboration.

The discourse navigation application 122 extracts, from an elementary discourse unit associated with the additional terminal node, additional text and provides the additional text to the user device.

At block 2304, process 2300 involves determining that the user disagrees, providing an EDU which is connected with $M_T$ or $I_T$ via by Explanation or Cause. Examples of text indicating an intent of disagreement are "I disagree" or "I don't believe that."

Continuing the example, the discourse navigation application 122 identifies, in the discourse tree, a parent node directly connected to the topic node. The discourse navigation application 122 identifies, in the discourse tree, an additional terminal node that is related to the parent node via a rhetorical relation of type explanation or type cause. The discourse navigation application 122 extracts additional text from an elementary discourse unit associated with the additional terminal node and provides the additional text to the user device. In some cases, the additional text is provided to the user device along with a statement that the agent insists the reply is correct.

At block 2305, process 2300 involves determining that the user has asked a question that is outside the scope of the topic and then answering the question as a factoid question and then providing an EDU that is an elaboration of the main topic. More specifically, if the question is outside of $O_T$ then it should be answered as a factoid question but nevertheless the agent should to take the user back to T so the reply should end with Elaboration($I_T$).

The discourse navigation application 122 identifies, in the discourse tree, a satellite elementary discourse unit associated with the topic node via the rhetorical relationship of type elaboration. The discourse navigation application 122 provides text associated with the satellite elementary discourse unit to the user device.

At block 2306, process 2300 involves determining that the user doubts the validity of the claim and then providing an EDU that is connected with the main topic by an attribution. If the claim in $M_T$ is disputed, then the agent should attempt to persuade the user otherwise. Attribution ($M_T$) is an answer, informing the user about the source. Alternatively, a user might ask for a source explicitly.

Continuing the example, the discourse navigation application 122 identifies, in the discourse tree, a parent node directly connected to the topic node. The discourse navigation application 122 identifies, in the discourse tree, an additional terminal node that is related to the parent node via a rhetorical relation of type attribution. The discourse navigation application 122 extracts additional text from an elementary discourse unit associated with the additional terminal node and provides the additional text to the user device. In some cases, the additional text is provided to the user device along with a statement that the agent insists the reply is correct.

At block 2307, process 2300 involves identifying, from the utterance, that a specific topic is requested and providing a response based on current elementary discourse unit type and current rhetorical relation type. A great variability in a dialogue can be achieved by generating a specific reply for each user intent and a current position type in the discourse tree. A mapping of intent, to current node, to relation, to agent reply is shown Table 6.

Process 2300 performs operations as shown in Table 6. As shown in Table 6, if a class of intent is "ask for a specific topic," and the current node (e.g. in the discourse tree) is a nucleus, and the associated rhetorical relation is of type elaboration, then discourse navigation application 122 can return the text of the nucleus, optionally with the prompt "do you want to learn more" or similar. As shown, other examples are possible, based on whether the current node is a nucleus or satellite, and based on the type of rhetorical relation.

TABLE 6

Selecting an utterance, given a user intent and a position in a discourse tree

| Class of intent | Current node | Relation | Agent reply |
|---|---|---|---|
| Ask for a specific topic | nucleus | Elaboration | Return nucleus. Ask if want to learn more |
| | satellite | | Return satellite Move up from nucleus (zoom out) |
| | nucleus | Condition | Return nucleus Ask the user: do you know what happens if <Satellite condition part> |
| | satellite | | Return satellite |
| | nucleus | Temporal sequence | Return nucleus Ask the user: do you know what happens after/before <Satellite condition part> ? |
| | satellite | | This is what happened after/before <nucleus>: Return satellite |
| Confirm that the topic is familiar (user already knows that) | nucleus | Elaboration | Good you know this. Do you want to know about <satellite-entity >? |
| | satellite | | Good you know this. Move up from nucleus (zoom out) |
| User: Yes, I know <topic> | nucleus | Condition | OK, you know it. Do you know when is <topic> true? |
| | satellite | | What you know <topic> is a condition. Want to know the premise? |
| | nucleus | Contrast | You would think that <topic>? However, <satellite> |
| | satellite | | There is a controversy: on one hand, <nucleus>, but, on the other hand, <satellite> |
| Confirm that there is an interest in a topic User: Yes, tell me | nucleus | Elaboration | Return <nucleus> Is there interest to learn about <satellite-entity>? |
| | satellite | | Return satellite Continue traversal Are you interested in <new node- entity>? |

At block 2308, process 2300 involves identifying, from the utterance, that a specific topic is known and providing a response based on current elementary discourse unit type and current rhetorical relation type. At block 2308, process 2300 performs operations as shown in Table 6. For example, if the user intent is identified as the topic being known, the current node type is nucleus, and the current rhetorical relation is type condition, then discourse navigation application 122 can indicate to the user that the user knows it but can ask the user if the user knows when it is true.

At block 2309, process 2300 involves identifying, from the utterance, an interest in a topic and providing a response based on current elementary discourse unit type and current rhetorical relation type. At block 2309, process 2300 performs operations as shown in Table 6. For instance, if the user confirms interest in the topic provided by the agent, and the current node is a satellite, and the rhetorical relation is of type elaboration, then discourse navigation application 122 returns text corresponding to the satellite and continues traversal.

At block 2310, process 2300 involves identifying a question about an actor, forming a CDT, and providing a response based on a communicative action. CDTs can provide additional information useful for dialogue navigation. For instance, discourse navigation application 122 can create a communicative discourse tree for the discourse tree used in process 2300.

Accordingly, the agent can access a communicative action associated with the current node, and present the user with questions generated from the communicative action. For instance, a communicative action CA=tell(Subject) implies that the Agent is informed about a subject, whereas a communicative action CA=deny(Subject))⇒Agent does not want Subject to happen.

At block 2311, process 2300 involves continuing to iterate while there are EDUs not yet provided to user device. Process 2300 iterates till no more EDU in T is left or the user terminates the conversation. If a persistence of the agent is too high in trying to take the user back to T, this user might terminate the conversation too soon. Otherwise, if the agent persistence is too low, the user would deviate from T too far and may read less content of T (EDU(T)). It is desirable to optimize the agent to maintain the optimal persistence to maximize the number of delivered EDU(T) till the conversation is abandoned by the user.

Figure 24:
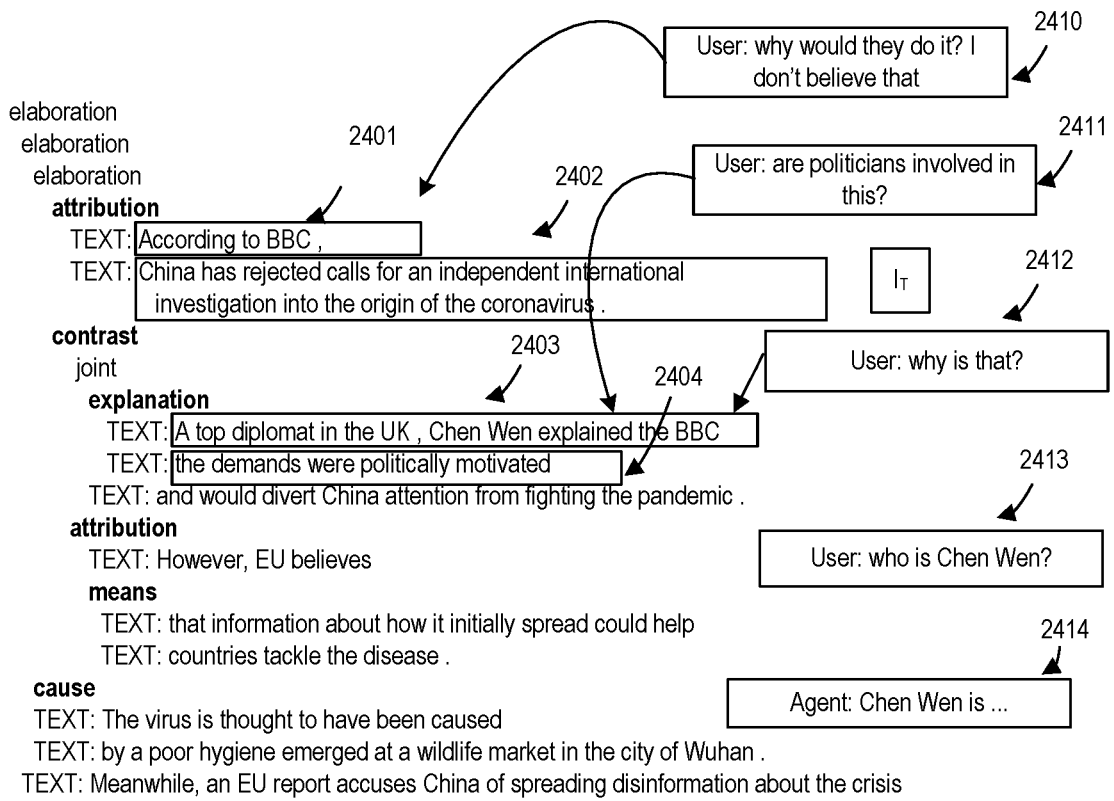
FIG. 24 depicts an exemplary discourse tree and a navigation thereof, in accordance with an aspect.

FIG. 24 depicts an exemplary discourse tree and a navigation thereof, in accordance with an aspect. FIG. 24 depicts discourse tree 2400, elementary discourse units 2401, 2402, 2403, and 2404 (other elementary discourse units are shown but not labeled), and utterances 2410-2414 (which are part of a conversation between an agent and a user). Discourse tree 2400 is shown in text-based form. A level of indentation encodes a depth of each node. Terminal nodes with EDUs are marked as 'TEXT' and rhetorical relations are matched as such ("attribution," "elaboration", etc.).

Discourse tree 2400 represents the following text: "According to BBC, China has rejected calls for an independent international investigation into the origin of the coronavirus. A top diplomat in the UK, Chen Wen explained the BBC the demands were politically motivated and would divert China attention from fighting the pandemic. However, EU believes that information about how it initially spread could help countries tackle the disease. The virus is thought to have been caused by a poor hygiene emerged at a wildlife market in the city of Wuhan."

Utterances 2410-2413 are utterances received from a user device, for example, generated by a user in response to one or more of the elementary discourse units 2401-2404 being displayed. The first agent utterance is denoted by $I_T$. Arrows lead from the user utterances 2410-2412 to the elementary discourse units that can be used as agent responses.

For example, a dialogue based on discourse tree 2400 starts with an agent presenting the text from elementary discourse units 2401 and 2402 "According to BBC, China has rejected calls for an independent international investigation into the origin of the coronavirus." In response, the user asks, as reflected in utterance 2410 "Why would they do that? I don't believe that." The agent identifies the intent in utterance 2410 as a request for more information. The agent identifies that elementary discourse units 2401 and 2402 provide an answer. The user then asks, at utterance 2411, "are politicians involved in this?" The agent identifies utterance 2411 as a request for more information and that elementary discourse units 2403 and 2404 include information to address the request.

Continuing the example, the user then asks "who is Chen Wen?" at utterance 2413. The agent identifies utterance 2413 as a request for information that is out of scope of the initial text. As can be seen, there is no explanation of who "Chen Wen" is in the original text.

FIG. 25 depicts an exemplary dialogue from resulting from the discourse tree depicted in FIG. 24, in accordance with an aspect. FIG. 25 depicts conversation 2500, which takes place between an agent and a user device. Conversation 2500 includes utterances 2501-2515. Utterances 2501, 2503, 2505, 2507, 2509, 2511, 2513, 2515 are generated by the agent (e.g., via process 2300). Within these utterances, italics indicate the phrases added by the agent and the results of agent analysis of utterances and a reply selection rule/result are provided in square brackets. EDUs from the source text are written in double quotes. Utterances 2502, 2504, 2506, 2508, 2510, 2512, and 2514 are user-provided (e.g. by a user device).

As can be observed, a dialogue is plausible, although no data-driven method has been applied. It does not matter if the user deviates from the target text as long as the agent always takes the user back to the EDU and rhetorical relation which is either relevant to what the user asked or claimed, or just follows the DT navigation flow (from more important, closer to the root node, to less important).

If the user asks a question outside of the scope of the target text, the agent provides an answer from the foreign source and then also switch topic and come back to the business of the target answer, proceeding with the navigation.

Figure 26:
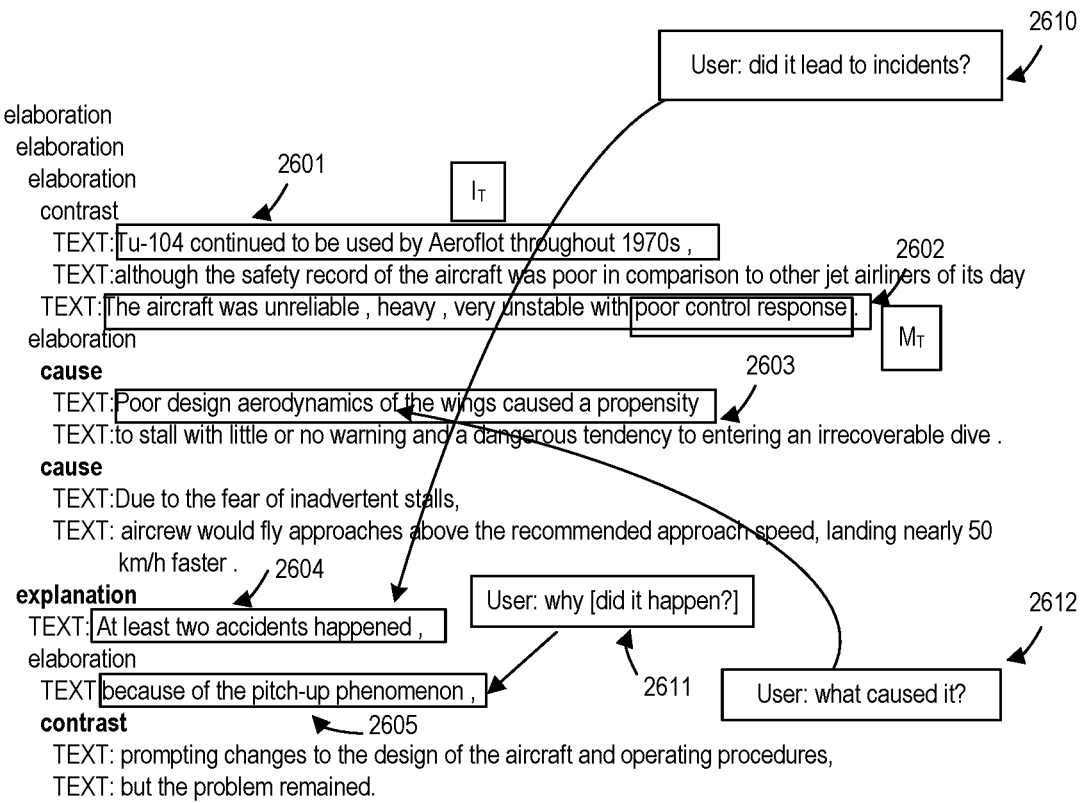
FIG. 26 depicts an exemplary discourse tree and a navigation thereof, in accordance with an aspect.

The resulting sample dialogue is shown below:
Agent: China has rejected calls for an independent international investigation into the origin of the coronavirus
User: Why would they do it? Don't believe that.
Agent: This is According to BBC
User: Are politicians involved in this?
Agent: The demands were politically motivated
User: Why is that?
Agent: A top diplomat in the UK, Chen Wen explained the BBC
User: Who is Chen Wen?
Agent: Chen Wen is . . . and would divert China attention from fighting the pandemic
User: And how can countries tackle coronavirus?
Agent: EU believes that information about how it initially spread could help countries tackle the disease
User: Why is it EU business?
Agent: EU is concerning with . . . .
Agent: Do you know what causes the virus?
User: Yes I know, it is caused by . . . .
Agent: It is caused by a poor hygiene emerged at a wildlife market in the city of Wuhan FIG. 26 depicts an exemplary discourse tree and a navigation thereof, in accordance with an aspect. FIG. 26 depicts discourse tree 2600, elementary discourse units 2601-2605, and utterances 2610-2612. Discourse tree 2600 is shown in text-based form. A level of indentation encodes a depth of each node. Terminal nodes with EDUs are marked as 'TEXT:' and rhetorical relations are matched as such ("attribution," "elaboration", etc.). Utterances 2610-2612 are utterances received from a user device. Arrows lead from the user utterances 2610-2613 to the elementary discourse units that can be used as agent responses.

FIG. 26 shows a dialogue flow through discourse tree 2600. First, the introductory topic ($I_T$) is introduced: which is "Tu-104 continued to be used" and is derived from elementary discourse unit 2601. Next, the main topic, $M_T$, is introduced "the aircraft was unreliable."

Because the user does not indicate a specific interest, the agent proceeds along the elaboration rhetorical relation to the next sub-topic, which is "the aircraft was very unreliable, heavy, very unstable with poor control response," which is from elementary discourse unit 2602. As can be seen in FIG. 26, elementary discourse unit 2602 is related to the parent of elementary discourse unit 2601—the "contrast" rhetorical relation via an "elaboration" rhetorical relation.

Then the user interrupts the default navigation flow with utterance 2610, asking the question "Did it lead to incidents" forcing a jump to elementary discourse unit 2604 "At least two accidents happened."

The user question "Why/did it happen?" in utterance 2612, does not violate the original text flow and the agent arrives at elementary discourse unit 2605, "Because of the pitch-up phenomenon." As the user asks "What caused it?" (not "What does this phenomenon cause?," which would be in direct response), the agent is forced to jump back to the Cause answer "Poor design aerodynamics of the wings". A "why" question for a topic and an "Explanation" or "Cause" rhetorical relation associated with a satellite node, the agent provides text from the satellite node as an answer. A "why" question without a "cause" forces the agent to attempt to determine the reason (for example, by web mining or converting the "Why" question into a "What" question and finding an entity for the "What" by more conventional search means rather than discourse techniques).

The EDUs on the top $I_T$ and $M_T$ are highlighted. Text T is introduced "Tu-104 continued to be used," followed by the main topic "The aircraft was unreliable." Notice that this main topic $M_T$ is not a satellite of the introduction but instead the next nucleus closest to the root of this DT. In the given exploration scenario, satellite ($I_T$) has not been reached yet.

Figure 27:
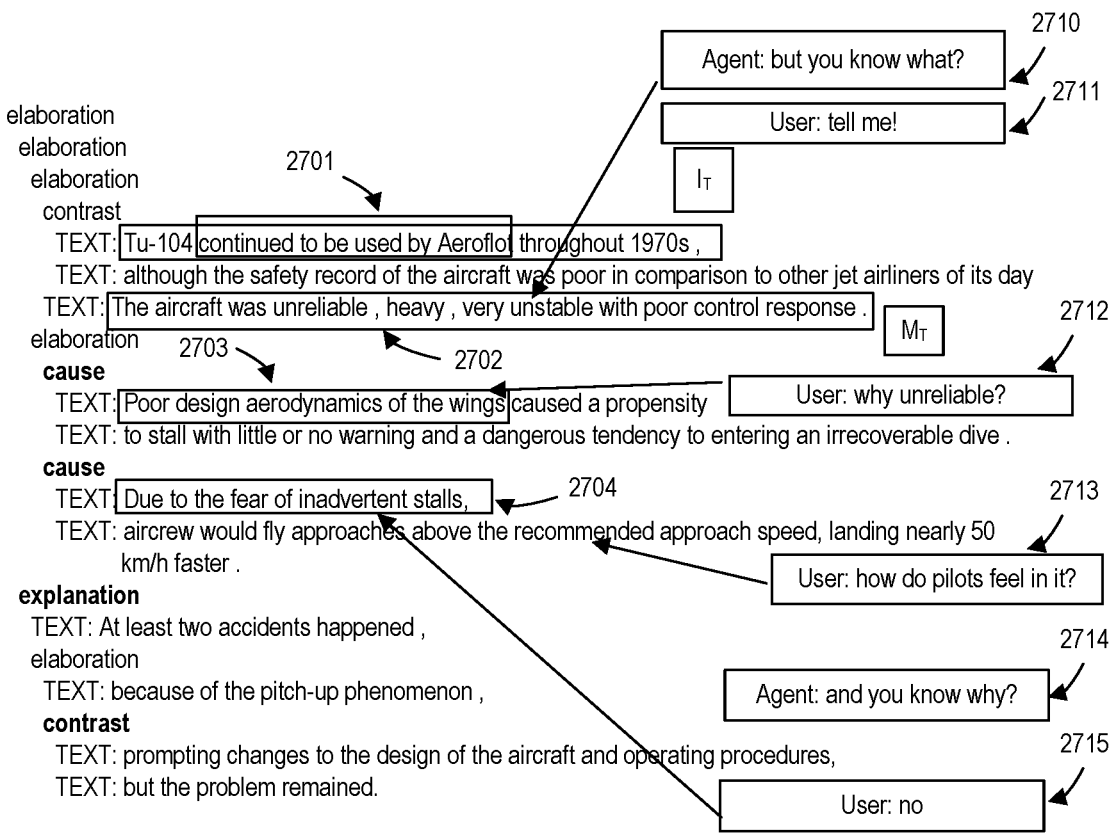
FIG. 27 depicts an exemplary discourse tree and a navigation thereof, in accordance with an aspect.

FIG. 27 depicts an exemplary discourse tree and a navigation thereof, in accordance with an aspect. FIG. 27 depicts a dialog flow in which a user is initially passive. FIG. 27 depicts discourse tree 2700, elementary discourse units 2701-2704 and utterances 2710-2715. Discourse tree 2700 is shown in text-based form. A level of indentation encodes a depth of each node. Terminal nodes with EDUs are marked as 'TEXT:' and rhetorical relations are matched as such ("attribution," "elaboration", etc.).

If once $I_T$ and $M_T$ are announced the user does decide on questions, the agent tries to interest the user with the content of the satellite elementary discourse ($I_T$) by asking "But you know what" relying on Contrast.

Once the user responds "Tell me!" (utterance 2711) the agent responds "although the safety record of the aircraft was poor . . . " initiating the user question "How do pilots feel in it?" The agent answers "aircrew would fly approaches above the recommended approach speed" And you know why?". The second utterance is added because navigations goes towards the satellite.

The flow of a dialogue does not always follow the flow of the original text because the user might ask questions in a totally different order. Also, providing the full paragraph as an answer to a question about a specific point would overwhelm the user with information.

This is a mixed-initiative dialogue: the agent starts a conversation, introducing a topic. Then a user can either follow the agent's initiative, accepting its proposal to share information, or start asking her own questions about the topic, forcing the agent to make jumps in the DT navigation.

Figure 28:
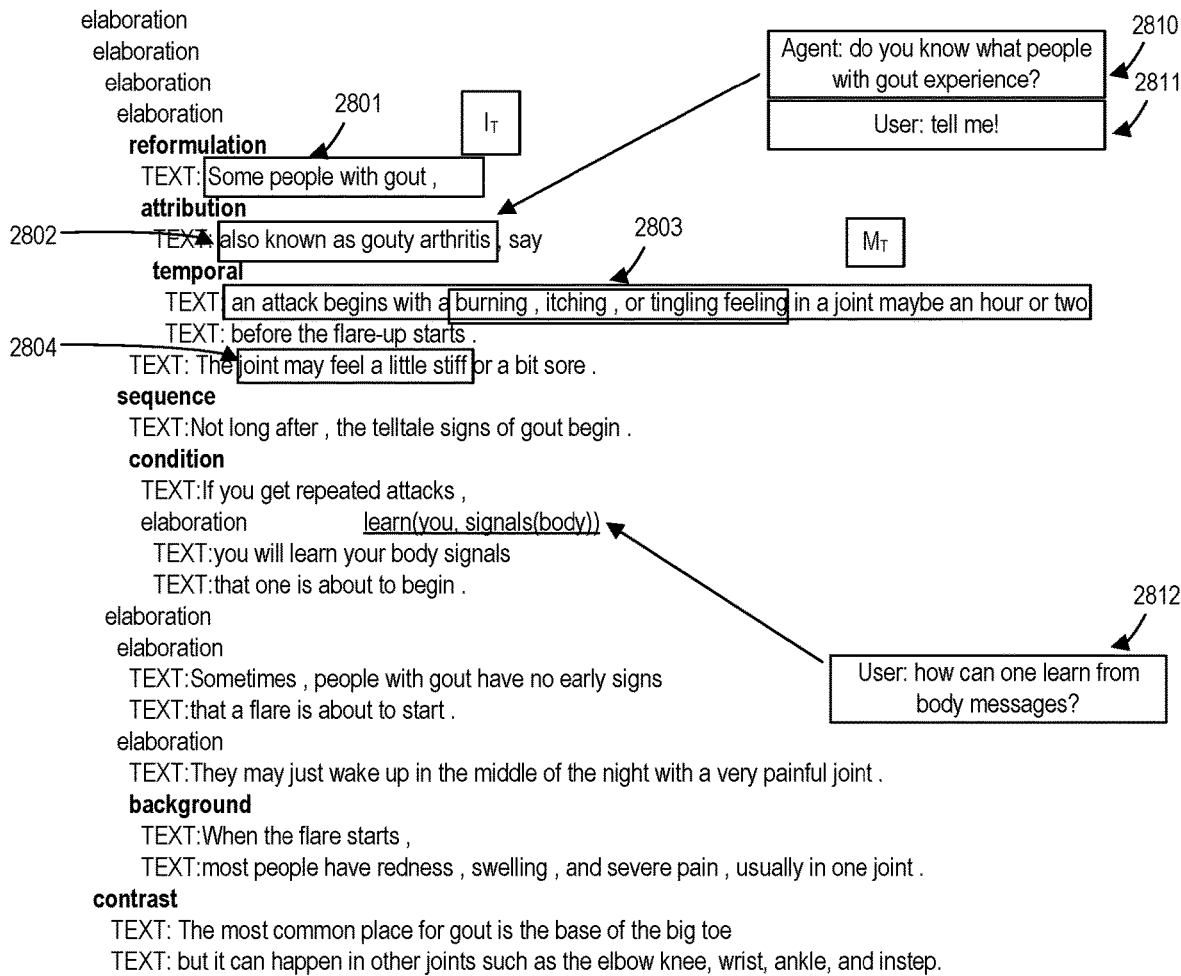
FIG. 28 depicts an exemplary discourse tree and a navigation thereof, in accordance with an aspect.

FIG. 28 depicts an exemplary discourse tree and a navigation thereof, in accordance with an aspect. FIG. 28 includes discourse tree 2800, elementary discourse units 2801-2804, and utterances 2810-2814. Discourse tree 2800 is shown in text-based form. A level of indentation encodes a depth of each node. Terminal nodes with EDUs are marked as 'TEXT:' and rhetorical relations are matched as such ("attribution," "elaboration," etc.).

Example depicted by FIG. 28 illustrates a less involved user than other examples. Here, the initiative is somewhat higher by the agent. The agent initiates the conversation, asking "Do you know what people with gout experience?" in utterance 2810. The user responds by saying "tell me!" at utterance 2811. In response, the agent responds by telling the user about the "burning, itching, or tingling feeling in a joint," as shown in utterance 2803.

Additionally, FIG. 28 illustrates how communicative discourse trees (CDTs) can provide additional information regarding a mental state of an individual referred to in the text. When a user asks a question involving a communicative action or mental state, the agent can match the question against labels of arcs for communicative actions in a CDT and then matched against the subject of this communicative action. For instance, the user asks, in utterance 2812, "how can one learn from body messages?"

Figure 29:
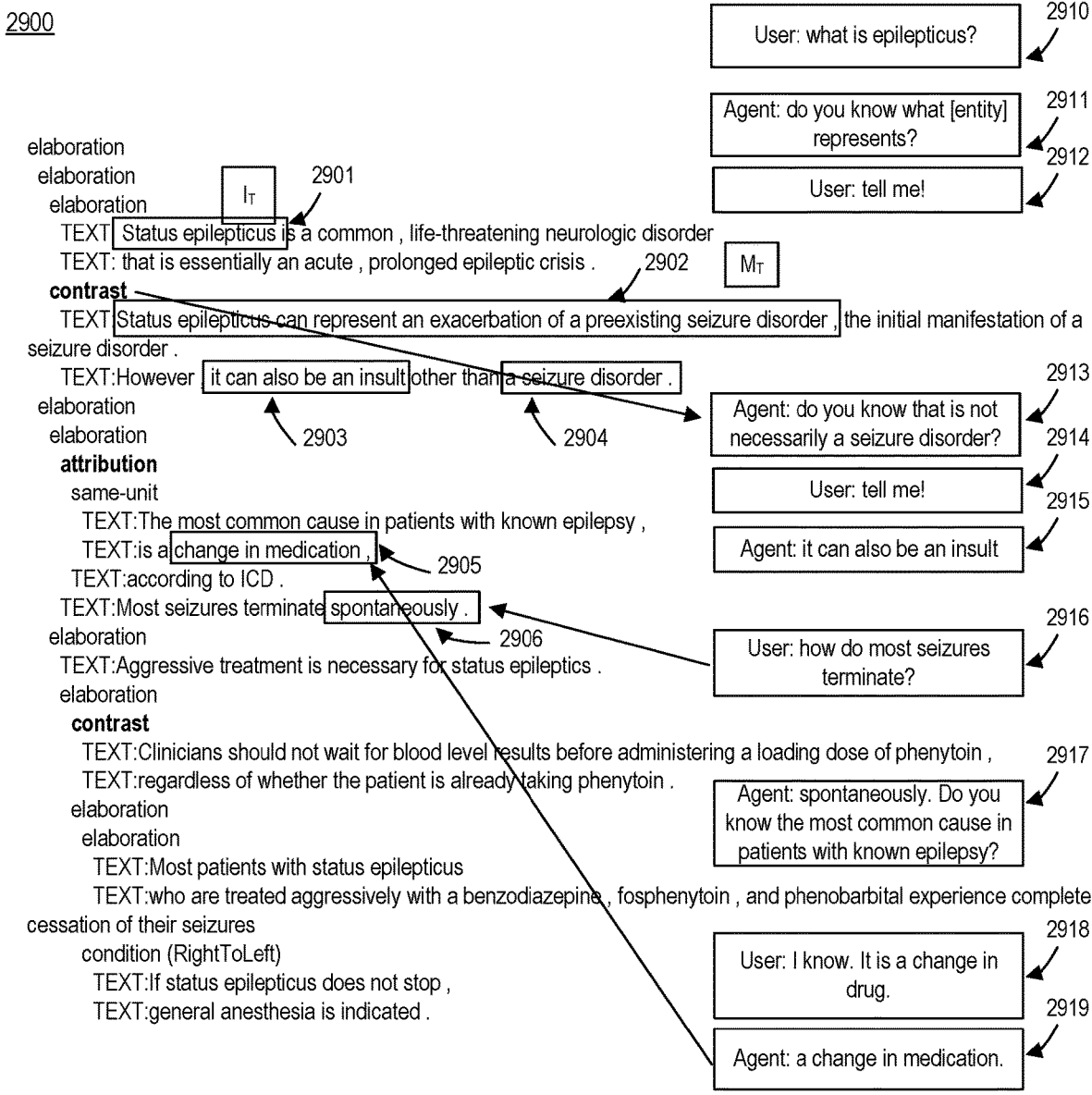
FIG. 29 depicts an exemplary discourse tree and a navigation thereof, in accordance with an aspect.

FIG. 29 depicts an exemplary discourse tree and a navigation thereof, in accordance with an aspect. FIG. 29 includes discourse tree 2900, elementary discourse units 2901-2906, and utterances 2910-2919. Discourse tree 2900 is shown in text-based form. A level of indentation encodes a depth of each node. Terminal nodes with EDUs are marked as 'TEXT:' and rhetorical relations are matched as such ("attribution," "elaboration", etc.).

Discourse tree 2900 corresponds to the following text, which relates to epilepsy: "Status epilepticus is a common, life-threatening neurologic disorder that is essentially an acute, prolonged epileptic crisis. Status epilepticus can represent an exacerbation of a preexisting seizure disorder, the initial manifestation of a seizure disorder. However, it can also be an insult other than a seizure disorder. In patients with known epilepsy, the most common cause is a change in medication. Most seizures terminate spontaneously. Aggressive treatment is necessary for status epileptics. Clinicians should not wait for blood level results before administering a loading dose of phenytoin, regardless of whether the patient is already taking phenytoin. Most patients with status epilepticus who are treated aggressively with a benzodiazepine, fosphenytoin, and/or phenobarbital experience complete cessation of their seizures. If status epilepticus does not stop, general anesthesia is indicated."

The user starts the dialogue with utterance 2910, which states "what is epilepticus?" In response, the agent poses the question "do you know what epilepticus represents?" in utterance 2911 and the user answers "Yes tell me!" From there, the agent navigates discourse tree 2900. The agent provides $I_T$, which is "Status epilepticus can represent an exacerbation of a preexisting seizure disorder" and then asks "Do you know that it is not necessarily a seizure disorder?" at utterance 2913. In response, the user asks "tell me" at utterance 2914.

In response, the agent continues by stating that "it can also be an insult" in utterance 2915. The user asks "How do most seizures terminate?" at utterance 2916. Then, the agent navigates to the elementary discourse unit 2906, which states "spontaneously."

The agent then asks "Do you know the most common cause in patients with known epilepsy?" at utterance 2917, and the user replies with "I know. It is a change in drug" at utterance 2918. The agent confirms so, with "a change in medication" at utterance 2919, from elementary discourse unit 2905.

Topic Classification

In an aspect, a topic and an intent can be measured in parallel. For instance, a first classification model can be trained to predict a topic and a second classification model can be trained to predict an intent. The first and second classification models can each receive a user utterance and make their respective classifications in parallel. A third classification model can operate in parallel also, predicting topic and intent. Then, the predicted topics (i.e. from the first model and the third model) can be merged and the predicted intents (i.e., from the second and third model) can be merged.

In open-domain conversational agents, topic and dialogue intent classification can be treated as a text classification problem. Compared to general text classification, utterance classification poses a greater challenge due to the following (1) the tendency of human utterances to be short; (2) users' frequently mentioned out-of-vocabulary words and entities; and (3) a lack of available labeled open-domain human-machine conversation data.

Natural conversations entail utterances which are dependent on the context, thus making it impossible to classify the topic and intent without considering the preceding utterances. For example, when a customer replies with the expression Oh, yeah it can be interpreted as one of several options, such as Accept-Agree or Topic-Switch. To help address these problems, a contextual-aware topic and dialogue intent classification model for open-domain conversational agents is proposed. To identify both topics and dialogue intents, we developed a Mixture of Experts model.

We train our topic classifier on new topics such as Diabetes and Lung diseases, and we train our intent classifier on new dialogue intents such as "Yes-Answers." In addition, the intent classifiers aim to improve the quality of some specific classes to better fit the use cases in health. For instance, we observed that a default intent classifier would consider user disagreements as Topic-Switching, even when this is not the most accurate label of the current dialogue situation. To improve this case, we add another intent Reject to cover the situations where the user was disagreeing with the last system response but did not intend to end the current topic being discussed.

Epistemic States

One purpose of a dialogue centered around a paragraph of text is to make sure that the recipient acquires information from text, can willingly follow instructions, believes in the text, and can share beliefs with others. In other words, one goal is to persuade the user that the topic is important and needs to be well understood. The agent plays the role of persuader and the user of persuadee. However, to achieve this goal in a more reliable way, the roles can swap and the user is encouraged to answer questions such as the answer can be confirmed/updated/revised by the agent in the utterance to follow.

The aim of persuasion is for the persuader to change the mind of the persuadee, and the provision of good arguments, and possibly counterarguments, is of central importance for this. Some recent developments in the field of computational persuasion have focused on the need to model the beliefs of the persuadee in order for the persuader to better select arguments to present to the persuadee. For instance, if the persuader wants to persuade the persuadee to stop running on pavement, and the persuader knows that the persuadee believes that if he gives up any running, he will put on weight, then the persuader could start the dialogue by providing a counterargument to this, for example by saying that there is a local stadium well suited for running on grass.

One approach to modeling the persuadee is to harness the epistemic approach to argumentation. The epistemic state manager 124 can perform this function. An argument graph is used to represent the arguments and attacks between them. When the agent starts a dialogue with a persuadee, it does not have a model concerning what the persuade already knows and what he does not. This is the initial default epistemic state. Then during the dialogue, the moves are made by the participants according to some protocol. After each move, the epistemic state is updated using an update function defined on the discourse tree.

Let us we have a text with a DT that consists from n EDUs. Initially, the agent believes that the user does not know anything from this text: $\forall i$ not know(user, EDU(i)). i=0 . . . n are ordered according to how DT is built (an original order). These EDU(i) cannot be acquired by the user in any order: this order should follow a navigation of DT, since, for example, EDU(i) as a satellite cannot be acquired as long as its nucleus EDU(i−1) is acquired. The agent cannot just traverse DT since every user has a different initial knowledge and interests and leads a agent session through the epistemic states of his choice. Hence the actual sequence deviates from 0 . . . n.

When a user asks about EDU(i) the agent believes that user wants to know EDU(i). If the user shares EDU(i) then the agent decides that this user also wants to know or wants to share EDU(i+1) and also EDU(i−1), traversing the DT in both directions from nucleus and satellite and back.

If the user interrupts the agent and wants a new topic t, the agent either finds the one determined to be similar t~EDU(i) or launches an external search and attempts to associate the external search results with EDU(i). If a question about an attribute a of e is given by the user, inaccessible from the current node I, the agent transitions into the machine reading comprehension mode and determines the value a along with the new node j.

If the agent is in a satellite node, he has delivered the main point e and now in a position to produce an utterance with an elaboration on e, attribution of e, cause of e, temporal sequence of e, not changing the current topic. Conversely, if the agent is in a nucleus mode, it shares the main nucleus topic e with the user and expects her request for information concerning more details about e, attribution of e, what caused e and so forth. The objective is to have as few undelivered EDUs as possible till the user abandons the conversation. Offline, a paragraph of text to be delivered is subject to discourse parsing. It is then subject to additional custom parsing to determine specific rhetorical relations for navigation. Also, the ontology is integrated to differentiate between questions that can be answered by this text versus the ones requiring an external search.

Online, when a user replies, her intent is established (classified into the one of pre-determined classes). Also, when the user is sharing her knowledge, it has to be matched against the given paragraph of text to be delivered, to be compatible, contradicting or independent of this text.

The central part of the persistent agent is the Discourse Tree Navigator. Its main function is to establish a reply type by the user intent and the current position in the discourse tree. After each user utterance, the Navigator decides to which next node to proceed. If the user has an explicit knowledge request, a jump is required to the node which has a chunk of text to address this request. Otherwise, the persistent agent takes an initiative and generates a set of options for the user to proceed. These options match the rhetorical relation coming in and coming out of the current node of the discourse tree. The match between the user epistemic states as a part of her intent characteristics is also done by the Navigator.

Depending on the epistemic state, the Navigator picks the text fragment to reply to the user and also encourages the user to continue knowledge exploration in one form or another. A decision on which text to reply to and a decision on which next step to propose are made independently.

Internal and external search engine matches user query or user statement with the each EDU of the discourse tree first. In both cases of a question and statement, it jumps to the node which is syntactically and semantically closest to the user utterance. In case of question an answer (this EDU) is returned, and in case of statement it is confirmed if matched with this EDU or rejected and then the user is encouraged to receive the correct chunk of information. The search engine implementation is based on structured word2vec, combining syntactic and semantic features to find the best text fragment matching the user utterance.

Both Knowledge and Navigation reply generators employ machine learning-based rhetorical agreement to make sure the selected utterances not only follow the topic but agree with previous utterances in style and logic.

Evaluation

One of the main challenges faced by researchers is the lack of a good mechanism to measure the performance due to lack of explicit objective for task-oriented conversations. To measure the quality of a response given a set of previous utterances, the seven following questions for assessors can be used.

Whether the response, given the context, makes sense. Meaningfulness is a must-have feature to achieve a human-likeness of a conversational. Meaningfulness includes, relevance of answers to questions, consistency in epistemic states when a agent follows user request to share information, common sense, as well as logical and rhetorical coherence. Meaningfulness also captures other important aspects of a agent, such as consistency. The assessor is asked to use common sense to judge if a response is completely reasonable in context of previous utterances. If anything seems off—confusing, illogical, out of context, or factually wrong—then it should be labeled as "does not make sense".

How specific is response. Being sensible is not enough: a generic response (e.g., I don't know) can be sensible, but it is also boring and unspecific. Such responses are frequently generated by bots that are evaluated according to metrics like sensibleness alone. An assessor is asked to determine if the agent response is specific to the given context, informative to the user at a given step. Specificity Average (SSA) combines this measure with assessment 1) as a key aspects of a humanlike agent: making sense and being specific. Turing Test contest entrants often try to avoid detection by being strategically vague (Venkatesh et al., 2018), so we intend to avoid this approach.

Engagement is a measure of interestingness in a conversation (Yu et al., 2004). Researchers in the field of dialogue evaluation attempt to identify correlated for engagement such as a number of dialogue turns and total conversation duration an indicator of how engaged a user is in the conversation. There are cases that may have a higher number of turns due to inability of a task oriented bot to understand the user's intent, leading to follow-up turns with clarifications and modifications, also potentially resulting in user dissatisfaction. An analysis of a random sampling of conversations leads (Venkatesh et al., 2018) to conclusion that the impact of this effect is negligible.

A coherent response indicates a comprehensible and relevant response to a user's request. A response can be deemed weakly coherent if it is somewhat related. For example, when a user says: "What do you think about the entity e?"; the response should be about e, the category for e, more broadly or something related. A response related to e but not exactly an opinion or something related to the category of e, would be considered weakly coherent. For open-domain conversations, the complexity in the response space makes this problem extremely hard, but within the specific text T the assessment is straightforward.

Conversational Depth. Coherence is usually measured at turn level. However, in a multi-turn conversation, context may be carried over multiple turns. While evaluating conversational agents, it is important to detect the context and the depth of the conversations. Human conversations generally go deeper about a particular topic. An agent that is able to capture topical depth (Galitsky 2017) may sound more natural. To evaluate the agents on a conversational depth, one can rely on topical model to identify the domain for each individual utterance. Conversational depth can be computed as the average of the number of consecutive turns within the same topical domain. More precisely, it can be estimated as a depth of a chain of entities being communicated, such as disease-specific symptom-specific feature of this symptom.

Conversational Breadth. This is a feature of a chit-chat open domain bot. It can identify the topics and keywords from a given utterance, conduct conversations around the same topics and share related concepts. Natural conversations are highly topical and humans frequently use keywords in their interactions. Users are frequently dissatisfied with bots lacking topical diversity. Evaluating conversational breadth is important to understand how broadly an agent is able to support conversations as opposed to potentially highly-scripted conversations about a small limited number of domains.

Overall User Satisfaction score. For a given dialogue, the user confirms that he achieved his goal, learned what he intended to learn (+1) or did not (0). To converse properly with a human, bot's responses have to make sense in context; humans typically take this for granted when conversing with one another and 97% of human-produced statements meet this criterion. To assess the usefulness of DT navigation we use the overall measure such as User Satisfaction Score, expressing a need to read T after the dialogue. If it is still necessary to consult text after the session with a agent, this user is considered to be unsatisfied. We then average through multiple sessions for multiple users for T.

TABLE 7

Assessment of some agent features

| Category | Quality Attribute | Metric | Value |
|---|---|---|---|
| Performance | Robustness to unexpected input | % of successes | 8 |
|  | Provides appropriate escalation channels | % of successes | 90 |
| Humanity | Transparent to inspection (known agent) | % of users who correctly classify | 78 |
|  | Able to maintain themed discussion | 0 (low) . . . 100 (high) | 91 |
|  | Able to respond to specific questions | % of successes | 93 |
| Affect | Provides greetings, pleasant personality | 0 (low) . . . 100 (high) | 76 |
|  | Entertaining, engaging | 0 (low) . . . 100 (high) | 72 |
| Accessibility | Can detect meaning and intent | % of successes | 81 |
|  | Responds to social cues appropriately | % of successes | 73 |

A level of persuasiveness answering user questions is first evaluated. The navigation algorithm is varied from keeping the user focused on text T to more precise answers to user questions.

This evaluation can also be viewed as an ablation study where we turn various components on/off and track the percentages of covered information in T and the overall user satisfaction score.

TABLE 8

Varying the navigation algorithm from keeping the user focused on text T to more precise answers to user questions

| Navigation and Reply algorithm/mode | # of total utterances | # of covered EDUs (utterances) from T | % of covered EDUs (utterances) from T | User satisfaction score, % |
|---|---|---|---|---|
| Always try to find an EDU matching the user query. Provide the closest EDU as an answer, even if it is very dissimilar to the question. Use MRC against T when possible. Encourage a user with questions "Do you know why/who/when?" | 7.5 | 6.7 | 67.2 | 72.1 |
| Try to find an EDU matching the user query with a low relevance threshold. Encourage a user with a question concerning T before trying external search. Try MRC against T with high threshold | 8.1 | 7.0 | 69.2 | 77.8 |
| Try to find an EDU matching the user query with a medium relevance threshold. Encourage a user to ask a question or make a comment that would match a rhetorical relation in a navigation path. Try external search with medium relevance threshold. Try MRC against T with low threshold | 10.5 | 8.2 | 62.8 | 73.2 |
| Apply high relevance threshold matching user query with EDU. Otherwise, search external content. Attempt to provide the most exact answer to user queries. Use MRC against external content | 10.3 | 8.1 | 63.1 | 72.9 |

In our evaluation we focus on paragraphs of text (5-7 sentences each) which contain important instructions on how to do things. Domains range from home to professional, from low to high responsibility up to aviation.

We now assess the overall meaningfulness of dialogues and rhetorical agreement. We manually assess 20% of dialogues in each domain. For the rest 80% we used a specifically designed evaluation agent designed to reproduce the assessment score of a human evaluator, irrespectively of the error type of the main agent. This evaluation agent is designed to formulate basic questions given an utterance from the main agent or a user. The main underlying algorithm is to generalize a received sentence and convert it into a question about an attribute of an entity occurring in this question. A detailed description of the algorithm is available in the doc2dialogue paper (Galitsky and Ilvovsky 2019).

Evaluation agent is tuned to yield the same assessment as a human on the 20% part of the evaluation dataset. The assessment performance of the evaluation agent (not the main agent) is then manually assesses on the rest 10% of this dataset. The remaining 70% is assessed by the evaluation agent in a fully automated mode.

Cramp and Throat irritation. In health-related domains, missing important pieces of knowledge is a strong flaw that can lead to the necessity for the trainee to read the whole paragraph after the agent mode. Assessors apply stricter meaningfulness criteria in these domains. In other knowledge domains related to entertainment, just the dialogue mode suffices in most cases, missing certain EDUs do not critically affect the knowledge acquisition results.

To compare a DT-navigation with a pure data-driven approach, we take the given paragraph of text as a seed and mine the health resources and web for a few hundred similar texts. Then we learn from them and apply the dialogue model similar to (??). The evaluation agent acting on behalf of user is the same, but the dialogue is totally different now. What is mostly lacking is a systematic navigation through the text: the data driven agent jumps abruptly from topic to topic, and content exploration becomes chaotic (the rightmost column in Table 5).

The evaluation results show the superiority of the DT-navigation approach in comparison to a data-driven one for content exploration. There is 11% drop in user satisfaction rate when the DT navigation is substituted by a data-driven system.

TABLE 9

Agent overall performance in various domains

| Domain & source | # dialogues | Percentages of overall meaningful dialogues | Percentages of meaningful utterances by the bot | User satisfaction score, % | User satisfaction score for a data-driven agent (baseline), % |
| --- | --- | --- | --- | --- | --- |
| Bloating | 316 | 78.1 | 87.9 | 77.4 | 66.3 |
| Cough | 315 | 79.5 | 92.4 | 79.6 | 68.4 |
| Diarrhea | 320 | 81.1 | 88.7 | 77.9 | 69.7 |
| Dizziness | 330 | 78.3 | 89.0 | 78.7 | 67.2 |
| Fatigue | 370 | 81.0 | 86.6 | 77.0 | 69.0 |
| Fever | 346 | 80.5 | 91.8 | 78.3 | 65.2 |
| Headache | 325 | 79.7 | 90.7 | 74.6 | 67.4 |
| Muscle Cramp | 310 | 82.4 | 91.4 | 80.3 | 66.1 |
| Nausea | 330 | 76.2 | 86.5 | 78.5 | 67.0 |
| Throat irritation | 208 | 80.8 | 91.2 | 79.0 | 69.6 |
| Average | 317 | 79.8 | 89.6 | 78.1 | 67.6 |

In Table 9, one can see that the user satisfaction achieves higher 70s %. Some higher complexity health domains lag 3-5% behind such simpler domains as Cough, Muscle

TABLE 10

Assessment of other dialogue criteria

| Domain | Specificity | Engagement | Coherence | Conversational depth | Conversational breadth |
| --- | --- | --- | --- | --- | --- |
| Bloating | 86.3 | 89.2 | 84.2 | 6.1 | 5.2 |
| Cough | 90.2 | 85.3 | 86.3 | 4.2 | 6.8 |
| Diarrhea | 88.4 | 87.9 | 88.7 | 5.3 | 5.7 |
| Dizziness | 89.0 | 89.3 | 86.5 | 6.0 | 6.1 |
| Fatigue | 94.4 | 91.7 | 90.3 | 5.7 | 5.0 |
| Fever | 92.3 | 95.0 | 83.9 | 7.1 | 5.9 |

TABLE 10-continued

Assessment of other dialogue criteria

| Domain | Specificity | Engagement | Coherence | Conversational depth | Conversational breadth |
|---|---|---|---|---|---|
| Headache | 93.2 | 92.4 | 87.0 | 5.7 | 6.6 |
| Muscle Cramp | 90.7 | 88.6 | 87.3 | 4.8 | 6.4 |
| Nausea | 87.5 | 90.3 | 89.4 | 5.9 | 5.8 |
| Throat irritation Average | 88.4 | 92.4 | 86.8 | 5.2 | 5.3 |

The results for the assessment of other dialogue criteria are presented in Table 10.

Specificity column shows the percentage of utterances which are specific as addressing the same or relevant entity. A non-specific answer would include a totally foreign entity or no specific entity at all.

Engagement column shows the percentage of dialogues which successfully covered the paragraph of text being communicated. We consider an engagement failed if after the second question the human user gave up on continuing a conversation and decided that reading this text is beneficial for her in comparison with conducting a dialogue.

Coherence column shows the percentages of dialogues where the user did not interrupt the dialogue having encountered a totally incoherent utterance of a agent. Such incoherent utterance would break the thought train of a user, abruptly changing the flow of a conversation. If less than five total utterances lead to the a loss of coherence, a given dialogue is considered incoherent.

Conversational depth is measured as a highest number of nested entities communicated by the agent replies. For example, the depth the chain diabetes—chronic condition—abnormally high levels of sugar—glucose—in the blood—insulin gives us depth=6.

Conversational breadth is measured as a number of distinct entities covered in a conversation so that one is not a sub-entity of another (do not form a chain from depth evaluation).

Notice that the failures of specificity, engagement and coherence are not mutually exclusive: some problematic dialogues can fail more than one criteria.

A data-driven agent forms a reply, averaging through a number of similar text fragments and dialogue fragments to construct a smooth and plausible dialogue. Whereas such dialogue can be accepted by a human annotator as meaningful, the conversation built by averaging does not bring any purpose. Optimizing a conversation for perplexity makes sure the focus of this conversation is evolving but does not bring a bit of a meaning to transmit between the peers, or for the reader of this conversation. Learning from more data makes sure any utterance of a user is well represented in the training set for averaging, but does not make a conversation more meaningful either.

A conversation starting with 'Hi' and followed by "I am well/How are you" is carried out for the sake of continuing this conversation in time and keeping the conversers busy. Conversely, we propose a conversation mode with a clear target of informing a user by delivering a certain chunk of knowledge, in a comprehensive, systematic and explainable way.

Personalization in Health Agents

In the field of medical education, maintaining quality content with well-organized structure is important. The content delivered by an agent needs to have a well-organized structure and also a smooth logical flow. It is important to navigate a user step-by-step through various portions and types of knowledge, from symptoms to treatment. It is better to maintain the original phrases from text intact.

A number of developed DL-based end-to-end agents end up being a slot-filler in the best case and random chit-chatter in the worst case. These agents may rely on association between symptoms and diseases. Online, once a candidate disease is established the agent learns the symptom-disease association, dialogue management and utterance generation simultaneously, on the fly. Therefore, it is hard to achieve a high quality of content delivery.

Studies of personalization in health care and medicine have been increasing in number over the last two decades, with growing evidence showing their effectiveness. One important limitation in the health care personalization literature is equating it to genomics-supported efforts in medicine. Genomic markers are only one dimension of personalization that helps to recognize the uniqueness of individuals and make their medicine personalized. There are other factors that affect this personalization of health care, such as people's lifestyle choices, their socioeconomic context and living environment, and other health care services that can be personalized like health education and therapies.

Dialogue systems can offer fine-grained possibilities to personalize the information to be delivered to a user on the basis of his deduced goals, intent, knowledge beliefs and on the basis of everything that has previously been said in the conversation.

Learning from a history of previous conversations plays a key role in ensuring the continuity of health communications that take place over multiple interactions over time. A review of behavior change interventions characterized four intervention groups according to their degree of personalization in the messages delivered to individuals: generic (one-size-fits-all messages), personalized (messages with the person's name), targeted (messages specific to a subgroup of the general population), or tailored (messages specific to an individual's characteristics).

Personalization is primarily used for tailoring the content to be delivered. Personalized content includes: (1) feedback on mood states, narrative skills, symptom summaries meditation practice, and current progress towards the goals set; (2) reminders, warnings, and alerts (Harper et al 2008); (3) multimedia; and (4) questions on pain and physical activity and health status.

The user interface can be personalized through changing conversational styles according to users' motivation state, users' level of expertise with the system, and dialogue history. The author used either didactic, relational, or motivational conversational styles based on the user profile and progress. While the didactic style was used for training-related conversations, the relational style was used at the beginning of sessions to improve user engagement based on the answers received from the user. The motivational style was employed to gather progress-related information and then to provide customized responses to support users. In a simpler implementation, another study used shorter question formats for follow-up sessions.

Although the technology behind smart agents is continuously developed, they currently do not have full human-level language abilities, resulting in misunderstanding and users' dissatisfaction. Furthermore, as machine learning algorithms develop, it is becoming increasingly challenging to keep track of their development, evolution, and the reasoning behind their responses. Although the black box effect appears to be an unavoidable consequence of the use of AI, there is some emerging research on making AI transparent and explainable. However, at the moment, its use may affect the safety and accuracy of treatment and should be carefully monitored and evaluated when used in health care.

Agents are evolving from conducting simple transactional tasks toward more involved end points such as long-term disease management and behavior change. The majority of the conversational agents target patients, with only a few aimed at health care professionals, for example, by automating patient intake or aiding in patient triage and diagnosis.

A bot is created to include the following therapeutic process-oriented features: (1) Empathic responses: The bot replied in an empathic way appropriate to the recognized mood of the user. For example, in response to a complaint on alienation, it replied "Sorry you are feeling lonely. I guess we all feel a little alienated sometimes" or it showed excitement, "Yay, always good to hear that!" (2) Tailoring: Specific content is sent to individuals depending on mood state. For example, a participant indicating that they feel anxious is offered in-vivo assistance with the anxious event. (3) Goal setting: The conversational agent asked participants if they had a personal goal that they hoped to achieve over the 2-week period. (4) Accountability: To facilitate a sense of accountability, the agent set expectations of regular check-ins and followed up on earlier activities, for example, on the status of the stated goal. (5) Motivation and engagement: To engage the individual in daily monitoring, the bot sent one personalized message every day or every other day to initiate a conversation (ie, prompting). In addition, "emojis" and animated gifs with messages that provide positive reinforcement can be used to encourage effort and completion of tasks.

Reflection: The bot also provided weekly charts depicting each participant's mood over time. Each graph was sent with a brief description of the data to facilitate reflection, for example, "Overall, your mood has been fairly steady, though you tend to become tired after periods of anxiety. It looks like Tuesday was your best day."

Persistent agents are especially valuable in organizations which cannot assure systematic approach to education.

Two major themes emerge in respect to this question concerning favorite features of a social bot: process and content. In the process theme, the subthemes that emerged were accountability from daily check-ins, the empathy that the bot showed, or other factors relating to his "personality"; and the learning that the bot facilitated, which in turn was divided into further subthemes of emotional insight, general insight, and insights about cognitions (FIG. 17).

Figure 30:
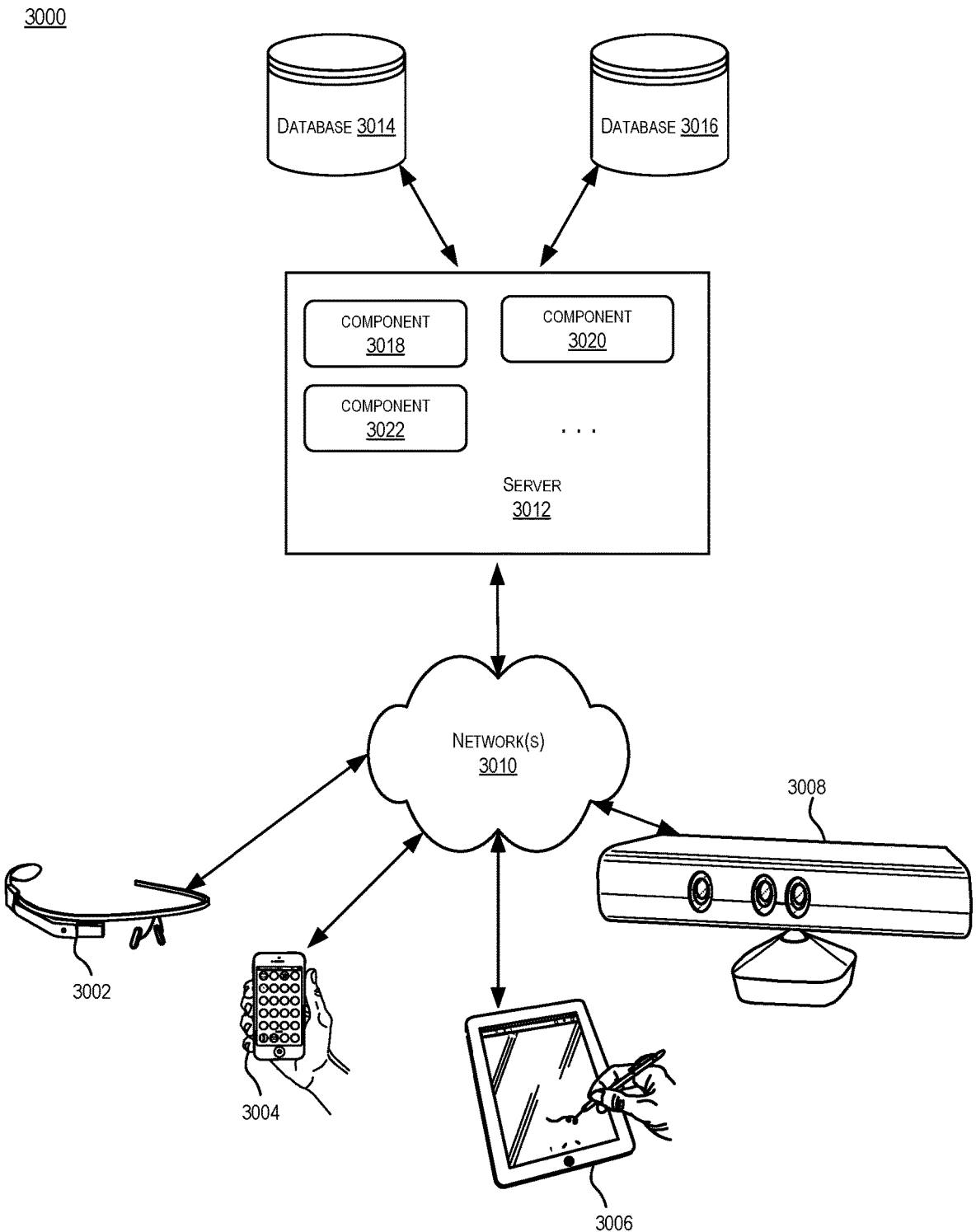
FIG. 30 depicts a simplified diagram of a distributed system for implementing one of the aspects.

FIG. 30 depicts a simplified diagram of a distributed system 3000 for implementing one of the aspects. In the illustrated aspect, distributed system 3000 includes one or more client computing devices 3002, 3004, 3006, and 3008, which are configured to execute and operate a client application such as a web browser, proprietary client (e.g., Oracle Forms), or the like over one or more network(s) 3010. Server 3012 may be communicatively coupled with remote client computing devices 3002, 3004, 3006, and 3008 via network 3010.

In various aspects, server 3012 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 3002, 3004, 3006, and/or 3008. Users operating client computing devices 3002, 3004, 3006, and/or 3008 may in turn utilize one or more client applications to interact with server 3012 to utilize the services provided by these components.

In the configuration depicted in the figure, the software components 3018, 3020 and 3022 of distributed system 3000 are shown as being implemented on server 3012. In other aspects, one or more of the components of distributed system 3000 and/or the services provided by these components may also be implemented by one or more of the client computing devices 3002, 3004, 3006, and/or 3008. Users operating the client computing devices may then utilize one or more client applications to use the services provided by these components. These components may be implemented in hardware, firmware, software, or combinations thereof. It should be appreciated that various different system configurations are possible, which may be different from distributed system 3000. The aspect shown in the figure is thus one example of a distributed system for implementing an aspect system and is not intended to be limiting.

Client computing devices 3002, 3004, 3006, and/or 3008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 3002, 3004, 3006, and 3008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 3010.

Although exemplary distributed system 3000 is shown with four client computing devices, any number of client computing devices may be supported. Other devices, such as devices with sensors, etc., may interact with server 3012.

Network(s) 3010 in distributed system 3000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 3010 can be a local area network (LAN), such as one based on Ethernet, Token-Ring and/or the like. Network(s) 3010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.30 suite of protocols, Bluetooth®, and/or any other wireless protocol); and/or any combination of these and/or other networks.

Server 3012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 3012 can include one or more virtual machines running virtual operating systems, or other computing architectures involving virtualization. One or more flexible pools of logical storage devices can be virtualized to maintain virtual storage devices for the server. Virtual networks can be controlled by server 3012 using software defined networking. In various aspects, server 3012 may be adapted to run one or more services or software applications described in the foregoing disclosure. For example, server 3012 may correspond to a server for performing processing described above according to an aspect of the present disclosure.

Server 3012 may run an operating system including any of those discussed above, as well as any commercially available server operating system. Server 3012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 3012 may include one or more applications to analyze and consolidate data feeds and/or event updates received from users of client computing devices 3002, 3004, 3006, and 3008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 3012 may also include one or more applications to display the data feeds and/or real-time events via one or more display devices of client computing devices 3002, 3004, 3006, and 3008.

Distributed system 3000 may also include one or more databases 3014 and 3016. Databases 3014 and 3016 may reside in a variety of locations. By way of example, one or more of databases 3014 and 3016 may reside on a non-transitory storage medium local to (and/or resident in) server 3012. Alternatively, databases 3014 and 3016 may be remote from server 3012 and in communication with server 3012 via a network-based or dedicated connection. In one set of aspects, databases 3014 and 3016 may reside in a storage-area network (SAN). Similarly, any necessary files for performing the functions attributed to server 3012 may be stored locally on server 3012 and/or remotely, as appropriate. In one set of aspects, databases 3014 and 3016 may include relational databases, such as databases provided by Oracle, that are adapted to store, update, and retrieve data in response to SQL-formatted commands.

Figure 31:
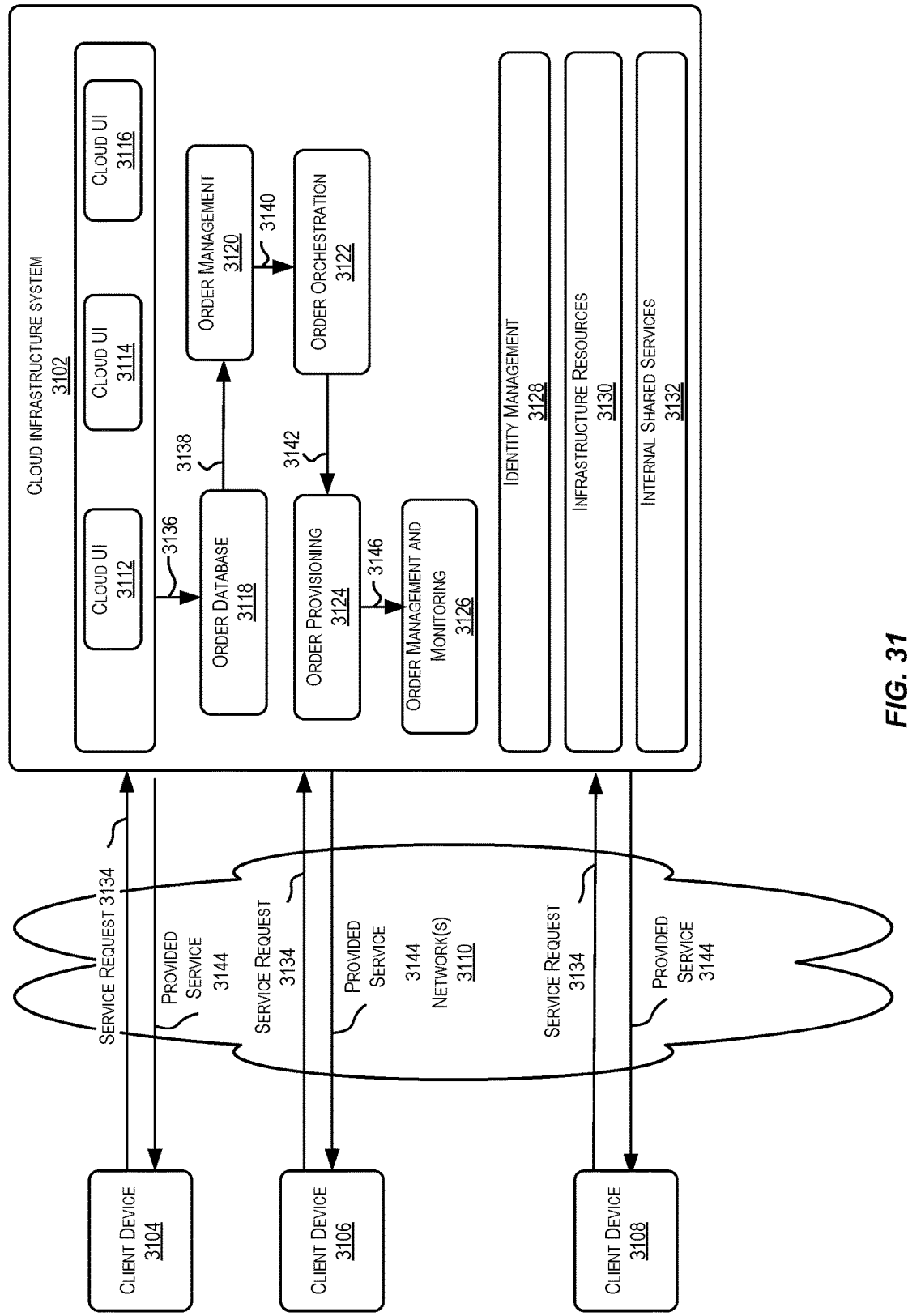
FIG. 31 is a simplified block diagram of components of a system environment by which services provided by the components of an aspect system may be offered as cloud services in accordance with an aspect.

FIG. 31 is a simplified block diagram of one or more components of a system environment 3100 by which services provided by one or more components of an aspect system may be offered as cloud services in accordance with an aspect of the present disclosure. In the illustrated aspect, system environment 3100 includes one or more client computing devices 3104, 3106, and 3108 that may be used by users to interact with a cloud infrastructure system 3102 that provides cloud services. The client computing devices may be configured to operate a client application such as a web browser, a proprietary client application (e.g., Oracle Forms), or some other application, which may be used by a user of the client computing device to interact with cloud infrastructure system 3102 to use services provided by cloud infrastructure system 3102.

It should be appreciated that cloud infrastructure system 3102 depicted in the figure may have other components than those depicted. Further, the aspect shown in the figure is only one example of a cloud infrastructure system that may incorporate an aspect of the invention. In some other aspects, cloud infrastructure system 3102 may have more or fewer components than shown in the figure, may combine two or more components, or may have a different configuration or arrangement of components.

Client computing devices 3104, 3106, and 3108 may be devices similar to those described above for 3002, 3004, 3006, and 3008.

Although exemplary system environment 3100 is shown with three client computing devices, any number of client computing devices may be supported. Other devices such as devices with sensors, etc. may interact with cloud infrastructure system 3102.

Network(s) 3110 may facilitate communications and exchange of data between client computing devices 3104, 3106, and 3108 and cloud infrastructure system 3102. Each network may be any type of network familiar to those skilled in the art that can support data communications using any of a variety of commercially-available protocols, including those described above for network(s) 3110.

Cloud infrastructure system 3102 may comprise one or more computers and/or servers that may include those described above for server 1712.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 3102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 3102 may be adapted to automatically provision, manage and track a customer's subscription to services offered by cloud infrastructure system 3102. Cloud infrastructure system 3102 may provide the cloud services via different deployment models. For example, services may be provided under a public cloud model in which cloud infrastructure system 3102 is owned by an organization selling cloud services (e.g., owned by Oracle) and the services are made available to the general public or different industry enterprises. As another example, services may be provided under a private cloud model in which cloud infrastructure system 3102 is operated solely for a single organization and may provide services for one or more entities within the organization. The cloud services may also be provided under a community cloud model in which cloud infrastructure system 3102 and the services provided by cloud infrastructure system 3102 are shared by several organizations in a related community. The cloud services may also be provided under a hybrid cloud model, which is a combination of two or more different models.

In some aspects, the services provided by cloud infrastructure system 3102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 3102. Cloud infrastructure system 3102 then performs processing to provide the services in the customer's subscription order.

In some aspects, the services provided by cloud infrastructure system 3102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 3102 may also include infrastructure resources 3130 for providing the resources used to provide various services to customers of the cloud infrastructure system. In one aspect, infrastructure resources 3130 may include pre-integrated and optimized combinations of hardware, such as servers, storage, and networking resources to execute the services provided by the PaaS platform and the SaaS platform.

In some aspects, resources in cloud infrastructure system 3102 may be shared by multiple users and dynamically re-allocated per demand. Additionally, resources may be allocated to users in different time zones. For example, cloud infrastructure system 3102 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 3132 may be provided that are shared by different components or modules of cloud infrastructure system 3102 and by the services provided by cloud infrastructure system 3102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 3102 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 3102, and the like.

In one aspect, as depicted in the figure, cloud management functionality may be provided by one or more modules, such as an order management module 3126, an order orchestration module 3122, an order provisioning module 3124, an order management and monitoring module 3126, and an identity management module 3128. These modules may include or be provided using one or more computers and/or servers, which may be general purpose computers, specialized server computers, server farms, server clusters, or any other appropriate arrangement and/or combination.

In exemplary operation 3134, a customer using a client device, such as client computing device 3104, 3106 or 3108, may interact with cloud infrastructure system 3102 by requesting one or more services provided by cloud infrastructure system 3102 and placing an order for a subscription for one or more services offered by cloud infrastructure system 3102. In certain aspects, the customer may access a cloud User Interface (UI) 3112, cloud UI 3114 and/or cloud UI 3116 and place a subscription order via these UIs. The order information received by cloud infrastructure system 3102 in response to the customer placing an order may include information identifying the customer and one or more services offered by the cloud infrastructure system 3102 that the customer intends to subscribe to.

After an order has been placed by the customer, the order information is received via the cloud UIs, 3131, 3114 and/or 3116.

At operation 3136, the order is stored in order database 3118. Order database 3118 can be one of several databases operated by cloud infrastructure system 3102 and operated in conjunction with other system elements.

At operation 3138, the order information is forwarded to an order management module 3126. In some instances, order management module 3126 may be configured to perform billing and accounting functions related to the order, such as verifying the order, and upon verification, booking the order.

At operation 3140, information regarding the order is communicated to an order orchestration module 3122. Order orchestration module 3122 may utilize the order information to orchestrate the provisioning of services and resources for the order placed by the customer. In some instances, order orchestration module 3122 may orchestrate the provisioning of resources to support the subscribed services using the services of order provisioning module 3124.

In certain aspects, order orchestration module 3122 enables the management of business processes associated with each order and applies business logic to determine whether an order should proceed to provisioning. At operation 3142, upon receiving an order for a new subscription, order orchestration module 3122 sends a request to order provisioning module 3124 to allocate resources and configure those resources needed to fulfill the subscription order. Order provisioning module 3124 enables the allocation of resources for the services ordered by the customer. Order provisioning module 3124 provides a level of abstraction between the cloud services provided by cloud infrastructure system 3102 and the physical implementation layer that is used to provision the resources for providing the requested services. Order orchestration module 3122 may thus be isolated from implementation details, such as whether or not services and resources are actually provisioned on the fly or pre-provisioned and only allocated/assigned upon request.

At operation 3144, once the services and resources are provisioned, a notification of the provided service may be sent to customers on client computing devices 3104, 3106 and/or 3108 by order provisioning module 3124 of cloud infrastructure system 3102.

At operation 3146, the customer's subscription order may be managed and tracked by an order management and monitoring module 3126. In some instances, order management and monitoring module 3126 may be configured to collect usage statistics for the services in the subscription order, such as the amount of storage used, the amount data transferred, the number of users, and the amount of system up time and system down time.

In certain aspects, cloud infrastructure system 3102 may include an identity management module 3128. Identity management module 3128 may be configured to provide identity services, such as access management and authorization services in cloud infrastructure system 3102. In some aspects, identity management module 3128 may control information about customers who wish to utilize the services provided by cloud infrastructure system 3102. Such information can include information that authenticates the identities of such customers and information that describes which actions those customers are authorized to perform relative to various system resources (e.g., files, directories, applications, communication ports, memory segments, etc.) Identity management module 3128 may also include the management of descriptive information about each customer and about how and by whom that descriptive information can be accessed and modified.

Figure 32:
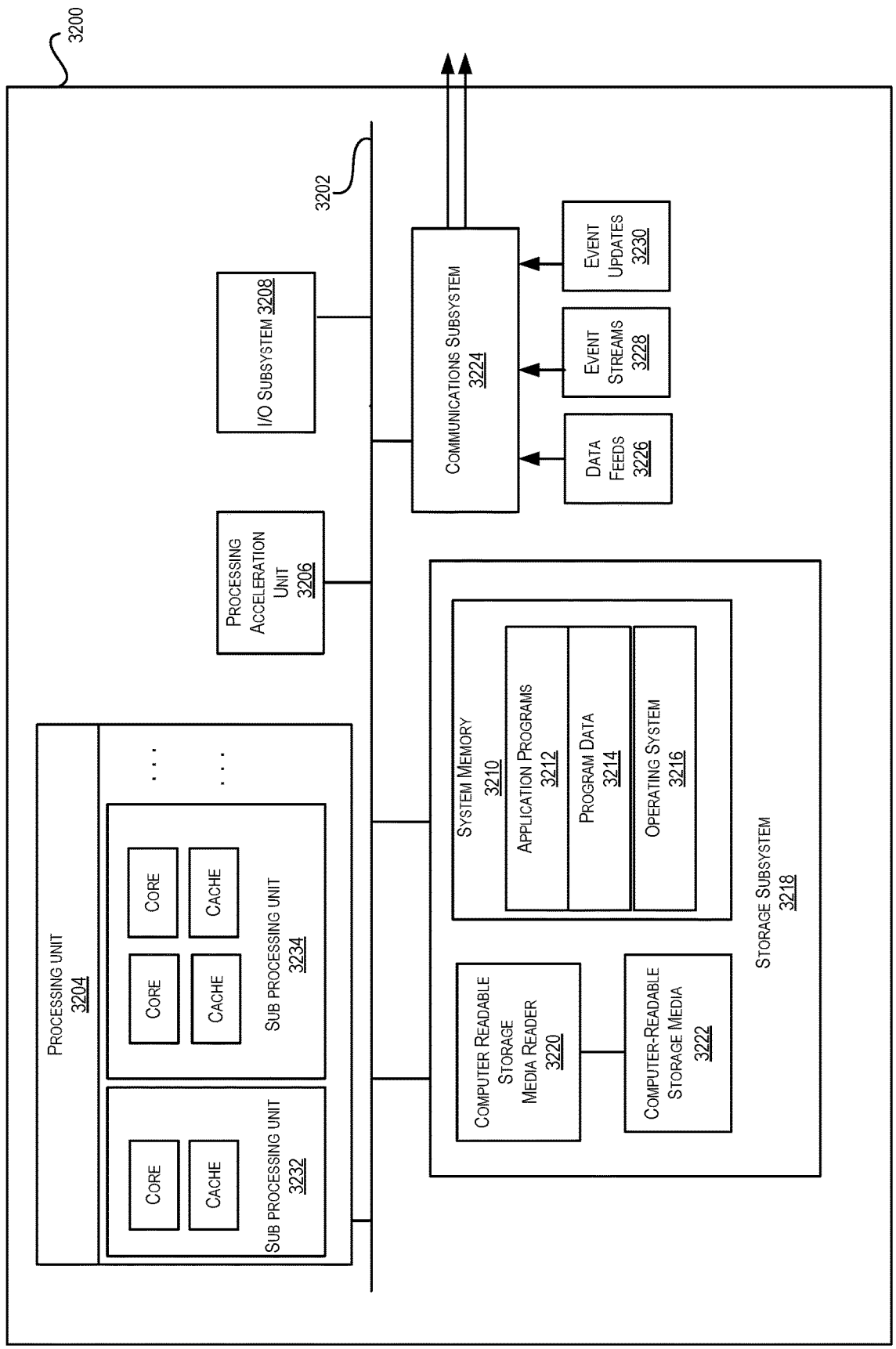
FIG. 32 illustrates an exemplary computer system, in which various aspects of the present invention may be implemented.

FIG. 32 illustrates a computer system 3200, in which various aspects of the present invention may be implemented. The computer system 3200 may be used to implement any of the computer systems described above. As shown in the figure, computer system 3200 includes a processing unit 3204 that communicates with a number of peripheral subsystems via a bus subsystem 3202. These peripheral subsystems may include a processing acceleration unit 3206, an I/O subsystem 3208, a storage subsystem 3218 and a communications subsystem 3224. Storage subsystem 3218 includes tangible computer-readable storage media 3222 and a system memory 3210.

Bus subsystem 3202 provides a mechanism for letting the various components and subsystems of computer system 3200 communicate with each other as intended. Although bus subsystem 3202 is shown schematically as a single bus, alternative aspects of the bus subsystem may utilize multiple buses. Bus subsystem 3202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P3286.1 standard.

Processing unit 3204, which can be implemented as one or more integrated circuits (e.g., a conventional microprocessor or microcontroller), controls the operation of computer system 3200. One or more processors may be included in processing unit 3204. These processors may include single core or multicore processors. In certain aspects, processing unit 3204 may be implemented as one or more independent processing units 3232 and/or 3234 with single or multicore processors included in each processing unit. In other aspects, processing unit 3204 may also be implemented as a quad-core processing unit formed by integrating two dual-core processors into a single chip.

In various aspects, processing unit 3204 can execute a variety of programs in response to program code and can maintain multiple concurrently executing programs or processes. At any given time, some or all of the program code to be executed can be resident in processing unit 3204 and/or in storage subsystem 3218. Through suitable programming, processing unit 3204 can provide various functionalities described above. Computer system 3200 may additionally include a processing acceleration unit 3206, which can include a digital signal processor (DSP), a special-purpose processor, and/or the like.

I/O subsystem 3208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3200 may comprise a storage subsystem 3218 that includes software elements, shown as being currently located within a system memory 3210. System memory 3210 may store program instructions that are loadable and executable on processing unit 3204, as well as data generated during the execution of these programs.

Depending on the configuration and type of computer system 3200, system memory 3210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3204. In some implementations, system memory 3210 may include multiple different types of memory, such as static random access memory (SRAM) or dynamic random access memory (DRAM). In some implementations, a basic input/output system (BIOS), containing the basic routines that help to transfer information between elements within computer system 3200, such as during start-up, may typically be stored in the ROM. By way of example, and not limitation, system memory 3210 also illustrates application programs 3212, which may include client applications, Web browsers, mid-tier applications, relational database management systems (RDBMS), etc., program data 3214, and an operating system 3216. By way of example, operating system 3216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3218 may also provide a tangible computer-readable storage medium for storing the basic programming and data constructs that provide the functionality of some aspects. Software (programs, code modules, instructions) that when executed by a processor provide the functionality described above may be stored in storage subsystem 3218. These software modules or instructions may be executed by processing unit 3204. Storage subsystem 3218 may also provide a repository for storing data used in accordance with the present invention.

Storage subsystem 3218 may also include a computer-readable storage media reader 3220 that can further be connected to computer-readable storage media reader 3220. Together and, optionally, in combination with system memory 3210, computer-readable storage media reader 3220 may comprehensively represent remote, local, fixed, and/or removable storage devices plus storage media for temporarily and/or more permanently containing, storing, transmitting, and retrieving computer-readable information.

Computer-readable storage media reader 3220 can contain code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 3200.

By way of example, computer-readable storage media reader 3220 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 3222 may include, but is not limited to, Zip® drives, flash memory cards, universal serial bus (USB) flash drives, secure digital (SD) cards, DVD disks, digital video tape, and the like. Computer-readable storage media reader 3220 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3200.

Communications subsystem 3224 provides an interface to other computer systems and networks. Communications subsystem 3224 serves as an interface for receiving data from and transmitting data to other systems from computer system 3200. For example, communications subsystem 3224 may enable computer system 3200 to connect to one or more devices via the Internet. In some aspects, communications subsystem 3224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 3224 can provide wired network connectivity (e.g., Ethernet) in addition to or instead of a wireless interface.

In some aspects, communications subsystem 3224 may also receive input communication in the form of structured and/or unstructured data feeds 3226, event streams 3228, event updates 3230, and the like on behalf of one or more users who may use computer system 3200.

By way of example, communications subsystem 3224 may be configured to receive unstructured data feeds 3226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 3224 may also be configured to receive data in the form of continuous data streams, which may include event streams 3228 of real-time events and/or event updates 3230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3224 may also be configured to output the structured and/or unstructured data feeds 3226, event streams 3228, event updates 3230, and the like to one or more databases that may be in communication with one or more streaming data source computers coupled to computer system 3200.

Computer system 3200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for navigating text using discourse trees, the method comprising:
    creating a discourse tree from text comprising fragments, wherein the discourse tree comprises a root node, nonterminal nodes, and terminal nodes, each nonterminal node representing a respective rhetorical relationship between two of the fragments, and each terminal node is associated with one of the fragments, wherein the fragments are elementary discourse units;
    determining, from the discourse tree, a subset of terminal nodes that are (i) associated with a nonterminal node representing a rhetorical relationship of type elaboration and (ii) associated with a nucleus elementary discourse unit of the rhetorical relationship;
    determining, from a topic node, a topic of the discourse tree by extracting a noun phrase from the nucleus elementary discourse unit associated with the topic node, wherein the topic node has a shortest path length from the root node;
    providing, to a user device, text associated with the topic;
    receiving, from the user device, an utterance in response to the topic; and
    responsive to determining that the utterance comprises a request for more details:
        identifying, in the discourse tree, a parent node directly connected to the topic node; and
        identifying, in the discourse tree, a second terminal node that is related to the parent node via the rhetorical relation of type elaboration; and
    providing text associated with the second terminal node to the user device.

2. The method of claim 1, further comprising:
    forming, from the discourse tree, a set of navigation options including (i) a first rhetorical relationship between a first elementary discourse unit and a second elementary discourse unit and (ii) a second rhetorical relationship between a third elementary discourse unit and a fourth elementary discourse unit; and
    presenting, to the user device, the set of navigation options.

3. The method of claim 1, further comprising:
    receiving, from the user device, an additional utterance in response to the text associated with the second terminal node;
    identifying, in the discourse tree, a third terminal node that is related to the parent node via an additional rhetorical relation; and
    providing, to the user device, additional text based on a type of the additional rhetorical relation.

4. The method of claim 1, further comprising:
    identifying, in the discourse tree, a satellite elementary discourse unit associated with the topic node via the rhetorical relationship of type elaboration; and
    providing text associated with the satellite elementary discourse unit to the user device.

5. The method of claim 1, further comprising:
    navigating, in the discourse tree, to an additional non-terminal node that is connected to the topic node and represents an additional rhetorical relation;
    determining, from the additional non-terminal node, an additional topic by extracting an additional noun phrase from an additional nucleus elementary discourse unit associated with additional non-terminal node; and
    responsive to determining that the additional rhetorical relation is one of type elaboration, condition, or temporal sequence:
        extracting additional text from the additional nucleus elementary discourse unit; and
        providing the additional text to the user device.

6. The method of claim 1, further comprising:
    receiving, from the user device, an additional utterance;
    determining that the additional utterance indicates familiarity with an additional topic;
    identifying, in the discourse tree, an additional non-terminal node that comprises text representing the additional topic and represents an additional rhetorical relation;
    responsive to determining that the additional rhetorical relation is one of type elaboration, condition, or contrast:
        extracting additional text from an elementary discourse unit associated with a terminal node that is connected to the additional terminal node; and
        providing the additional text to the user device.

7. The method of claim 1, further comprising:
    forming, from the discourse tree, a communicative discourse tree that represents the text by matching each fragment that has a verb to a respective verb signature;
    identifying, from the communicative discourse tree, a verb signature that corresponds to the topic node;
    extracting a subject from the verb signature; and
    providing the subject to the user device.

8. A system comprising:
    a non-transitory computer-readable medium storing computer-executable program instructions; and
    a processing device communicatively coupled to the non-transitory computer-readable medium for executing the computer-executable program instructions, wherein executing the computer-executable program instructions configures the processing device to perform operations comprising:
    creating a discourse tree from text comprising fragments, wherein the discourse tree comprises a root node, nonterminal nodes, and terminal nodes, each nonterminal node representing a respective rhetorical relationship between two of the fragments, and each terminal node is associated with one of the fragments, wherein the fragments are elementary discourse units;
    determining, from the discourse tree, a subset of terminal nodes that are (i) associated with a nonterminal node representing a rhetorical relationship of type elaboration and (ii) associated with a nucleus elementary discourse unit of the rhetorical relationship;
    determining, from a topic node, a topic of the discourse tree by extracting a noun phrase from the nucleus elementary discourse unit associated with the topic node, wherein the topic node has a shortest path length from the root node;
    providing, to a user device, text associated with the topic;

receiving, from the user device, an utterance in response to the topic; and responsive to determining that the utterance comprises a request for more details:
identifying, in the discourse tree, a parent node directly connected to the topic node; and
identifying, in the discourse tree, a second terminal node that is related to the parent node via the rhetorical relation of type elaboration; and providing text associated with the second terminal node to the user device.

9. The system of claim 8, wherein executing the computer-executable program instructions configures the processing device to perform additional operations comprising:
forming, from the discourse tree, a set of navigation options including (i) a first rhetorical relationship between a first elementary discourse unit and a second elementary discourse unit and (ii) a second rhetorical relationship between a third elementary discourse unit and a fourth elementary discourse unit; and
presenting, to the user device, the set of navigation options.

10. The system of claim 8, wherein executing the computer-executable program instructions configures the processing device to perform additional operations comprising:
receiving, from the user device, an additional utterance in response to the text associated with the second terminal node;
identifying, in the discourse tree, a third terminal node that is related to the parent node via an additional rhetorical relation; and
providing, to the user device, additional text based on a type of the additional rhetorical relation.

11. The system of claim 8, wherein executing the computer-executable program instructions configures the processing device to perform additional operations comprising:
identifying, in the discourse tree, a satellite elementary discourse unit associated with the topic node via the rhetorical relationship of type elaboration; and
providing text associated with the satellite elementary discourse unit to the user device.

12. The system of claim 8, wherein executing the computer-executable program instructions configures the processing device to perform additional operations comprising:
navigating, in the discourse tree, to an additional nonterminal node that is connected to the topic node and represents an additional rhetorical relation;
determining, from the additional non-terminal node, an additional topic by extracting an additional noun phrase from an additional nucleus elementary discourse unit associated with additional non-terminal node; and
responsive to determining that the additional rhetorical relation is one of type elaboration, condition, or temporal sequence:
extracting additional text from the additional nucleus elementary discourse unit; and
providing the additional text to the user device.

13. The system of claim 8, wherein executing the computer-executable program instructions configures the processing device to perform additional operations comprising:
receiving, from the user device, an additional utterance;
determining that the additional utterance indicates familiarity with an additional topic;
identifying, in the discourse tree, an additional non-terminal node that comprises text representing the additional topic and represents an additional rhetorical relation;
responsive to determining that the additional rhetorical relation is one of type elaboration, condition, or contrast:
extracting additional text from an elementary discourse unit associated with a terminal node that is connected to the additional terminal node; and
providing the additional text to the user device.

14. The system of claim 8, wherein executing the computer-executable program instructions configures the processing device to perform additional operations comprising:
forming, from the discourse tree, a communicative discourse tree that represents the text by matching each fragment that has a verb to a respective verb signature;
identifying, from the communicative discourse tree, a verb signature that corresponds to the topic node;
extracting a subject from the verb signature; and
providing the subject to the user device.

15. A non-transitory computer-readable medium storing computer-executable program instructions that when executed by a processor, perform operations comprising:
creating a discourse tree from text comprising fragments, wherein the discourse tree comprises a root node, nonterminal nodes, and terminal nodes, each nonterminal node representing a respective rhetorical relationship between two of the fragments, and each terminal node is associated with one of the fragments, wherein the fragments are elementary discourse units;
determining, from the discourse tree, a subset of terminal nodes that are (i) associated with a nonterminal node representing a rhetorical relationship of type elaboration and (ii) associated with a nucleus elementary discourse unit of the rhetorical relationship;
determining, from a topic node, a topic of the discourse tree by extracting a noun phrase from the nucleus elementary discourse unit associated with the topic node, wherein the topic node has a shortest path length from the root node;
providing, to a user device, text associated with the topic;
receiving, from the user device, an utterance in response to the topic; and
responsive to determining that the utterance comprises a request for more details:
identifying, in the discourse tree, a parent node directly connected to the topic node; and
identifying, in the discourse tree, a second terminal node that is related to the parent node via the rhetorical relation of type elaboration; and
providing text associated with the second terminal node to the user device.

16. The non-transitory computer-readable medium of claim 15, wherein when executed by the processor, the computer-executable program instructions perform additional operations comprising:
forming, from the discourse tree, a set of navigation options including (i) a first rhetorical relationship between a first elementary discourse unit and a second elementary discourse unit and (ii) a second rhetorical relationship between a third elementary discourse unit and a fourth elementary discourse unit; and
presenting, to the user device, the set of navigation options.

17. The non-transitory computer-readable medium of claim 15, wherein when executed by the processor, the computer-executable program instructions perform additional operations comprising:

receiving, from the user device, an additional utterance in response to the text associated with the second terminal node;

identifying, in the discourse tree, a third terminal node that is related to the parent node via an additional rhetorical relation; and providing, to the user device, additional text based on a type of the additional rhetorical relation.

18. The non-transitory computer-readable medium of claim 15, wherein when executed by the processor, the computer-executable program instructions perform additional operations comprising:

identifying, in the discourse tree, a satellite elementary discourse unit associated with the topic node via the rhetorical relationship of type elaboration; and providing text associated with the satellite elementary discourse unit to the user device.

19. The non-transitory computer-readable medium of claim 15, wherein when executed by the processor, the computer-executable program instructions perform additional operations comprising:

navigating, in the discourse tree, to an additional non-terminal node that is connected to the topic node and represents an additional rhetorical relation;

determining, from the additional non-terminal node, an additional topic by extracting an additional noun phrase from an additional nucleus elementary discourse unit associated with additional non-terminal node; and responsive to determining that the additional rhetorical relation is one of type elaboration, condition, or temporal sequence:

extracting additional text from the additional nucleus elementary discourse unit; and providing the additional text to the user device.

20. The non-transitory computer-readable medium of claim 15, wherein when executed by the processor, the computer-executable program instructions perform additional operations comprising:

receiving, from the user device, an additional utterance;

determining that the additional utterance indicates familiarity with an additional topic;

identifying, in the discourse tree, an additional non-terminal node that comprises text representing the additional topic and represents an additional rhetorical relation;

responsive to determining that the additional rhetorical relation is one of type elaboration, condition, or contrast:

extracting additional text from an elementary discourse unit associated with a terminal node that is connected to the additional terminal node; and providing the additional text to the user device.

* * * * *